(12) United States Patent
Dunnett et al.

(10) Patent No.: US 7,027,050 B1
(45) Date of Patent: Apr. 11, 2006

(54) 3D COMPUTER GRAPHICS PROCESSING APPARATUS AND METHOD

(75) Inventors: Graham J. Dunnett, Guildford (GB); Holger H. Grün, Tutzing (DE)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/471,363

(22) Filed: Dec. 23, 1999

(30) Foreign Application Priority Data

| Feb. 4, 1999 | (GB) | ............................................... 9902506 |
| Feb. 4, 1999 | (GB) | ............................................... 9902510 |
| Feb. 4, 1999 | (GB) | ............................................... 9902511 |
| Feb. 4, 1999 | (GB) | ............................................... 9902514 |

(51) Int. Cl.
*G06T 17/00* (2006.01)

(52) U.S. Cl. ..................................................... 345/440
(58) Field of Classification Search ................. 345/418, 345/419, 420, 423, 424, 428, 440
See application file for complete search history.

(56) References Cited

U.S. PATENT DOCUMENTS

| 5,253,339 A | 10/1993 | Wells et al. ................. 395/126 |
| 5,563,989 A | 10/1996 | Billyard ........................ 395/126 |
| 5,579,454 A | 11/1996 | Billyard et al. ............. 395/121 |
| 5,602,979 A | 2/1997 | Loop ............................ 395/123 |
| 5,666,472 A | 9/1997 | Huddy ......................... 345/119 |
| 5,757,321 A | 5/1998 | Billyard ....................... 345/434 |
| 5,777,620 A | 7/1998 | Billyard ....................... 345/426 |
| 5,903,273 A * | 5/1999 | Mochizuki et al. ......... 345/423 |
| 6,441,819 B1 * | 8/2002 | Suzuoki ....................... 345/423 |
| 6,456,286 B1 * | 9/2002 | Arai et al. ................... 345/423 |

FOREIGN PATENT DOCUMENTS

| EP | 0 366 463 | 5/1990 |
| EP | 0 590 995 | 4/1994 |
| EP | 0 596 667 | 5/1994 |
| EP | 0 806 744 | 11/1997 |
| EP | 0 996 094 | 4/2000 |
| WO | WO 99/53445 | 10/1999 |

OTHER PUBLICATIONS

R. L. Cook, "Shade Trees", Computer Graphics, vol. 18, No. 3, pp. 223–231, (Jul. 1984).

A.V. Gelder et al., "Direct Volume Rendering with Shading Via Three–Dimensional Textures", Proceedings of the 1996 Symposium on Volume Visualization, pp. 23–30, (Oct. 1996).

(Continued)

*Primary Examiner*—Cliff N. Vo
(74) *Attorney, Agent, or Firm*—Fitzpatrick, Cella, Harper & Scinto

(57) ABSTRACT

In a computer graphics apparatus, a three-dimensional object is modelled using a mesh of triangles which approximate the object surface. To display images, each triangle is sub-divided into smaller triangles, which do not necessarily lie in the same plane as the original triangle. In this way, the curvature of the object surface can be more accurately modelled. A parametric patch, such as a Bernstein-Bezier triangular patch or Heron patch, is used to determine how to divide each triangle into smaller non-planar triangles. In addition, the number of non-planar triangles is determined using the size of the original triangle in the current or a preceding frame of image data. The non-planar triangles are stored for use in subsequent frames which require the same number of non-planar triangles, thereby reducing processing requirements. Rather than carry out lighting calculations for the vertex of each new non-planar triangle, lighting values are calculated and used to define a parametric patch which is subsequently used to determine lighting values for the new triangles.

105 Claims, 39 Drawing Sheets

OTHER PUBLICATIONS

Pharr et al., "Geometry Caching for Ray–Tracing Displacement Maps", Proceedings of the Seventh Eurographics Workshop on Rendering, pp. 31–40 and 280–294, (Jun. 1996).

Becker et al., "Smooth Transitions Between Bump Rendering Algorithms", Computer Graphics Proceedings, Annual Conference Series, pp. 183–189, (1993).

Cook et al., "The Reyes Image Rendering Architecture", Computer Graphics, vol. 21, No. 4, pp. 95–102, (Jul. 1987).

J. Foley et al., "Illumination and Shading", Computer Graphics, Second Edition, Principles and Practice, pp. 806–812.

J. Foley et al., Computer Graphics Principles and Practice, Second Edition, pp, 664–680.

M.J. Castro Diaz, "Mesh Refinement Over Triangulated Surfaces", Inria Research Report, pp. 1–40 (Oct. 1994).

J.D. Foley, et al., Computer Graphics Principles and Practice, Second Edition, pp. 511–528 and 721–741 (1993).

D.E. Breen, "Creation and Smooth–Shading of Steiner Patch Tessellations", Proceedings Fall Joint Computer Conference, pp. 931–940 (1986).

D.F. Rogers, Procedural Elements for Computer Graphics, McGraw–Hill, pp. 317–319 (1988).

J. Arvo, "Stratified Sampling of Spherical Triangles", Computer Graphics Proceedings, Annual Conference Series, pp. 437 & 438, (1995).

J.D. Foley, et al., Computer Graphics Principles and Practice, Second Edition, pp. 488–490 and 514 (1993).

A.A.M. Kuijk, et al., "Faster Phong Shading Via Angular Interpolation", Computer Graphics Forum, No. 8, pp. 315–324 (1989).

M. Shantz, et al., "Shading Bicubic Patches", Computer Graphics, vol. 21, No. 4, pp. 189–196 (Jul. 1987).

C. Bajaj, et al., "Smoothing Polyhedra Using Implicit Algebraic Splines", Computer Graphics, vol. 26, No. 2, pp. 79–88 (Jul. 1992).

G. Farin, "Triangular Bernstein–Bézier pa", Computer Aided Geometric Design, No. 3, pp. 83–127 (1986).

Xia, Julie C., et al. "Adaptive Real–Time Level–of–Detail–Based Rendering for Polygonal Models", IEEE Transactions on Visualization and Computer Graphics, IEEE Service Center, vol. 3, No. 2, pp. 171–183 (Apr. 1,1997).

Barequet, Gill, et al., "RSVP: A Geometric Toolkit for Controlled Repair of Solid Models", IEEE Transactions on Visualization and Computer Graphics, IEEE Service Center, vol. 4, No. 2, pp. 162–177 (Apr. 1, 1998).

* cited by examiner

| AREA, A, OF TRIANGLE (PIXELS) | DEPTH VALUE |
|---|---|
| A < 50 | 1 |
| 50 ≤ A < 200 | 2 |
| 200 ≤ A < 450 | 3 |
| 450 ≤ A < 800 | 4 |
| 800 ≤ A < 1250 | 5 |
| 1250 ≤ A < 1800 | 6 |
| 1800 ≤ A < 2450 | 7 |
| 2450 ≤ A < 3200 | 8 |
| 3200 ≤ A < 4050 | 9 |
| A ≥ 4050 | 10 |

FIG. 17A

| MINIMUM VERTEX NORMAL DOT PRODUCT, $DP_{min}$ | DEPTH VALUE |
|---|---|
| $DP_{min}$ > 0.95 | 1 |
| 0.75 < $DP_{min}$ ≤ 0.95 | 2 |
| 0.50 < $DP_{min}$ ≤ 0.75 | 3 |
| 0.25 < $DP_{min}$ ≤ 0.50 | 4 |
| 0.00 < $DP_{min}$ ≤ 0.25 | 5 |
| -0.25 < $DP_{min}$ ≤ 0.00 | 6 |
| -0.50 < $DP_{min}$ ≤ -0.25 | 7 |
| -0.75 < $DP_{min}$ ≤ -0.50 | 8 |
| -0.95 < $DP_{min}$ ≤ -0.75 | 9 |
| $DP_{min}$ < -0.95 | 10 |

FIG. 17B

3D COMPUTER GRAPHICS PROCESSING APPARATUS AND METHOD

The present invention relates to the field of three-dimensional (3D) computer graphics and, more particularly, to the rendering of object surfaces, to the shading (or lighting) of object surfaces, and/or to the sub-division of the representation of an object's surface into polygons for rendering.

In 3D computer graphics, three-dimensional objects are commonly represented using a mesh of polygons which closely follow the surface of the object. The more complex the object surface, the more polygons are required to model it accurately. However, as the number of polygons increases, the processing operations which must be carried out to display an image of the object increase, since each polygon must be processed, and the storage capacity required to store all of the polygons also increases. Accordingly, many 3D graphics systems attempt to use as few polygons as possible. One problem with such systems, therefore, is that surface curvature is lost due to the low polygon representation. This causes images of the model to appear faceted instead of smooth.

"Creation and Smooth-Shading of Steiner Patch Tessellations" by D. E. Breen in 19.86 Proceedings Fall Joint Computer Conference, pages 931–940, IEEE Catalog Number 86CH2345-7, describes a method of shading a three-dimensional surface in which the surface is originally modelled as a particular type of biparametric patch, namely a superellipsoid, the superellipsoid is uniformly subdivided into triangles, and each triangle is approximated with a steiner patch to produce a continuous mesh of steiner patches. In order to render the resulting mesh, the steiner patches are ray traced, and, when a patch is intersected by a ray, the coordinates and a normal at the intersection are determined. The result is said to be a method which offers the possibility of reducing the computational expense and time to produce high quality ray traced computer animation. However, the method suffers from a number of problems for general purpose, and in particular real-time, computer graphics. For example, the method starts with a superellipsoid which is then subdivided to generate uniform triangles to be approximated with steiner patches. The uniform sub-division is essential to ensure that a single normal is defined at a vertex which is shared by more than one triangle, and thereby allow smooth shading of the resulting steiner patch tessellation. However, these requirements are unduly restrictive and can lead to modelling inaccuracies and inefficiency. Also, the ray-tracing technique used for rendering can further increase computational requirements.

In 3D computer graphics, in order to display an image of a model of an object, it is necessary to calculate the light intensity values produced in the image by the object surface.

Some techniques for doing this, such as ray-tracing methods, calculate a light value for each pixel in the image. However, these methods are computationally expensive and are often unsuitable for real-time applications.

Other techniques calculate a lighting value for only some pixels in the image and calculate the values for the remaining pixels by interpolation. This is known as Gouraud shading and is carried out by calculating a light intensity value at the vertices of the polygons which make up the model of the object to be displayed, and then interpolating between these vertex values. Even with this method, however, a lighting value must be calculated for each vertex of each polygon in the model, and therefore as the number of polygons increases, (for example to model an object more accurately), the number of lighting calculations to be performed also increases. Further, the method can produce inaccuracies in an image since, as noted above, the lighting values for points inside each polygon are determined by interpolation rather than direct calculation. These inaccuracies increase as the curvature of the object surface modelled by the polygons increases. This is because the true light intensity value varies more across a polygon as the curvature of the object surface modelled by the polygon increases (and, if a larger number of smaller polygons are used, then the number of vertices, and hence the number of lighting calculations, increases).

In 3D computer graphics, and in particular interactive real-time computer graphics, the computer model of an object is processed many times to transform it between different 3D coordinate systems (for example the 3D "object space" in which the model is stored and the 3D "world space" for all objects and light sources etc). To perform each transformation, all of the points defining the model must be transformed, which is computationally expensive.

Accordingly, many computer models attempt to use a small number of points to model an object to reduce the number of calculations required to perform a transformation, and then, after transformation, perform processing to produce a model defined by a larger number of points for rendering to display an image.

For example, in one approach, a parametric surface patch, such as a Bezier patch or B-spline patch, is used to represent a part of the object surface. After transformation, in order to render an image of the object, the surface patch is sub-divided into flat polygons, which are then rendered in a conventional manner.

A number of methods for processing a represenation of a surface portion to define polygons for rendering are known.

For example, it is known from "Computer Graphics Principles and Practice" by Foley, van Dam, Feiner and Hughes, Second Edition, Addison-Wesley Publishing Company, ISBN 0-201-12110-7, pages 523–528 to recursively or iteratively sub-divide Bezier patches, effectively generating more points which are a closer approximation to the actual object surface. Rendering may then be performed by using the points to define flat edged polygons, usually quadrilaterals or, preferably, triangles, whereafter individual pixels are allocated to the regions within the polygons by a process known as scan conversion. After each iteration, it is necessary to determine whether sufficient divisions have been made, and therefore a flatness test is performed after each sub-division has been executed.

The above referenced "Computer Graphics Principles and Practice" also discloses that an alternative to performing a flatness test after each sub-division is to perform recursive sub-division down to a fixed depth, thereby avoiding the flatness test at the cost of some extra sub-division.

EP-A-0366463 discloses a method of shading a graphics image in which a triangular facet forming part of a three-dimensional curved surface is recursively divided into sub-triangles until the sub-triangles are flat enought for Gouraud shading. The depth of recursion is determined by performing a test at each level of recursion, including the zeroth, by calculating a unit-length surface normal vector for each vertex of the triangle or sub-triangle and comparing them by calculating their dot products to determine how close they are to unity. If each of the three dot products exceeds a predetermined value, it is assumed that the surface in the vicinity of the triangle/sub-triangle is planar. It is disclosed that, in addition, recursion may be a function of the size of the sub-triangle, and that fixing the depth of recursion at four recursion calls for each triangle (thereby dividing it into 256 sub-triangles) had been found to provide satisfactory results.

EP-A-0596667 discloses a method of sub-dividing a Bezier patch in which the curvature of the patch is tested prior to sub-division in order to determine the level of sub-division to perform.

In 3D computer graphics, and in particular interactive real-time computer graphics, the computer model of an object is processed many times to transform it between different 3D coordinate systems (for example the 3D "object space" in which the model is stored and the 3D "world space" for all objects and light sources etc). To perform each transformation, all of the points defining the model must be transformed, which is computationally expensive.

Accordingly, many computer models attempt to use a small number of points to model an object to reduce the number of calculations required to perform a transformation, and then, after transformation, perform processing to produce a model defined by a larger number of points for rendering to display an image.

For example, in one approach, a parametric surface patch, such as a Bezier patch or B-spline patch, is used to represent a part of the object surface. After transformation, in order to render an image of the object, the surface patch is sub-divided into flat polygons, which are then rendered in a conventional manner.

Conventional methods suffer from a number of problems, however. For example, the processing required to convert a representation into polygons for rendering can be computationally expensive and time consuming, particularly for objects which are modelled with a large number of representations, and also in cases where a sequence of frames of image data are generated, with the processing performed for each representation in each frame.

The present invention has been made with such problems in mind.

In one aspect, the present invention aims to provide a further sub-division method.

According to the present invention there is provided a processing apparatus or method for use in rendering an image of a three-dimensional object surface in which a first model of the surface comprising polygons is converted into a second model of the surface again comprising polygons via a plurality of surface patches.

The invention also comprises a processing method or apparatus in which a parametric surface patch is defined for at least some of the polygons making up a model of a curved surface, and a larger number of smaller polygons approximating the surface are then generated using the surface patches. The smaller polygons need not lie in the same plane as an original polygon, and hence can better model the curved surface.

The invention further comprises a processing apparatus or method in which polygons modelling at least part of a curved surface in three-dimensions are processed to define a respective curved surface patch for each polygon, and processing is then performed to replace each original polygon with different polygons having vertices dependent upon the corresponding surface patch.

Embodiments of the invention enable conventional polygonal models, which are widely used in many 3D computer graphics applications, to be replaced with more accurate polygonal models. The replacement models can then be rendered by evaluating conventional ambient, diffuse and/or specular lighting equations, and need not be ray-traced.

According to the present invention there is provided a processing apparatus or method in which a polygon which forms part of a model of a three-dimensional object is shaded by:
  computing a surface patch which defines light intensity values for the polygon;
  calculating the light intensity value at a plurality of points using the surface patch; and
  interpolating between the calculated light intensity values.

The points at which light intensity values are calculated using the surface patch may correspond to the vertices of further polygons into which the original polygon is divided, or may be additional points within the polygon which are used to increase the number of points for which lighting values are available and hence increase the accuracy of the subsequent interpolation.

The invention also provides an apparatus or method for computing a surface patch defining lighting values for use in rendering a model of a three-dimensional surface.

The invention further provides an apparatus or method for calculating lighting values for a polygon, in which lighting values are calculated for a plurality of first points for the polygon, the calculated lighting values are used to define a surface patch, and the surface patch is used to calculate lighting values for a second plurality of points. The second plurality of points may be greater in number than the first plurality.

According to the present invention, there is provided an apparatus or method in which a representation of at least part of a curved 3D surface is sub-divided on the basis of a size of the representation.

The representation may be a polygon or a surface patch.

The size may be the area of the representation.

The size may be the size in a previous frame of image data or in the current frame.

The present invention also provides an apparatus or method for generating polygons for rendering in which the number of polygons is determined in dependence upon a size parameter of an initial representation.

According to the present invention, there is provided a method or apparatus for rendering a model of a three-dimensional object comprising a plurality of representations to generate image data for a plurality of frames, in which each representation is divided into the same number of polygons for a given frame and data defining the polygons is stored for subsequent use in a frame which requires the representations to be divided to the same extent.

In this way, a test can be performed for each frame to determine a sub-division depth for all of the representations in the model, and, if data defining the polygons for this depth is already stored, then the stored data can be used rather than having to recalculate the polygons. Otherwise, the polygons are calculated and the data stored for subsequent use.

The present invention also provides an apparatus or method for generating polygons for use in rendering an image of a three-dimensional object, in which the number of polygons to be generated is determined, and, if data for this number of polygons is already stored, then the stored data is used, whereas if the data is not already stored, data defining the polygons is generated.

The present invention also provides an apparatus or method for processing the representations making up a model of a three-dimensional object, in which each representation is converted into the same number of polygons for rendering. Data defining the polygons may then be stored for use in an image requiring the representations to be converted to the given number of polygons.

Embodiments of the invention will now be described, by way of example only, with reference to the accompanying drawings, in which like reference numbers designate the same or similar things. In the drawings.

Figure 2:
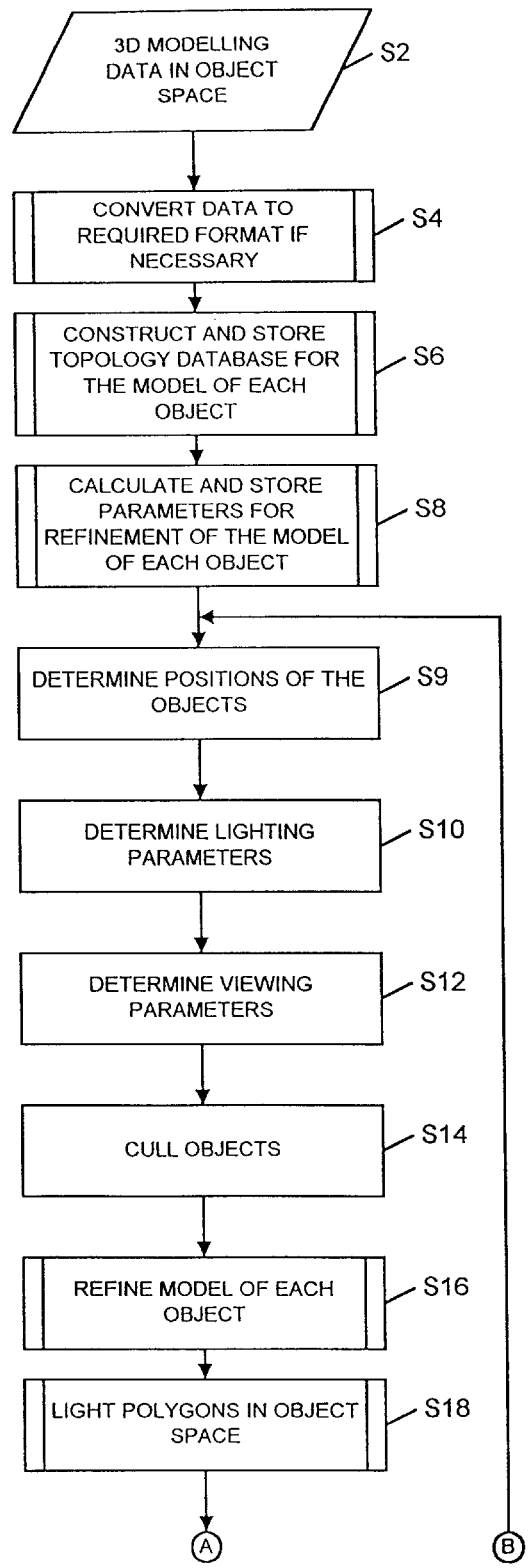
FIG. 2 shows the overall processing operations performed in the embodiment.
Figure 2:
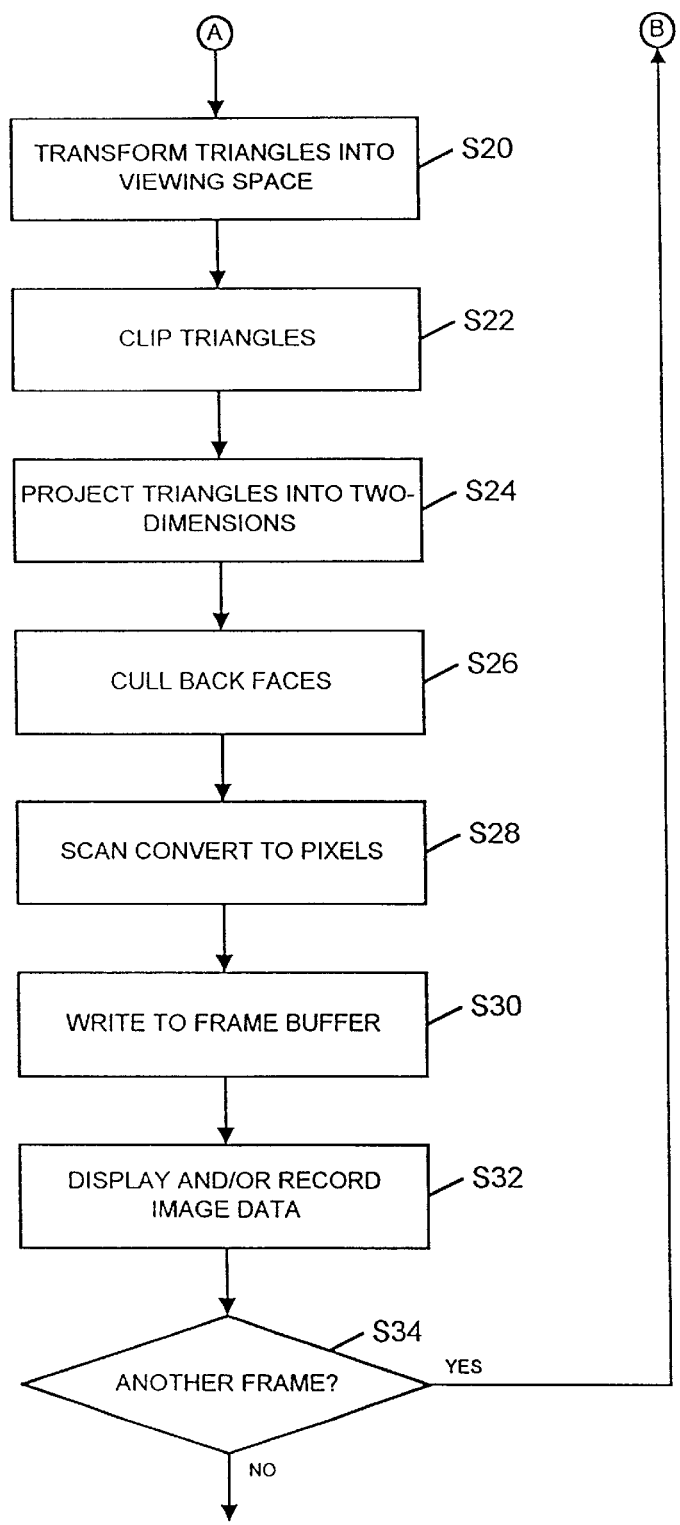
Figure 11:
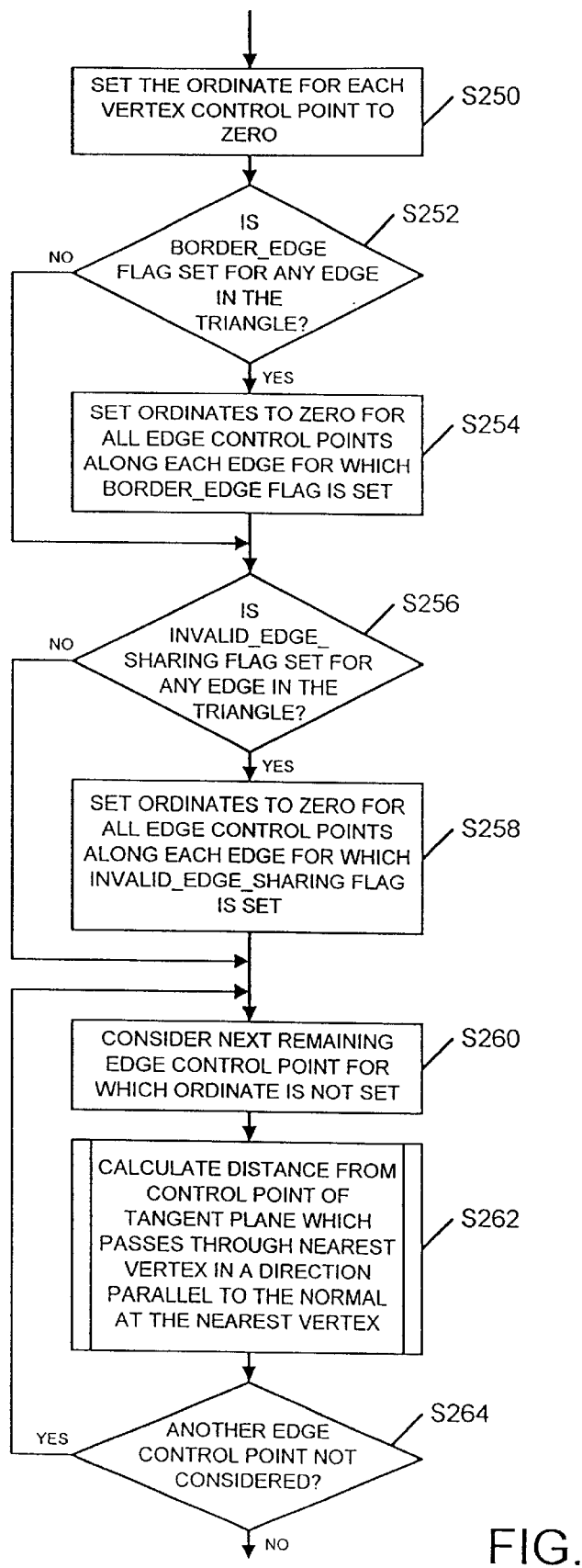
FIG. 11 shows the processing operations performed at step S234 in FIG. 9.
Figure 12:
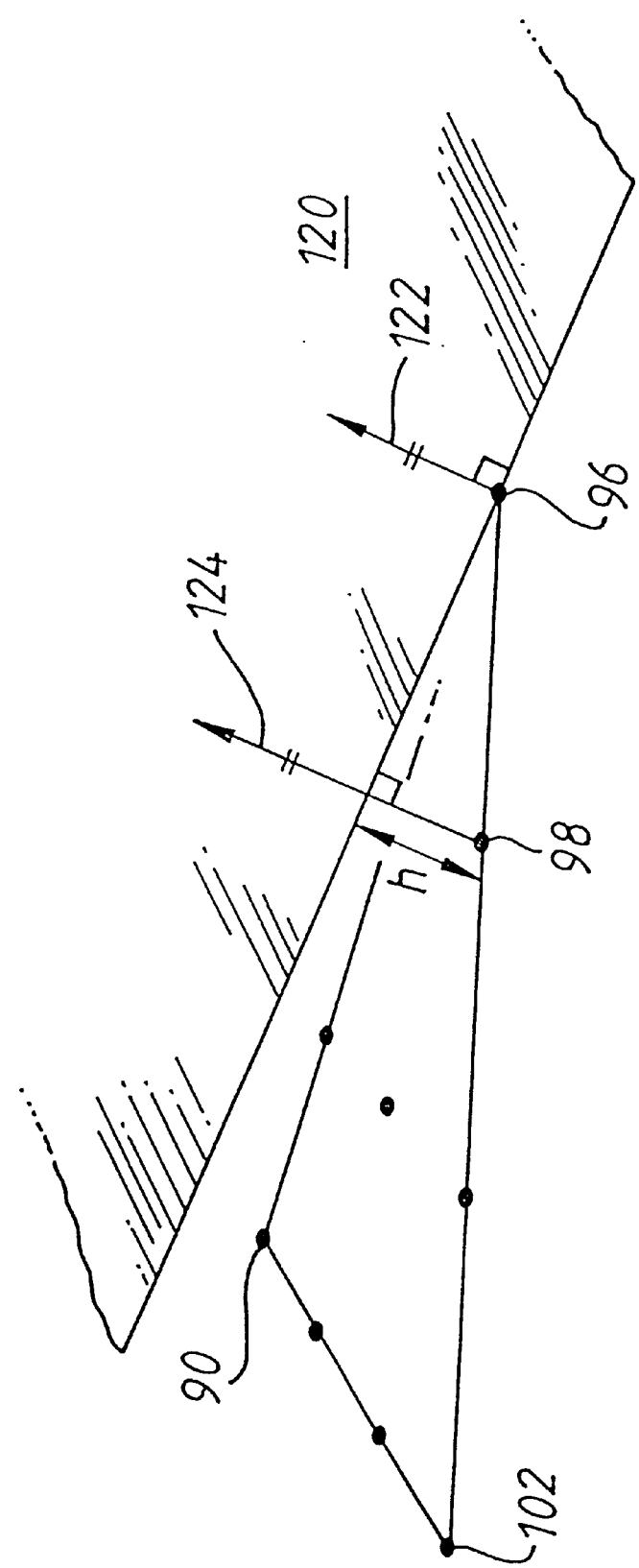
Figure 13:
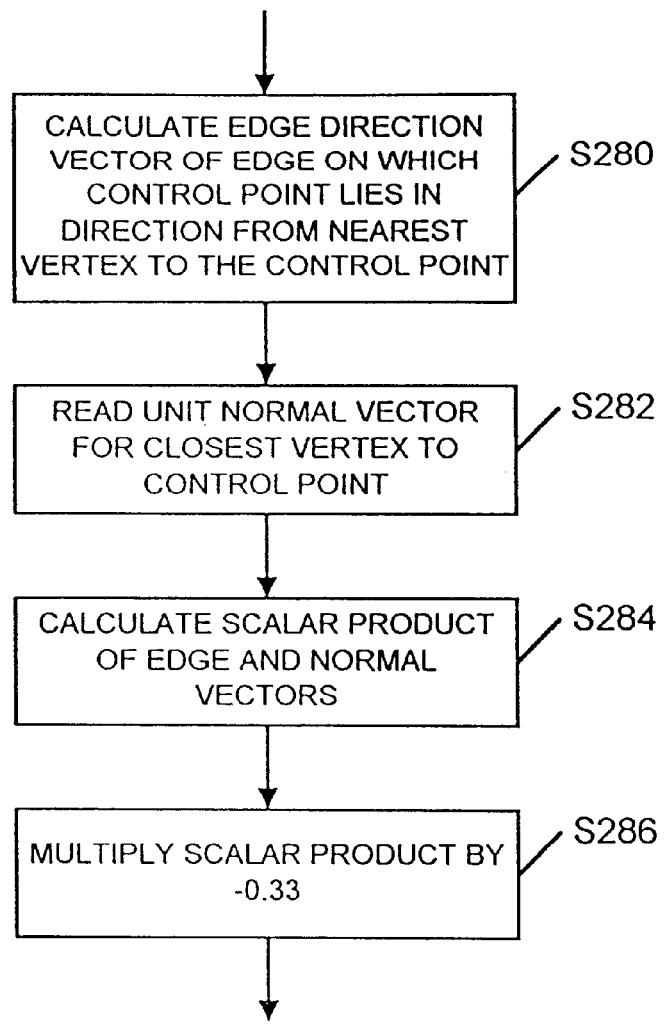
Figure 15:
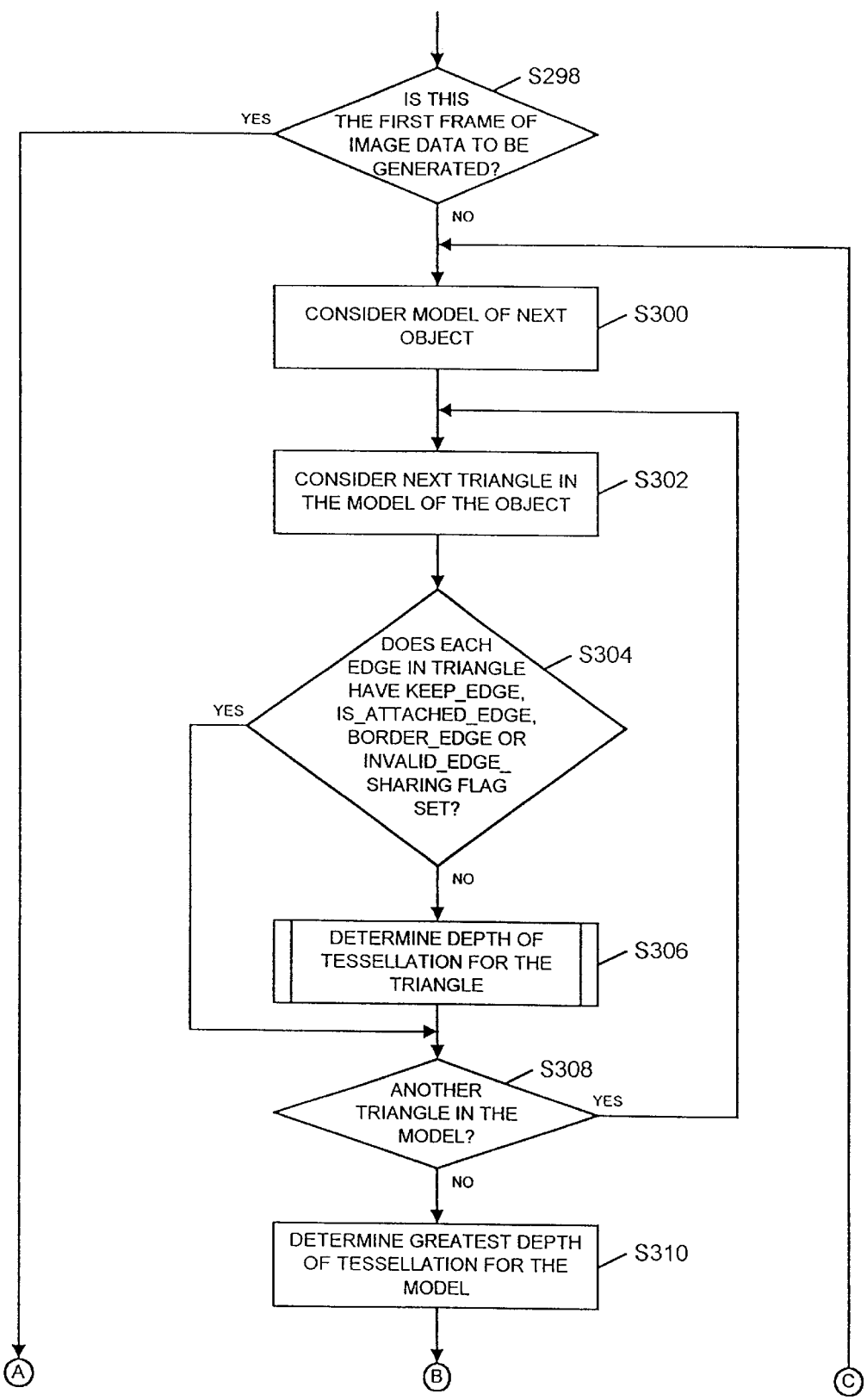
Figure 15:
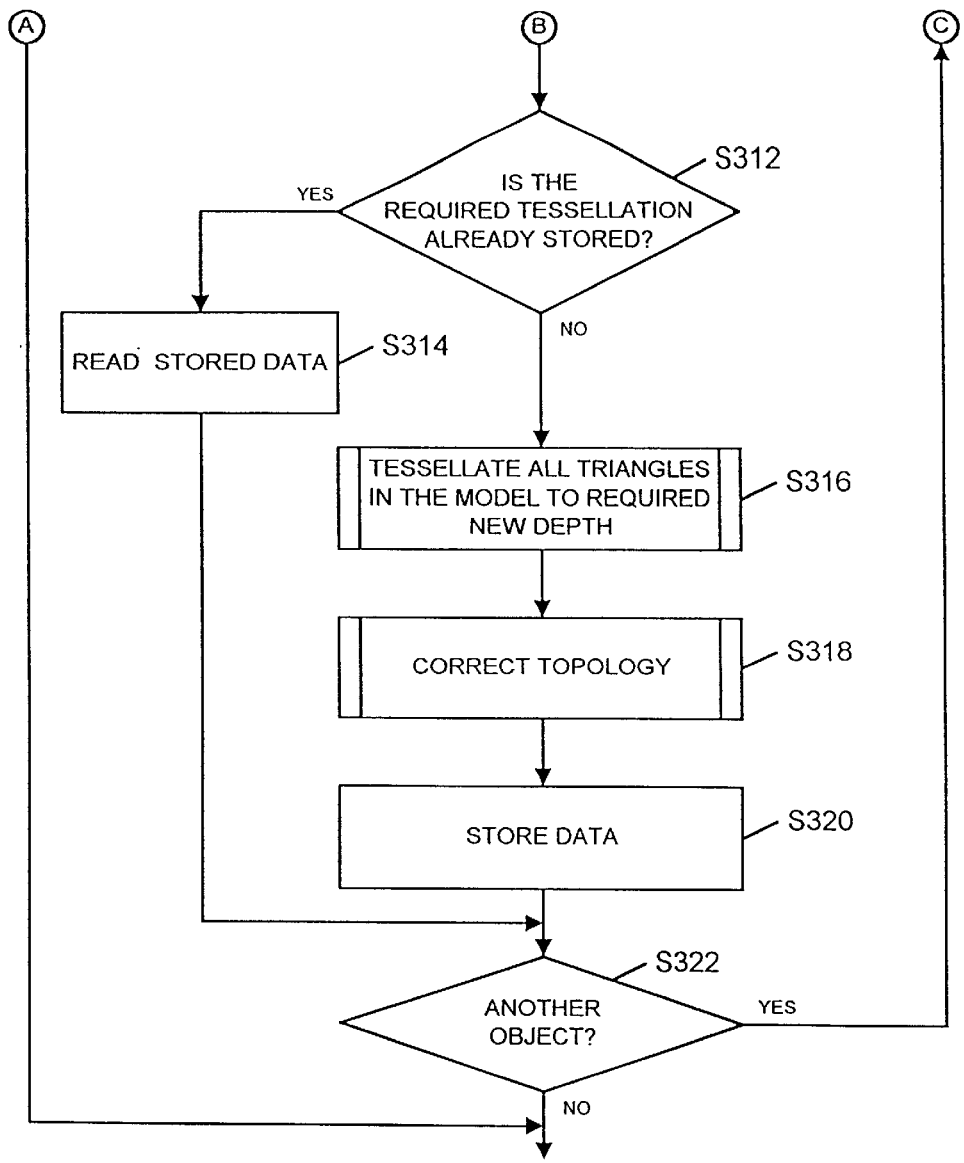
Figure 16:
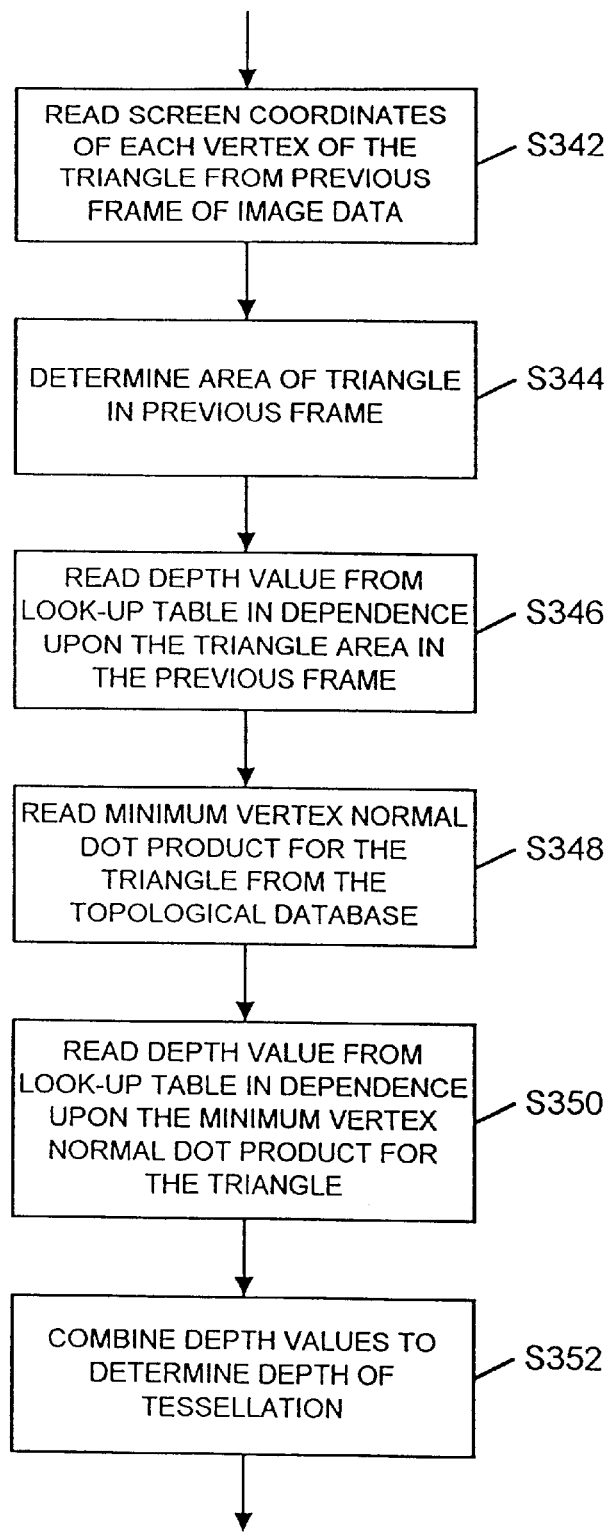
Figure 18:
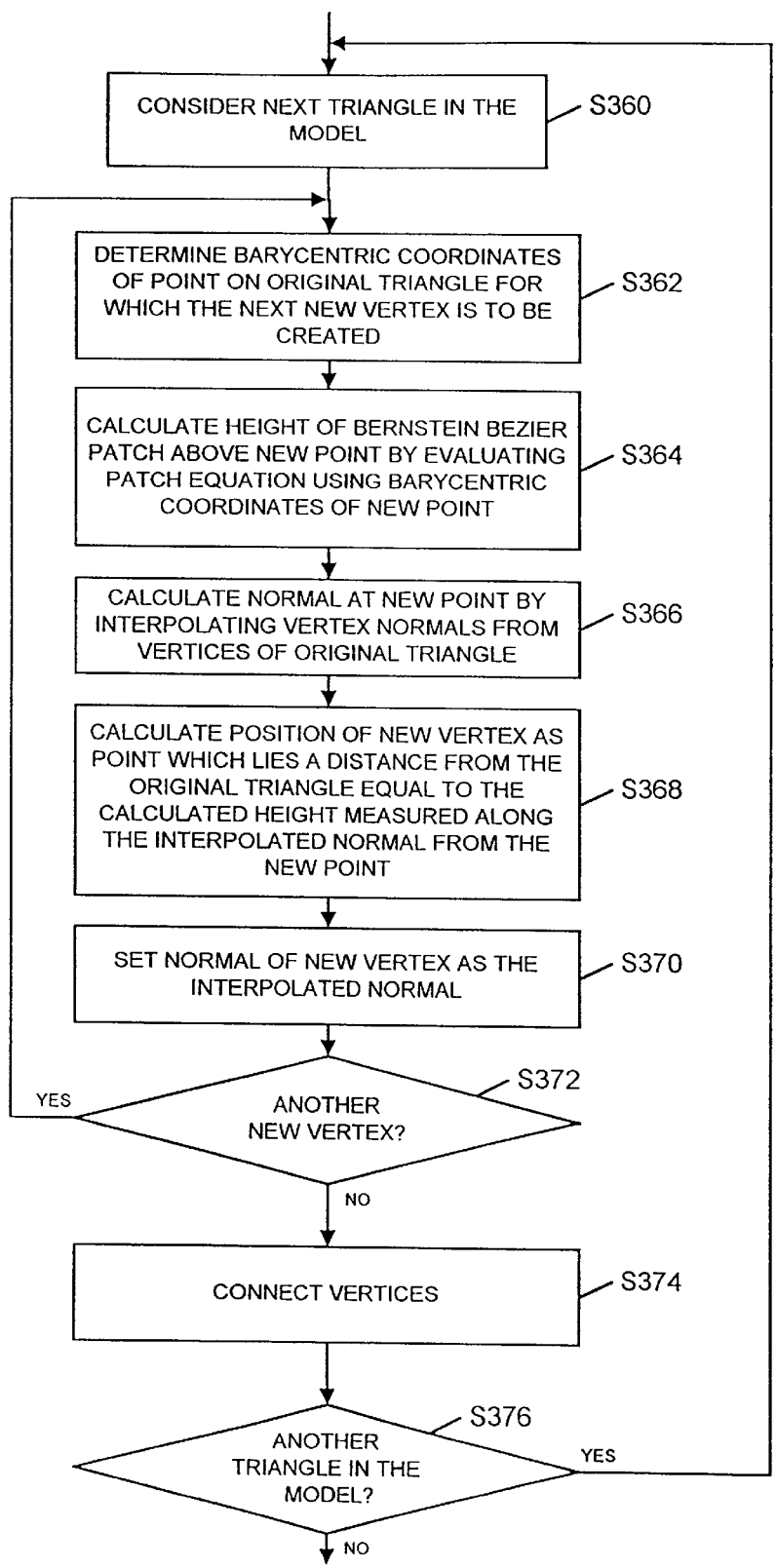
Figure 19A:
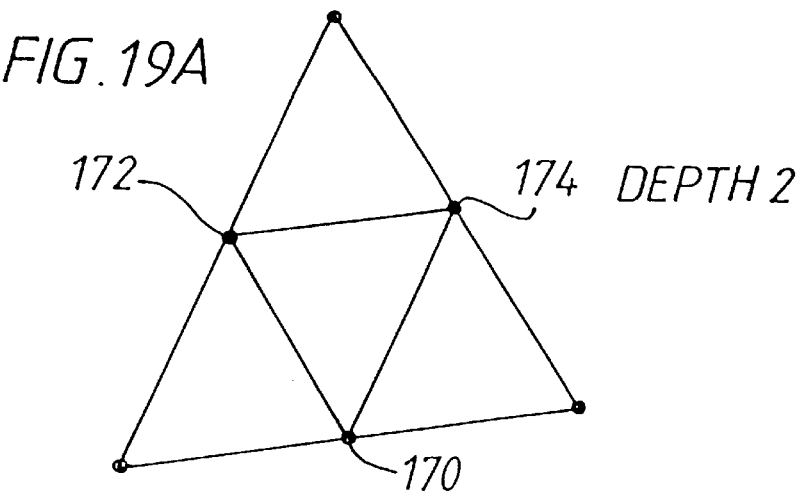
Figure 19B:
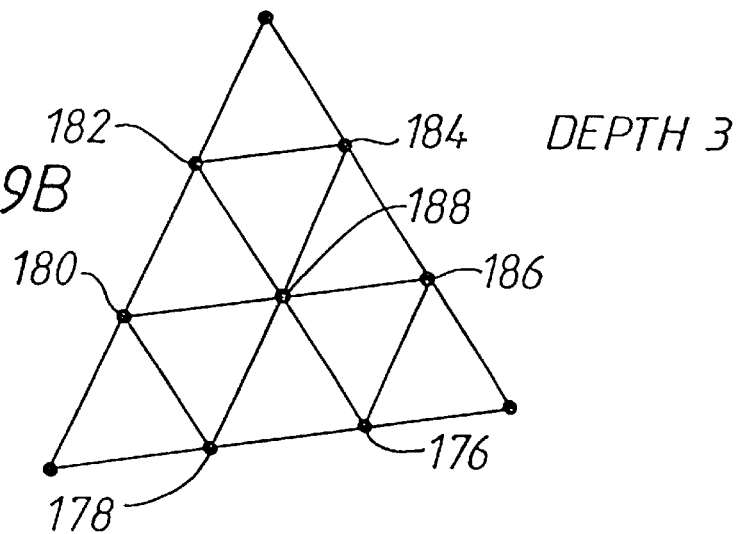
Figure 19C:
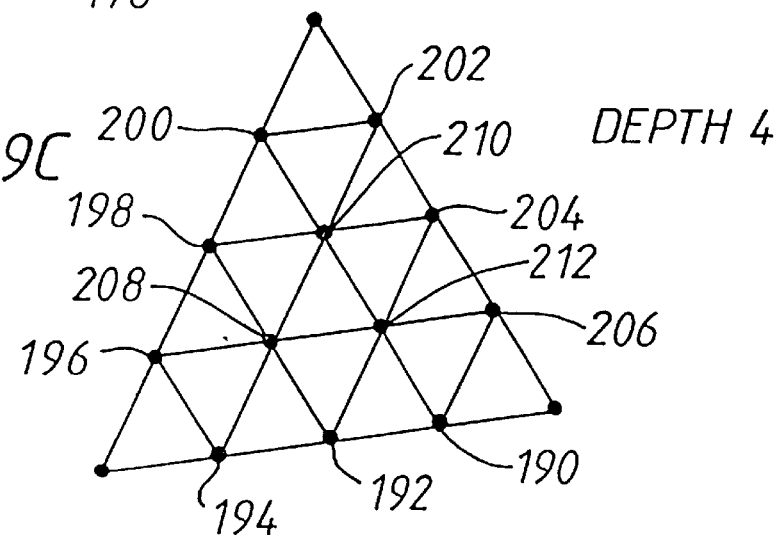
Figure 20:
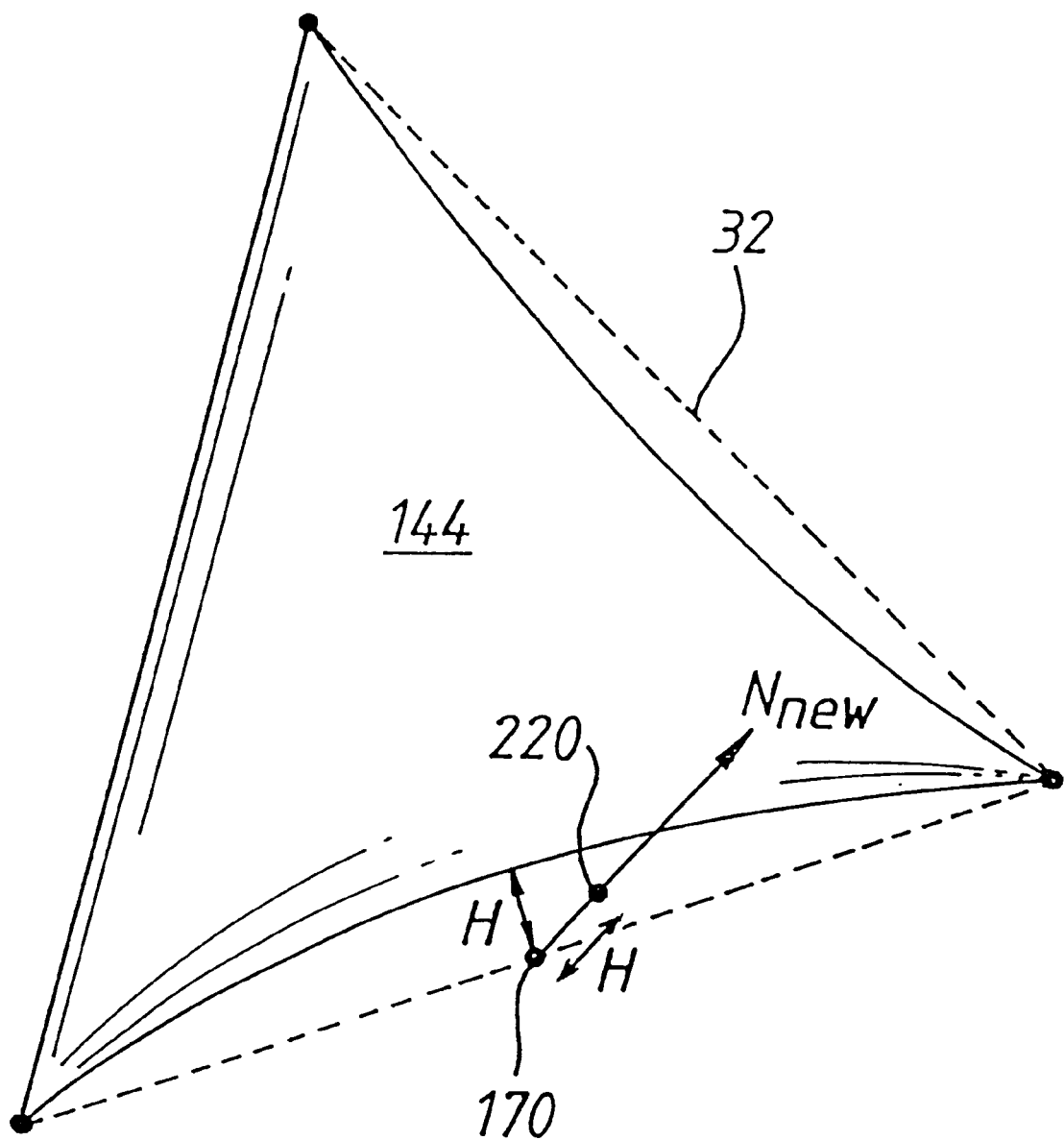
Figure 22:
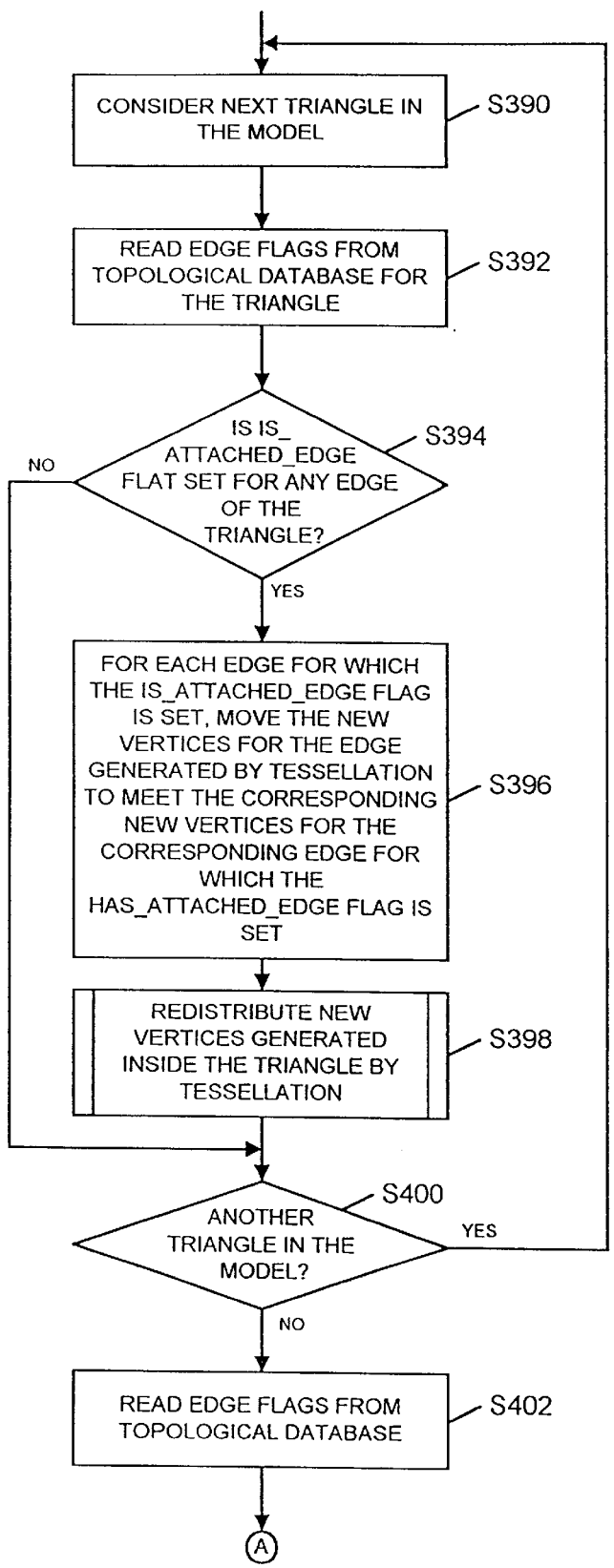
Figure 22:
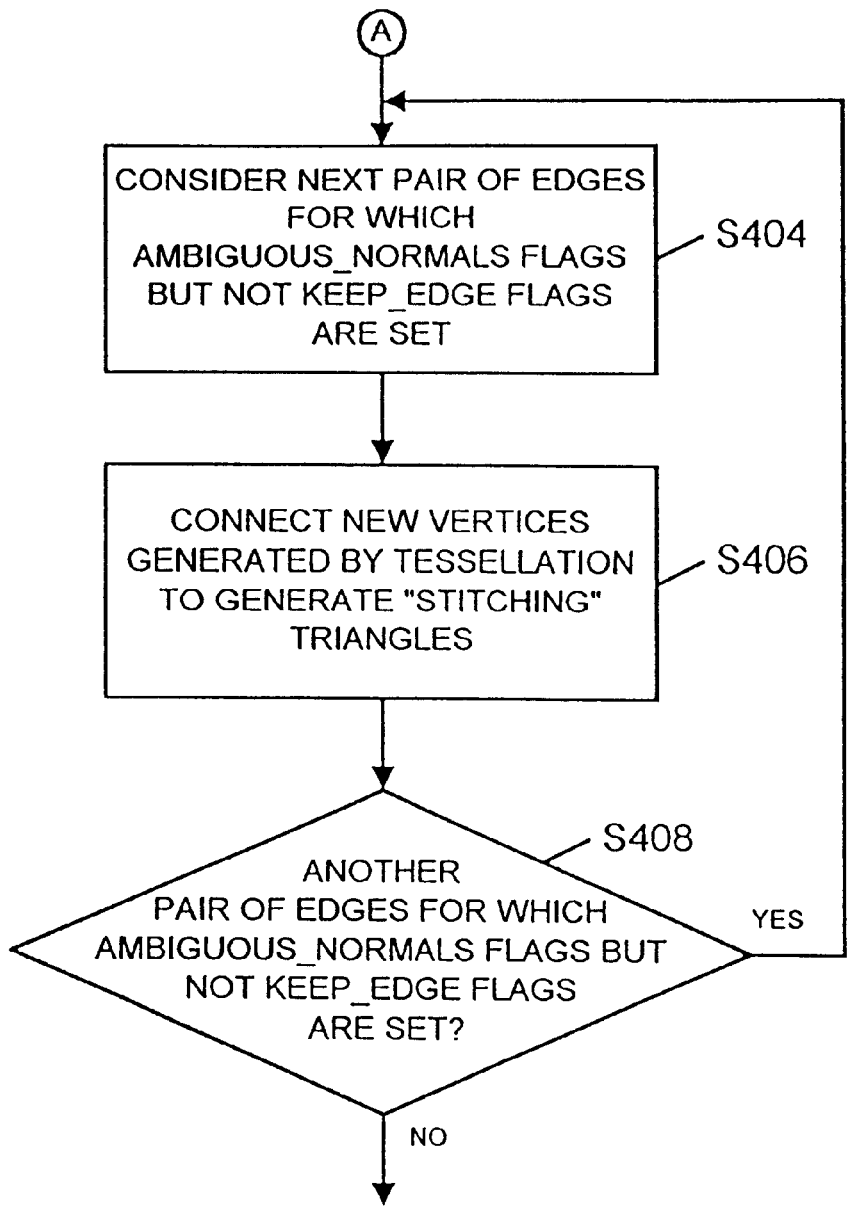
Figure 23A:
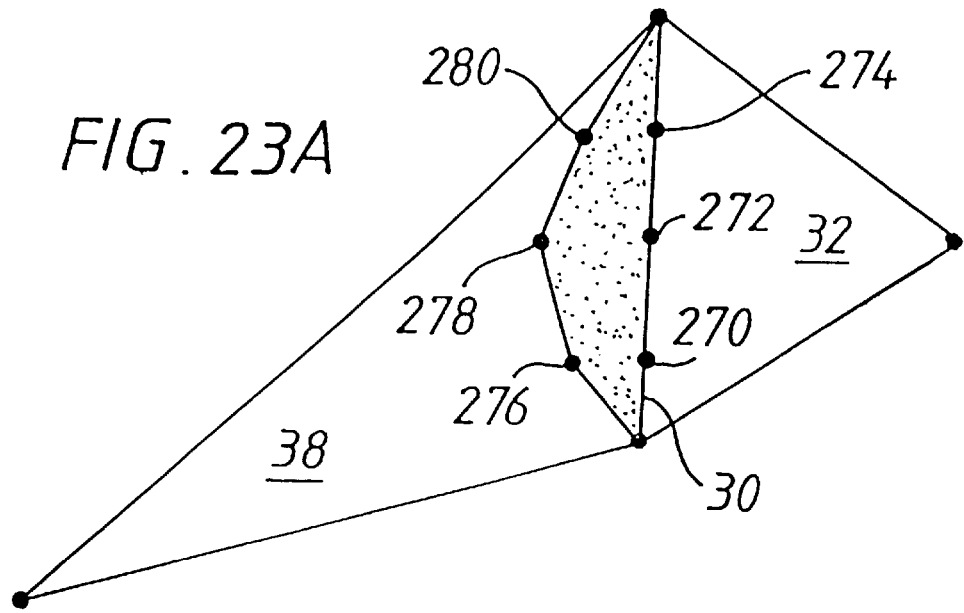
Figure 23B:
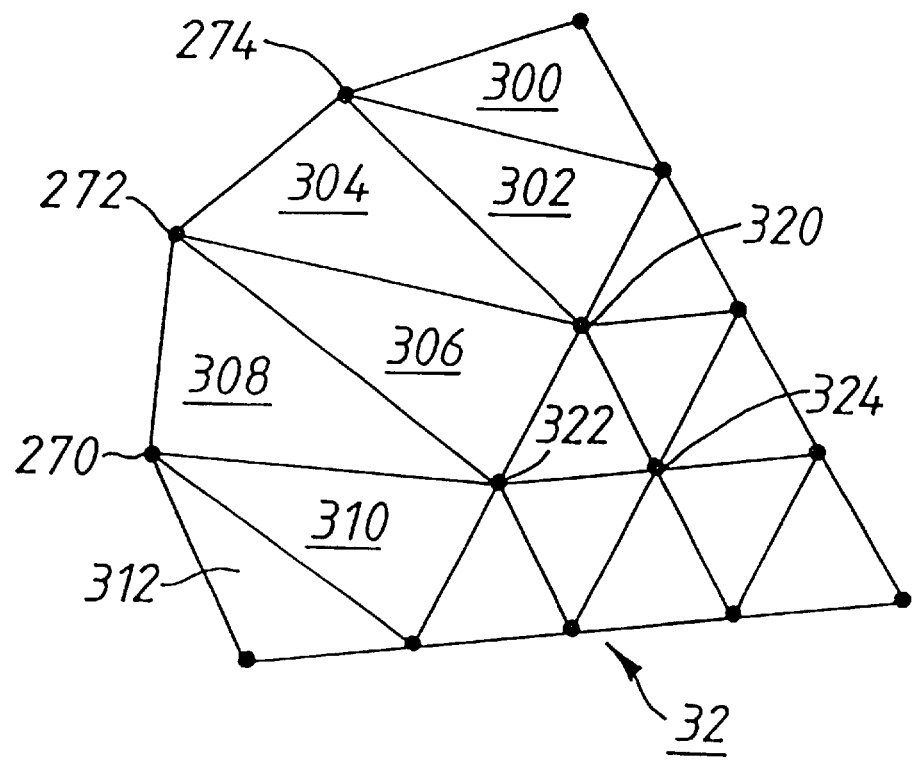
Figure 24:
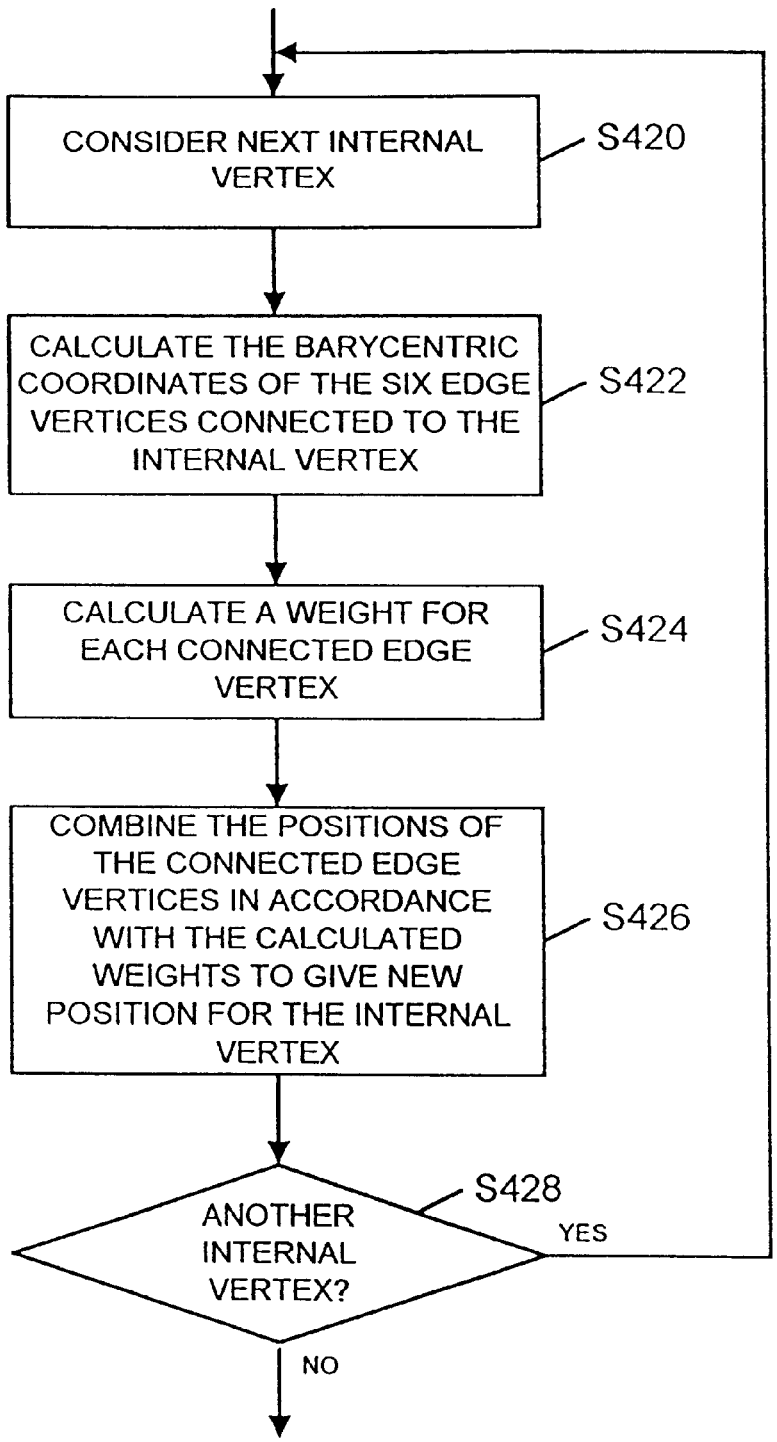
Figure 25:
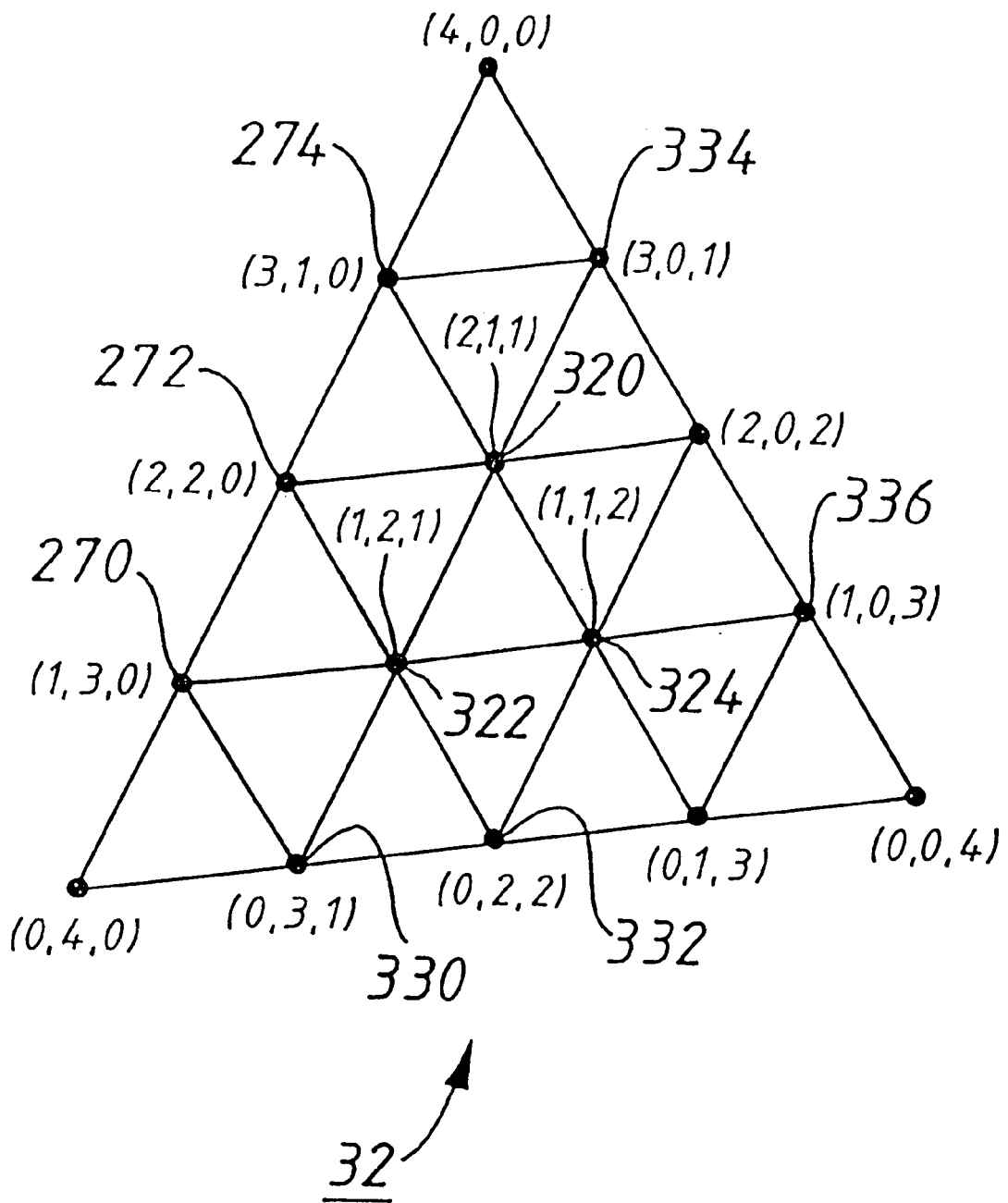
Figure 26A:
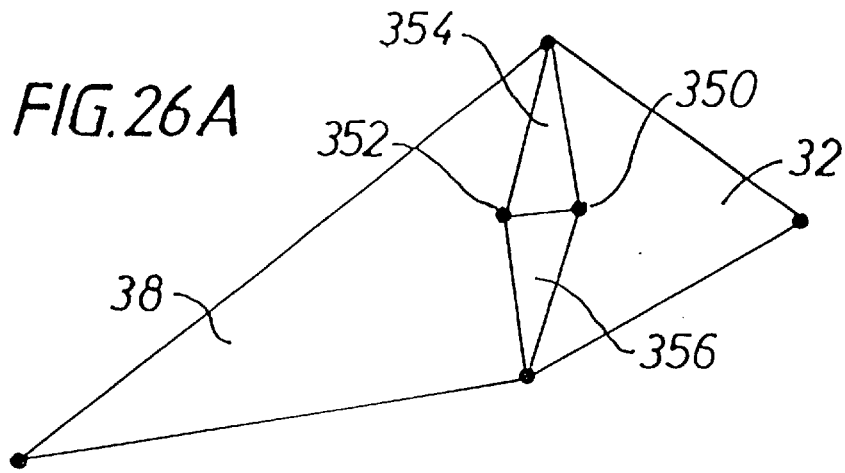
Figure 26B:
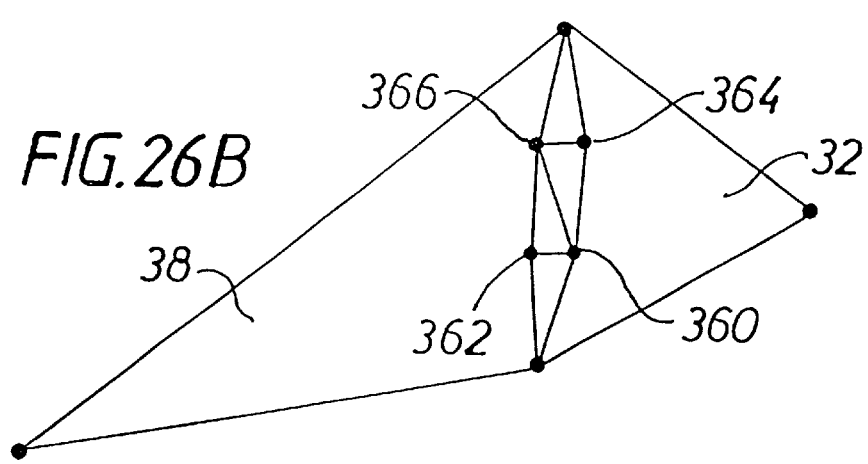
Figure 26C:
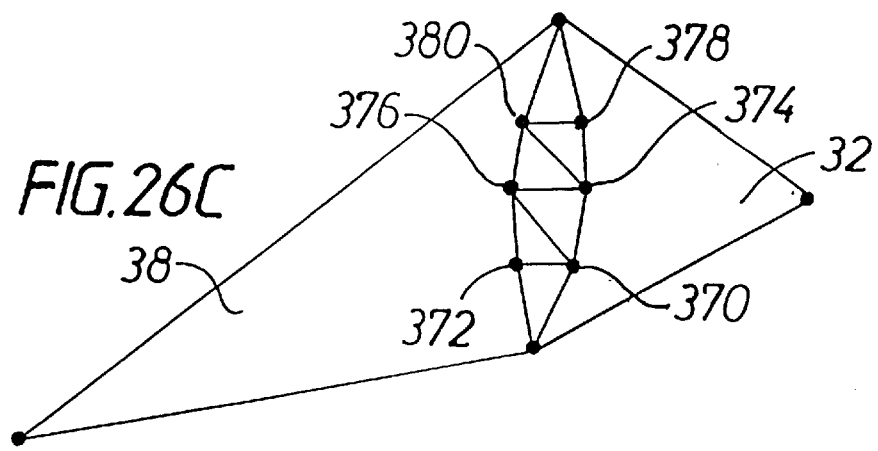
Figure 27:
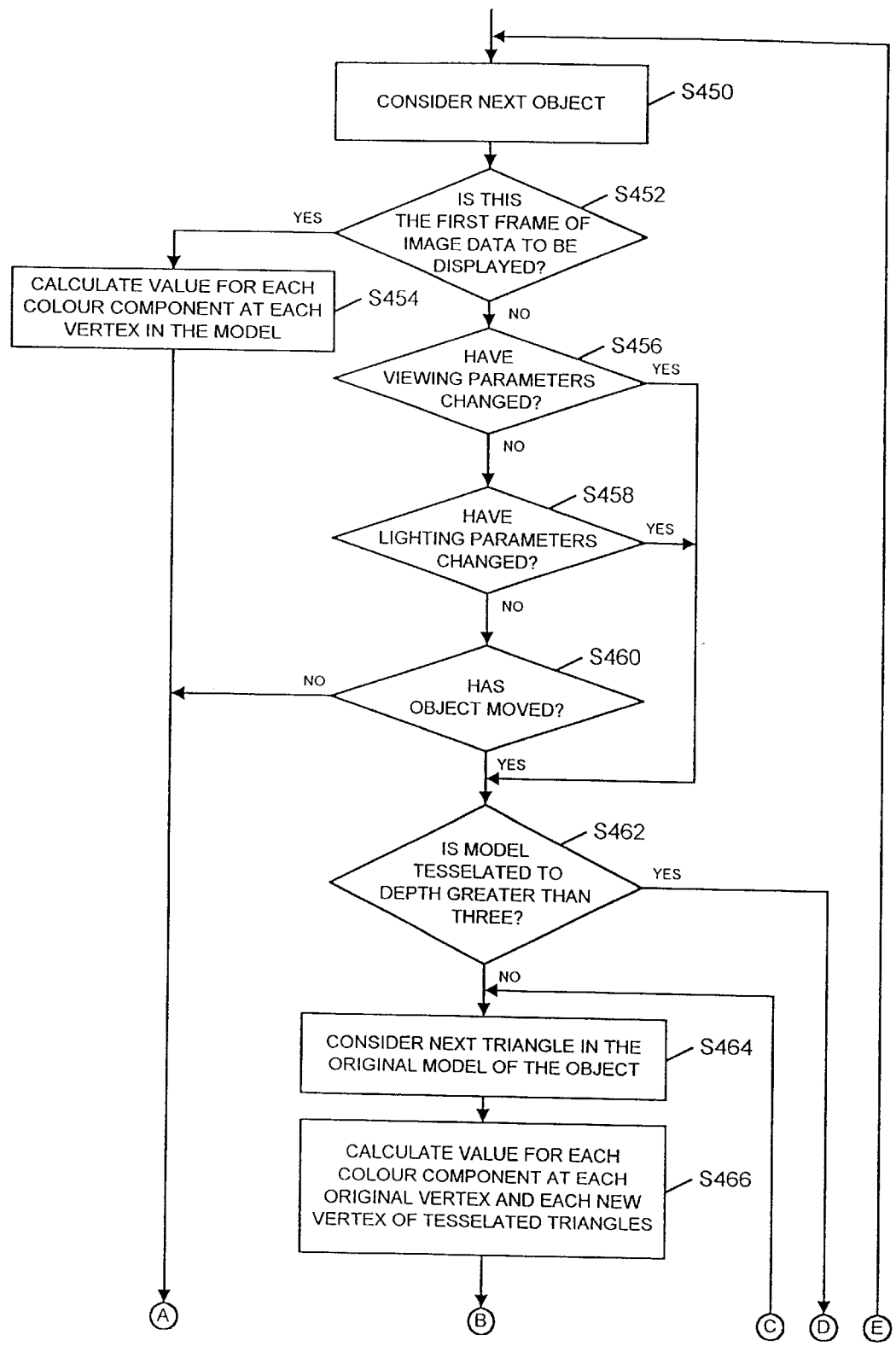
Figure 27:
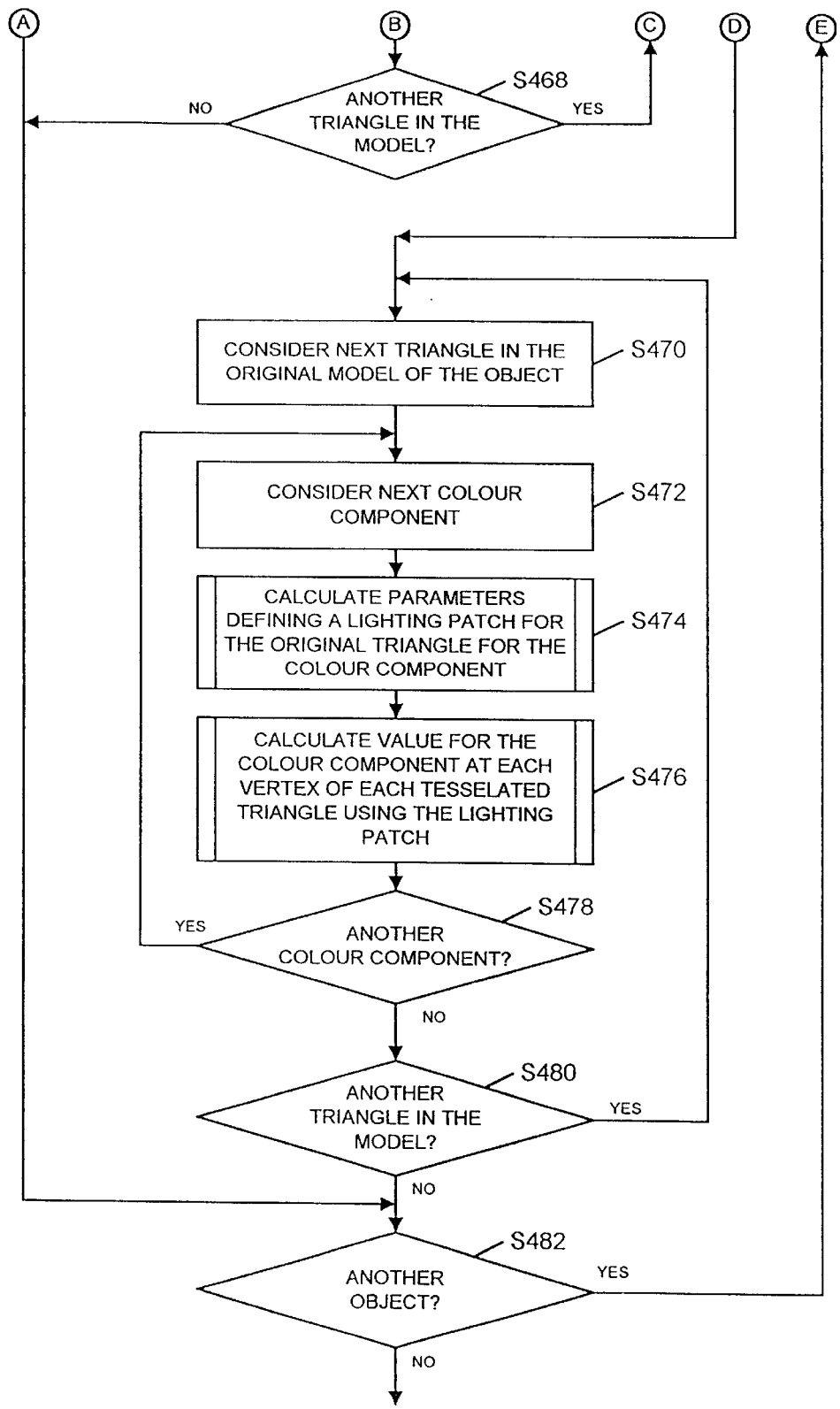
Figure 28:
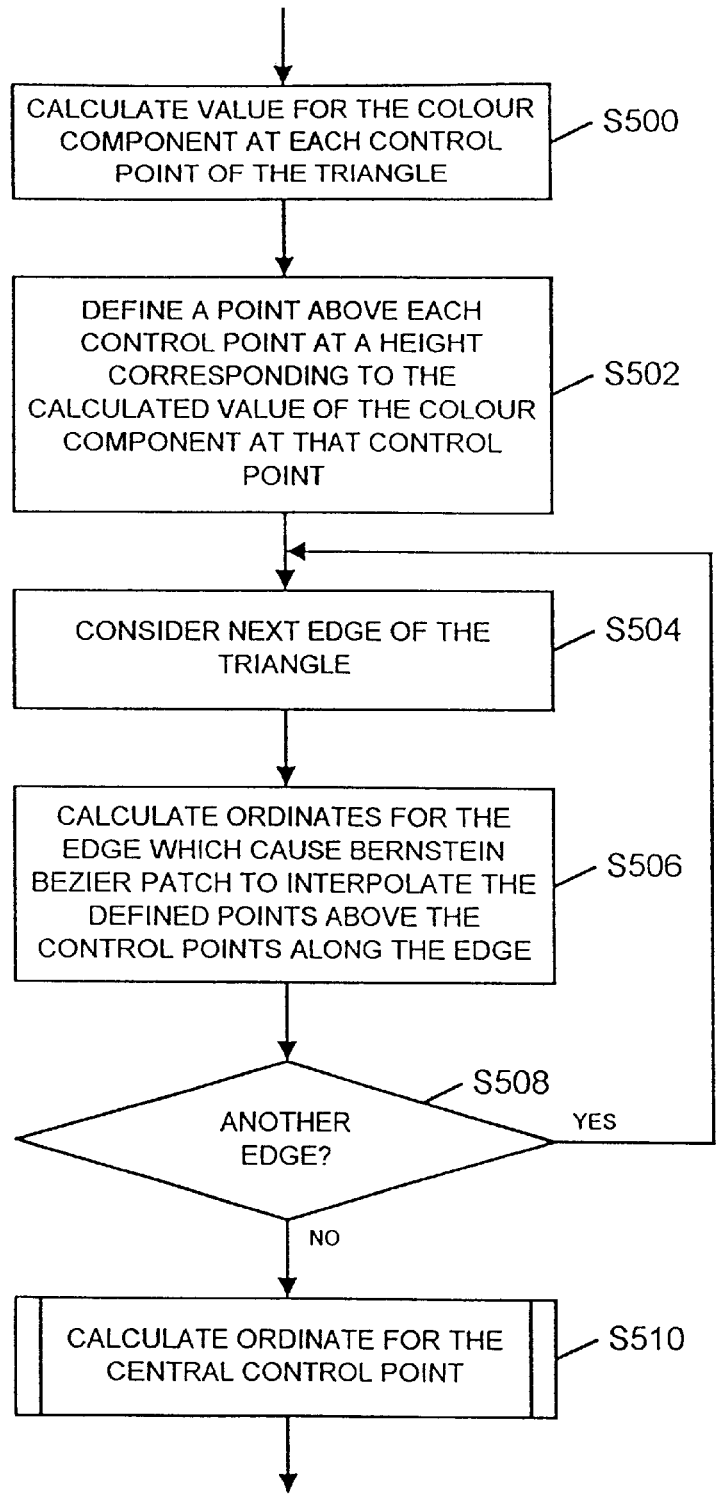
Figure 29A:
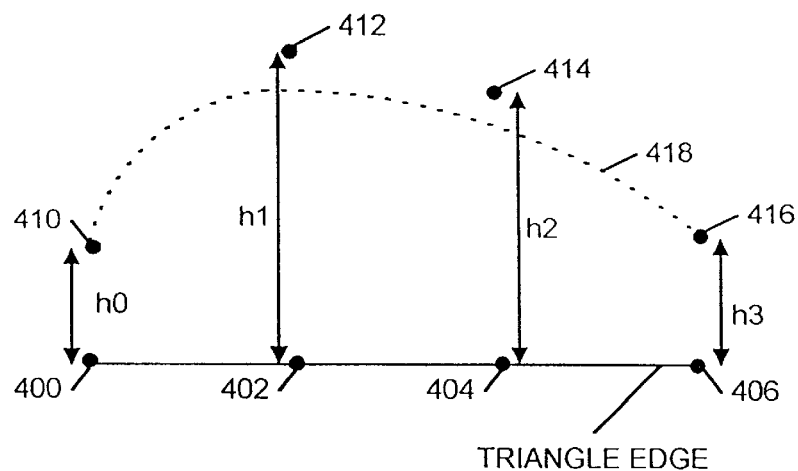
Figure 29B:
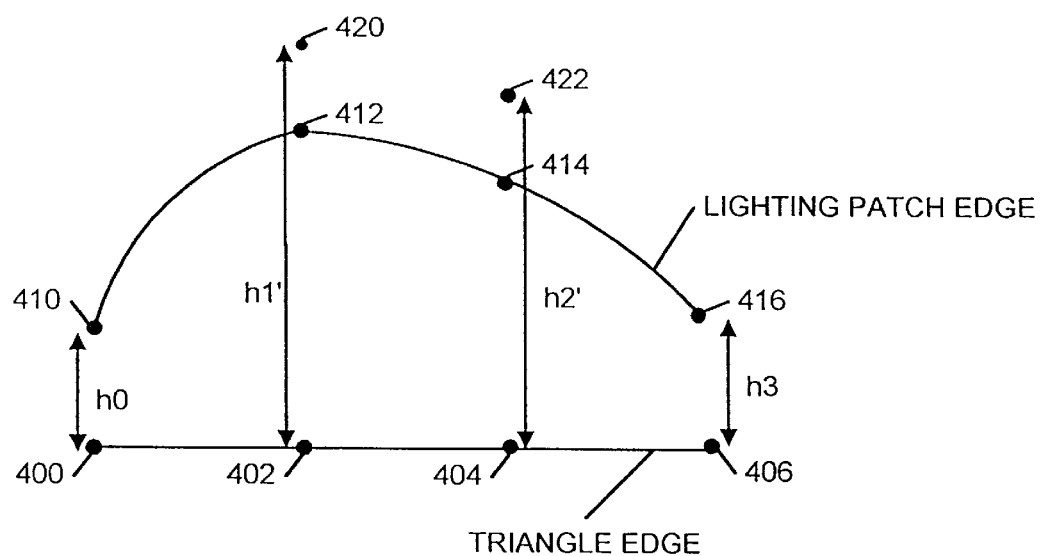
Figure 30:
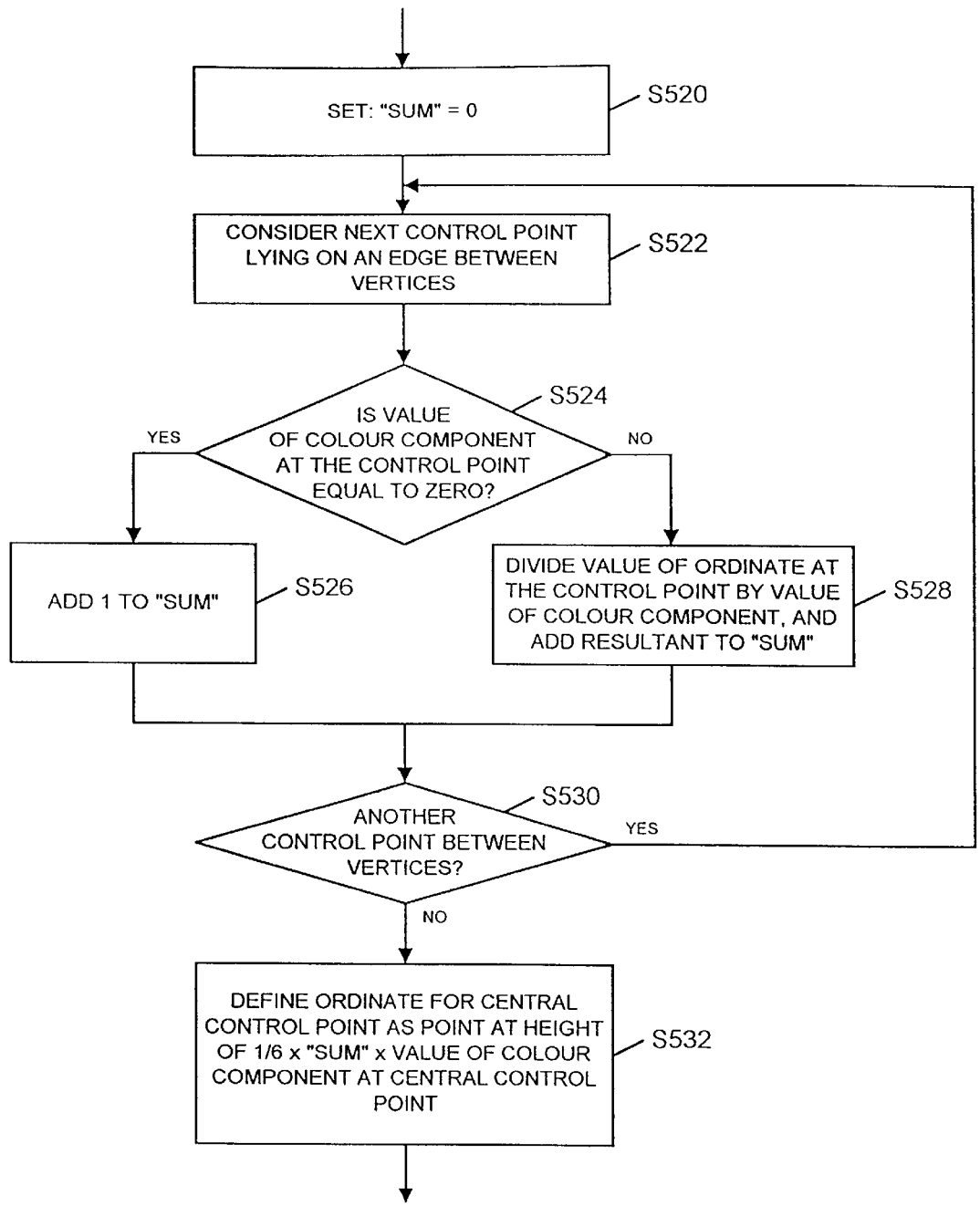
Figure 31:
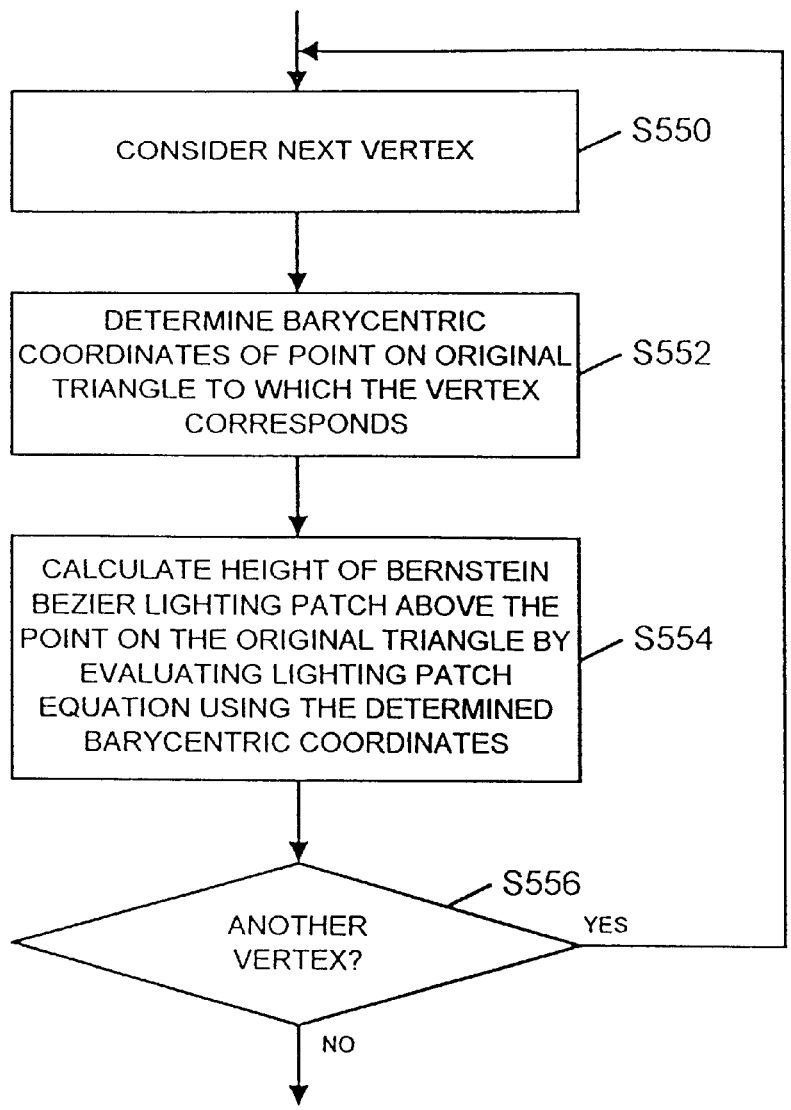

FIG. 12 schematically illustrates the distance calculated at step S262 in FIG. 11;

FIG. 13 shows the processing operations performed at step S262 in FIG. 11;

FIGS. 14A, 14B, 14C and 14D show examples of triangles and cubic Bernstein-Bezier triangular patches defined for the triangles in dependence upon the edge flags set for the triangles;

FIG. 15 shows the processing operations performed at step S16 in FIG. 2;

FIG. 16 shows the processing operations performed at step S306 in FIG. 15;

FIGS. 17A and 17B show the look-up tables used at steps S346 and S350 in FIG. 16, respectively;

FIG. 18 shows the processing operations performed at step S316 in FIG. 15;

FIGS. 19A, 19B and 19C show examples of triangles divided for tessellation to depth 2, depth 3 and depth 4, respectively;

FIG. 20 illustrates how the position of a new vertex is calculated at step S368 in FIG. 18;

FIGS. 21A, 21B, 21C and 21D show examples of triangles refined into smaller triangles by the operations performed at step S316 in FIG. 15;

FIG. 22 shows the processing operations performed at step S318 in FIG. 15;

FIGS. 23A and 23B illustrate the operations performed at step S396 in FIG. 22;

FIG. 24 shows the processing operations performed at step S398 in FIG. 22;

FIG. 25 shows the control points for a triangle tessellated to depth 4 and the barycentric coordinates for each control point;

FIGS. 26A, 26B and 26C illustrate the processing operations performed at step S406 in FIG. 22;

FIG. 27 shows the processing operations performed at step S18 in FIG. 2;

FIG. 28 shows the processing operations performed at step S474 in FIG. 27;

FIGS. 29A and 29B illustrate the processing operations performed at step S506 in FIG. 28;

FIG. 30 shows the processing operations performed at step S510 in FIG. 28;

FIG. 31 shows the processing operations performed at step S476 in FIG. 27; and

Figure 32:
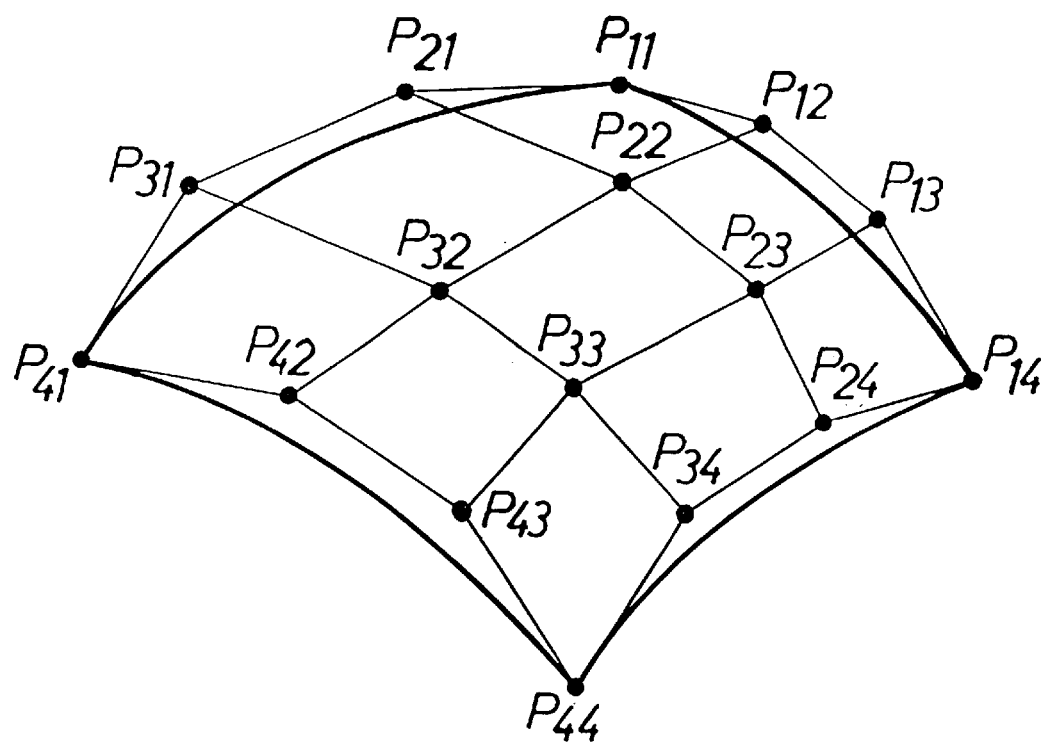

FIG. 32 shows the control points which define a Bezier patch.

Figure 1:
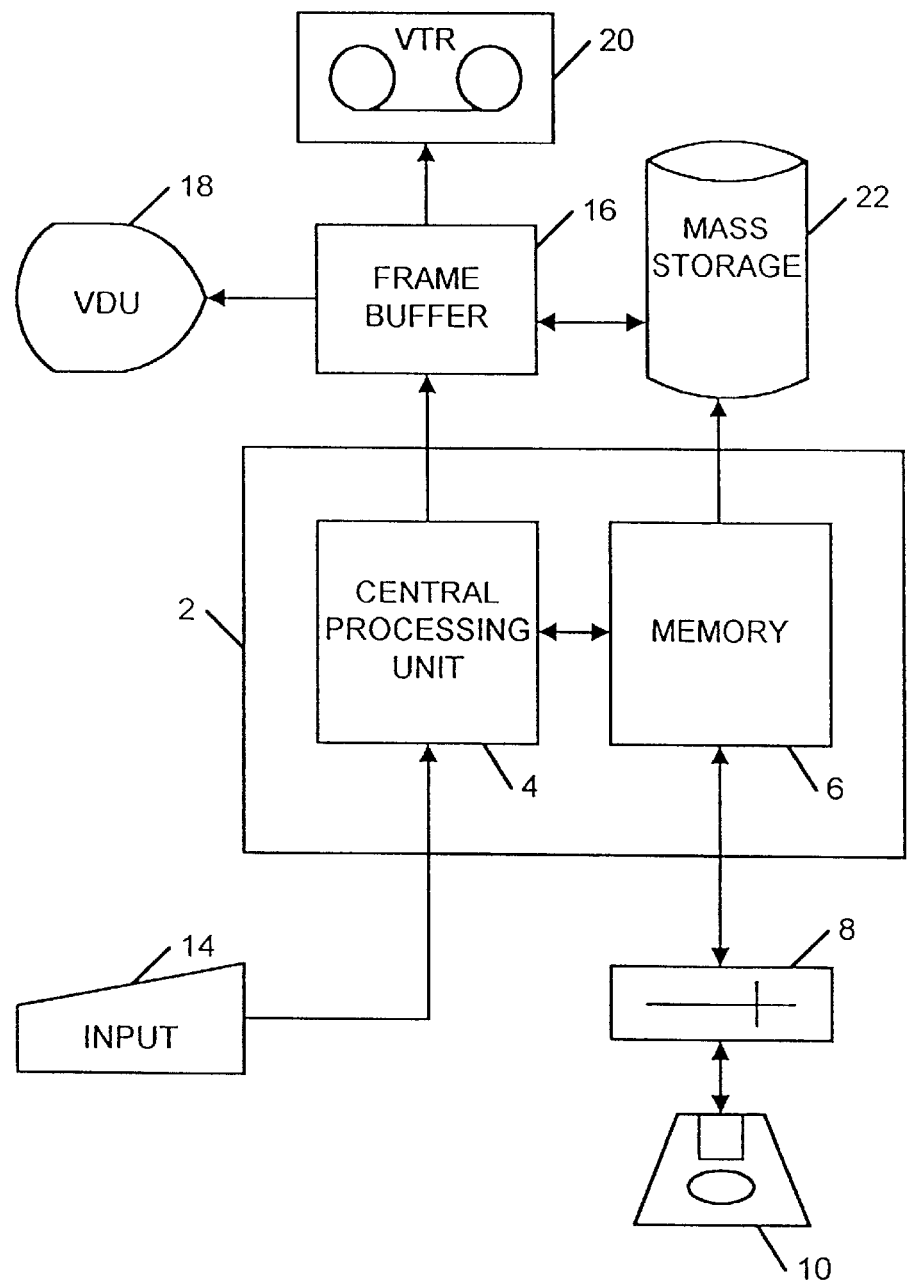
FIG. 1 is a block diagram showing the functional components of an embodiment.

Referring to FIG. 1, there is shown a block diagram of the functional components of a 3D graphics processing apparatus in an embodiment.

In the apparatus, there is provided a programmable computer 2, which comprises a central processing unit (CPU) 4 connected to a memory 6 operable to store a program defining the operations to be performed by the CPU 4, data to be processed by CPU 4 and data processed by CPU 4.

Coupled to the memory 6 is a disk drive 8 which is operable to accept removable data storage media, such as a disk 10, and to transfer data stored thereon to the memory 6.

Coupled to an input port of CPU 4, there is a user instruction input device 14, which may comprise, for example, a keyboard and/or a position-sensitive input device such as a mouse, trackerball etc.

Also coupled to the CPU 4 is a frame buffer 16, which comprises a memory unit arranged in a conventional manner to store image data relating to at least one image generated by the CPU 4. One (or several) memory location(s) are provided for a pixel of the image, and the value stored in the frame buffer for each pixel defines the colour or intensity of that pixel in the image.

Coupled to the frame buffer 16 is a display unit 18 for displaying images using the image data stored in the frame buffer 16 in a conventional manner. Also coupled to the frame buffer 16 is a video tape recorder (VTR) 20 or other image data recording device.

A mass storage device 22, such as a hard disk drive, having a high data storage capacity, is coupled to the memory 6 (typically via the CPU 4), and also to the frame buffer 16. The mass storage device 22 can receive data processed by the CPU 4 from the memory 6 or data from the frame buffer 16 which is to be displayed on display unit Operating instructions for causing the computer 2 to perform as an embodiment to the invention can be supplied commercially in the form of programs stored on a disk 10 or another data storage medium (and input into computer via disk drive 8), can be transmitted as a signal to computer 2, for example over a datalink (not shown) such as the Internet, or can be entered by a user via input device 14, so that the receiving computer 2 becomes reconfigured into an apparatus embodying the invention.

Data to be processed by the CPU 4 may be input to the computer 2 from a removable data storage medium using the disk drive 8. Alternatively, or in addition, data to be processed may be downloaded into memory 6 via a connection (not shown) from a local or remote database which stores the data. In addition, data to be processed may be transmitted to computer 2, for example as a broadcast signal. Thus, computer 2 may take the form of a "set-top box", that is the apparatus may be configured to be used with a television 18, to receive broadcast data, to process the data and to display processed images on the television 18.

FIG. 2 shows the processing operations performed in this embodiment by the apparatus of FIG. 1.

Referring to FIG. 2, the process starts at step S2 with three-dimensional modelling data defining one or more objects, each in a three-dimensional object space. This data comprises a polygonal mesh model of each object, which comprises the position of each polygon vertex making up the model in the 3D object space and connectivity information that can be considered to be lines connecting the vertices. The lines are the boundaries of the polygons in the model. The 3D modelling data also comprises information that defines the lighting characteristics of each polygon (that is, the ambient, diffuse and specular reflection coefficients of the polygon).

The 3D modelling data at step S2 may be input to computer 2 on a storage medium, such as disk 10, via disk drive 8, may be transmitted to computer 2 via a communication network such as the Internet, for example from another computer or a database, or may be received by computer 2 as a signal, for example a broadcast signal.

Alternatively, the 3D modelling data may be generated in computer 2 using a commercially available modelling package and instruction from a user via user input device 14.

At step S4, CPU 4 determines whether the 3D modelling data received at step S2 is in the required format, and, if it is not, converts the data to the necessary format.

Figure 3:
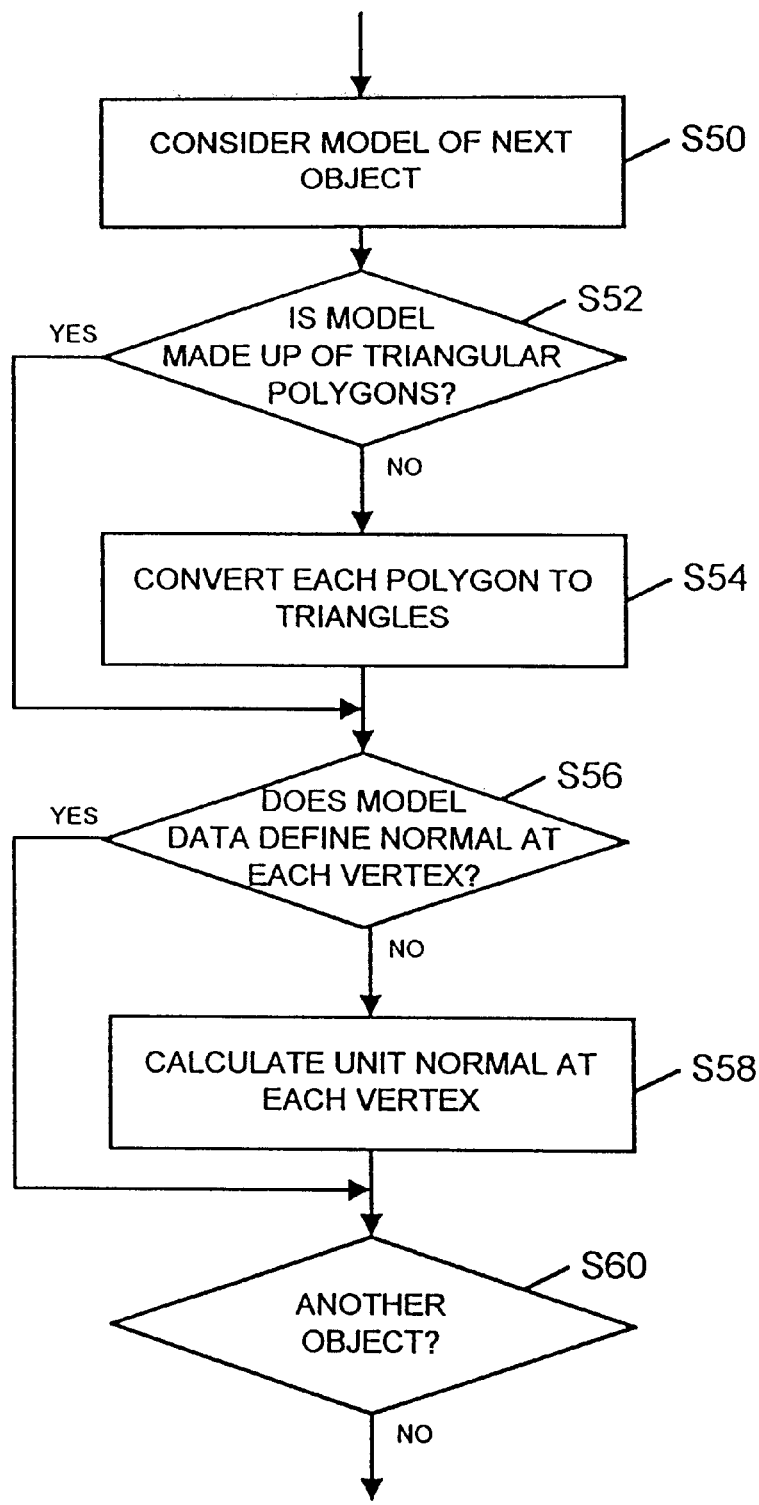
FIG. 3 shows the processing operations performed at step S4 in FIG. 2.

FIG. 3 shows the processing operations performed by CPU 4 at step S4.

Referring to FIG. 3, at step S50, CPU 4 considers the 3D modelling data defining the model of the next object (this being the first object the first time this step is performed).

At step S52, CPU 4 determines whether the model comprises triangular polygons. If it is determined at step S52 that the model of the object being considered does not comprise triangular polygons, then, at step S54, CPU 4 converts each polygon to triangles by connecting the vertices of each polygon to form triangles in a conventional manner.

Following the conversion to triangles at step S54, or, if it is determined at step S52 that the model is already made up of triangular polygons, at step S56, CPU 4 determines whether the model of the object being considered defines a normal for each vertex of each triangular polygon.

If it is determined at step S56 that the model does not define a normal for each vertex, then at step S58, CPU 4 calculates a normal for each vertex of each triangular polygon in a conventional manner, for example using the technique described in "Procedural Elements for Computer Graphics", by David F. Rogers, McGraw-Hill, 1988, ISBN 0-07-Y66503-6, pages 317–319 (section 5.3 and example 5-2).

Following the calculation of the unit normals at step S58, or, if it is determined at step S56 that the 3D modelling data already defines a normal at each vertex of each triangular polygon, at step S60, CPU 4 determines whether there is another object model to be considered. Steps S50 to S60 are repeated to process each model of each object in the manner described above, until it is determined at step S60 that there are no further models to process.

Referring again to FIG. 2, at step S6, CPU 4 constructs and stores a topology database for each model of each object. As will be explained below, this database stores information about each triangle in each model, particularly about the edges and vertices of each triangle, for subsequent use during rendering.

Figure 4:
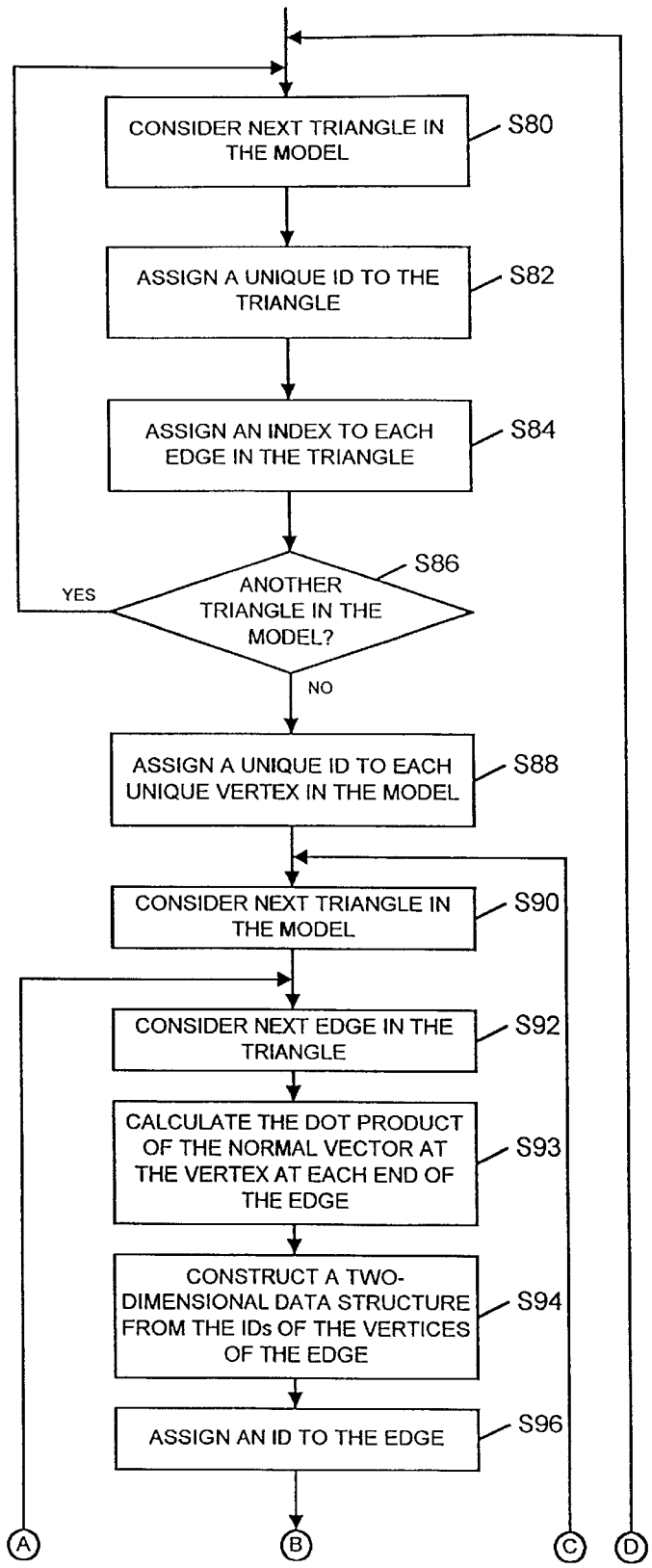
FIG. 4 shows the processing operations performed at step S6 in FIG. 2.
Figure 4:
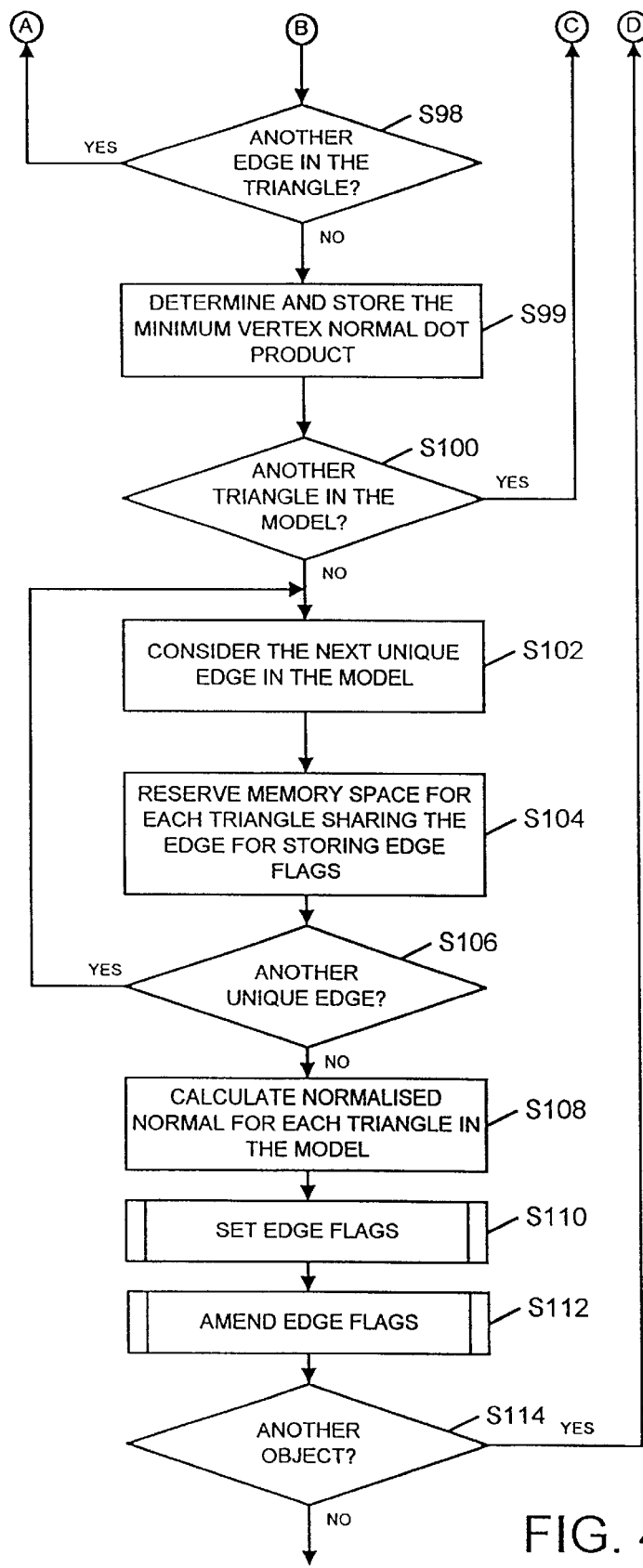

FIG. 4 shows the processing operations performed by CPU 4 at step S6.

Referring to FIG. 4, at step S80, CPU 4 considers the next triangle in the model of the next object (this being the model of the first object the first time step S80 is performed).

At step S82, CPU 4 assigns a unique ID to the triangle and, at step S84, assigns an index to each edge in the triangle.

At step S86, CPU 4 determines whether there is another triangle in the model, steps S80 to S86 are repeated to process each triangle in the manner described above, until it is determined at step S86 that there are no further triangles in the model.

At step S88, CPU 4 assigns a unique numerical ID to each unique vertex in the model. (A vertex may form part of a plurality of triangles, but in this case, at step S88, only a single ID is assigned to the vertex.) The IDs are assigned at step S88 in numerical order as each unique vertex is considered. In this embodiment, the user can define an uncertainty measure to be associated with the position of each vertex in the model so that vertices are treated as the same vertex provided their coordinates do not differ by more than the user defined amount. For example, the user may define an uncertainty region of 0.02 for each coordinate, so that the vertex (1.00, 0.00, 0.00) is treated as the same vertex as (0.98, 0.00, 0.00).

At step S90, CPU 4 considers the next triangle in the model of the object currently being considered, and, at step S92, considers the next edge in the triangle (this being the first edge the first time step S92 is performed).

At step S93, CPU 4 calculates the dot-product of the normal vector at the vertex at each end of the edge. The calculated value represents the angle between these two normal vectors, and hence the curvature of the underlying object surface which the triangle represents. The dot product value ranges from +1 when the normal vectors are parallel, indicating no curvature of the edge between the vertices, to −1 when the normal vectors point in opposite directions (that is, the angle between them is 180°), indicating maximum curvature of the edge.

At step S94, CPU 4 creates a two-dimensional data structure from the unique IDs which define the vertices of the edge considered at step S92 (these IDs having being assigned at step S88). In this embodiment, the two-dimensional data structure has the form (ID0, ID1), where ID0 is the smaller of the two IDs and ID1 is the bigger of the two IDs. By constructing the two-dimensional data structure such that the smallest ID of each pair occurs first and the largest ID second, this ensures that the edge connecting say vertex M to the vertex N is considered to be the same as the edge connecting vertex N to vertex M.

At step S96, CPU 4 assigns an ID to the edge in dependence upon the two-dimensional data structure formed at step S94. CPU 4 assigns the ID at step S96 such that each unique edge receives a unique ID (an edge which is an edge for more than one triangle receives a single, unique ID).

At step S98, CPU 4 determines whether there is another edge in the triangle being considered. Steps S92 to S98 are repeated to process each edge in the manner described above, until it is determined at step S98 that there are no further edges in the triangle to be processed.

At step S99, CPU 4 reads the dot-product values previously calculated for each pair of normals at step S93 and determines and stores the minimum dot-product value for subsequent use, as will be described later. The minimum dot-product value is representative of the maximum amount of curvature of the portion of the object surface which the triangle as a whole represents.

At step S100, CPU 4 determines whether there is another triangle to be processed in the model of the object being considered. Steps S90 to S100 are repeated to process each triangle in the manner described above, until it is determined at step S100 that there are no further triangles to be processed.

At step S102, CPU 4 considers the next unique edge in the model of the object being considered (each unique edge being identified by the unique ID previously assigned at step S96).

At step S104, CPU 4 determines the number of triangles in the model of the object which share the edge, and reserves memory space for each triangle for storing edge flags for the edge.

At step S106, CPU 4 determines whether there is another unique edge in the model of the object being considered. steps S102 to S106 are repeated to process each unique edge in the manner described above, until it is determined at step S106 that all of the edges have been processed.

At step S108, CPU 4 calculates a normalised normal (that is, a vector perpendicular to the plane of the triangle) for each triangle in the model in a conventional manner.

At step S110, CPU 4 sets edge flags for the edges in the model of the object being considered.

Figure 5:
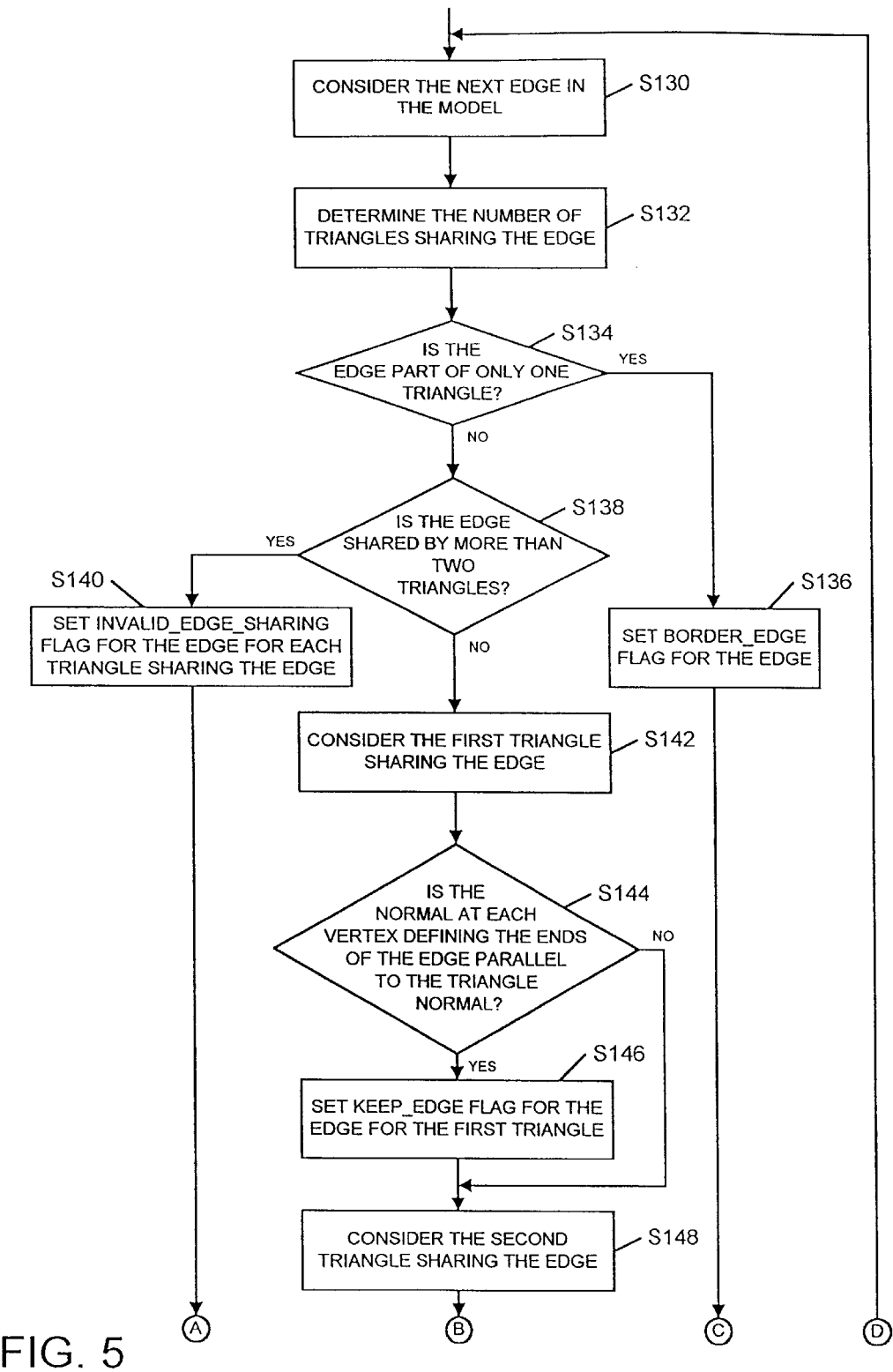
FIG. 5 shows the processing operations performed at step S10 in FIG. 4.
Figure 5:
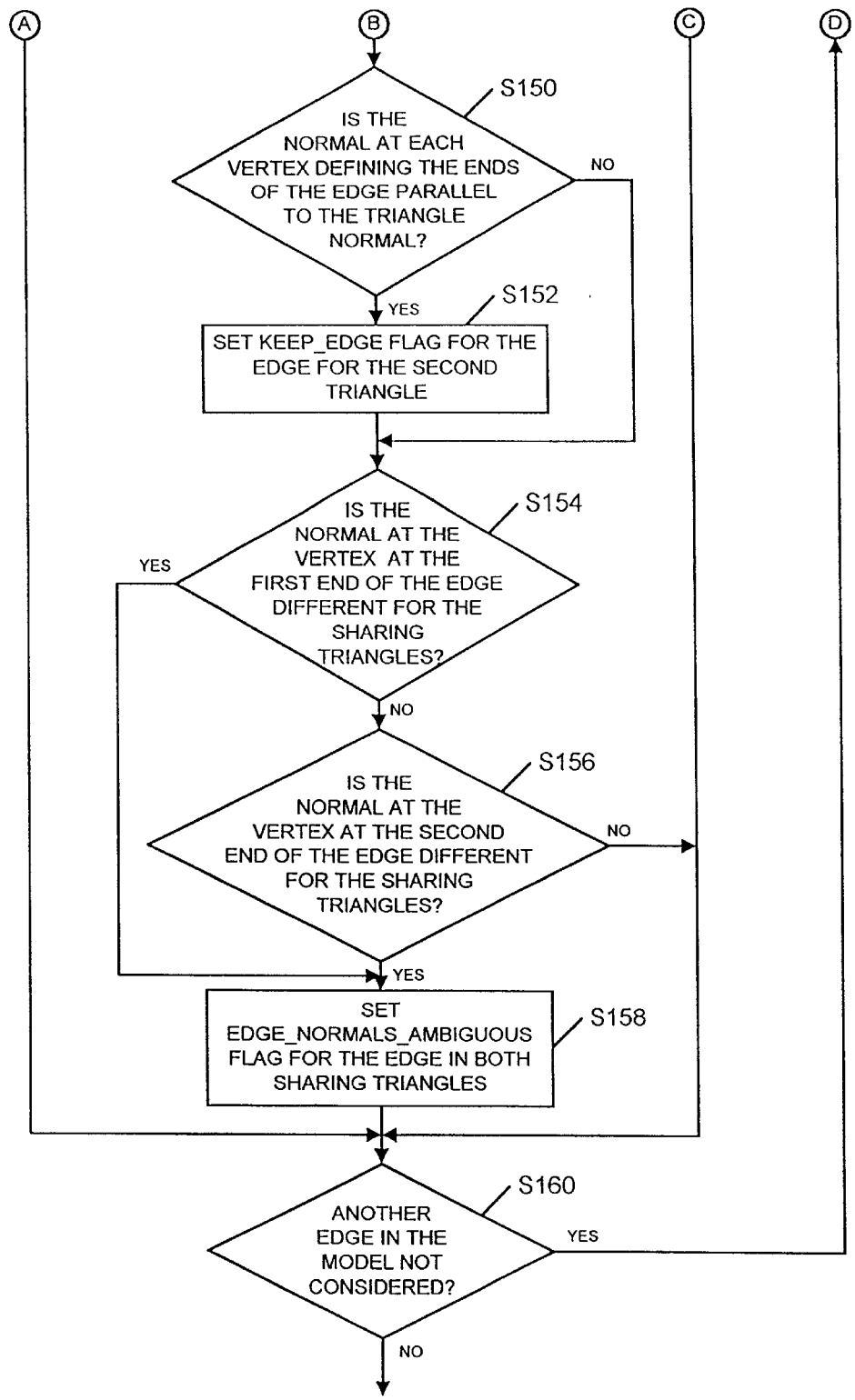

FIG. 5 shows the processing operations performed by CPU 4 to set the edge flags at step S110.

Referring to FIG. 5, at step S130, CPU 4 considers the next edge in the model of the object currently being considered.

At step S132, CPU 4 determines the number of triangles sharing the edge, and, at step S134, determines whether the edge is part of only one triangle.

If it is determined at step S134, that the edge is part of only one triangle, then, at step S136, CPU 4 sets a "border_edge" flag for the edge. As will be described later, when the border_edge flag is set for an edge, that edge is not changed in any subsequent refinement of the model of the object (since the model may be required to connect with another model along this edge for example).

On the other hand, if it is determined at step S134 that the edge is not part of only one triangle, then, at step S138, CPU 4 determines whether the edge is shared by more than two triangles.

Figure 6A:
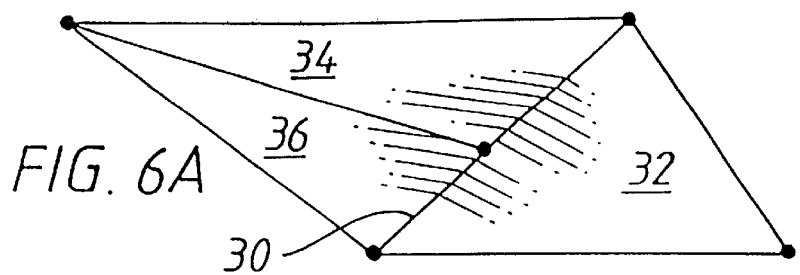
FIGS. 6A, 6B, 6C and 6D show examples of triangles sharing an edge, which illustrate the operations performed in FIG. 5.

FIG. 6A illustrates an example situation in which an edge is shared by more than two triangles. Referring to FIG. 6A, edge 30 is shared by triangles 32, 34 and 36.

If it is determined at step S138 that the edge is shared by more than two triangles, then, at step S140, CPU 4 sets an "invalid edge sharing" flag for the edge for each triangle sharing the edge. Referring again to the example shown in FIG. 6A, the invalid_edge_sharing flag would be set for edge 30 for triangle 32, triangle 34 and triangle 36. As will be described later, if the invalid_edge_sharing flag is set for an edge, that edge will not be changed during any refinement of the model of the object (since it generally indicates an error in the topology of the model). In practice, the invalid_edge_sharing flag is not set very often since models of objects are normally created so that any edge sharing takes place between only two triangles.

On the other hand, if it is determined at step S138 that the edge is not shared by more than two triangles, then the edge must be shared by two, and only two, triangles (this is because it was determined at step S134 that the edge is not part of only one triangle and it was determined at step S138 that the edge is not shared by more than two triangles).

Figure 6B:
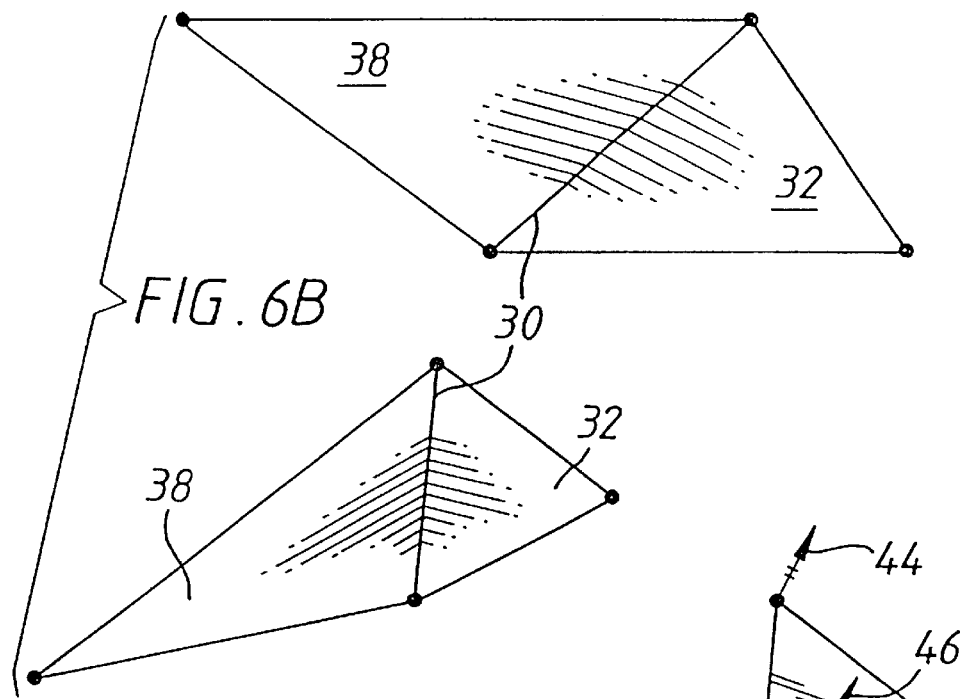

FIG. 6B shows, by way of example, two views of a situation in which an edge is shared by two triangles. In the example of FIG. 6B, edge 30 is shared by triangles 32 and 38.

When it is determined at step S138 that the edge is not shared by more than two triangles, then, at step S142, CPU 4 considers the first triangle sharing the edge, and at step S144, determines whether the normal at each vertex defining the ends of the edge for the first triangle are parallel to the triangle normal.

Figure 6D:
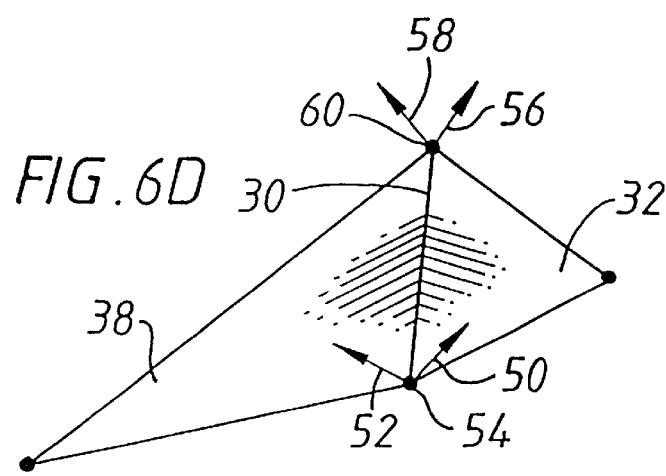
Figure 6C:
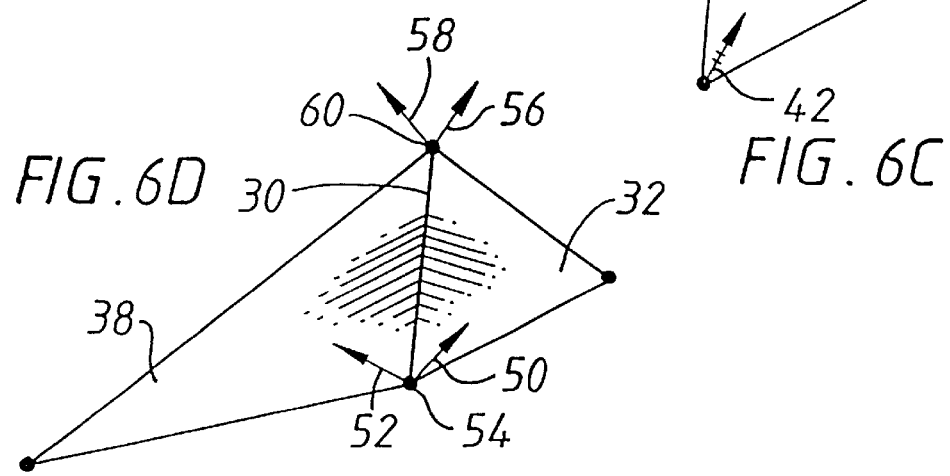

FIG. 6C shows an example in which each vertex normal of an edge is parallel to the triangle normal. Referring to FIG. 6C, in the example shown, the normal 42 at the vertex defining one end of edge 30 is parallel to the normal 44 of the vertex defining the other end of the edge, and both normals are parallel to the triangle normal 46.

If it is determined at step S144 that the normal at each vertex defining the ends of the edge are parallel to the triangle normal, then, at step S146, CPU 4 sets a "keep edge" flag for the edge for the first triangle.

The effect of this flag will be described later. On the other hand, if it is determined at step S144 that the normal at each vertex and the triangle normal are not parallel, then step S146 is omitted, such that the keep edge flag is not set for the triangle.

At steps S148, S150 and S152, CPU 4 performs the same processing operations on the second triangle sharing the edge that was previously performed at steps S142, S144 and S146 for the first triangle. As these processing operations have already been described, they will not be described again here.

At step S154, CPU 4 determines whether the normal at the vertex at the first end of the edge is different for the two sharing triangles.

FIG. 6D shows an example in which the normals at a vertex defining the end of an edge are different for the two sharing triangles. Referring to the example shown in FIG. 6D, the normal 50 for triangle 32 is different to the normal 52 of the triangle 38 at the vertex 54.

If it is determined at step S154 that the normals at the vertex are different for the sharing triangles, then processing proceeds to step S158, at which CPU 4 sets an "edge_normals_ambiguous" flag for the edge for both the sharing triangles. Thus, with reference to the example shown in FIG. 6D, the edge_normals_ambiguous flag would be set for edge 30 for both triangle 32 and triangle 38.

On the other hand, if it is determined at step S154 that the normals at the vertex at the first end of the edge are the same for the sharing triangles, then processing proceeds to step S156. At step S156, CPU 4 determines whether the normals at the vertex at the other end of the edge are different for the sharing triangles. Referring again to the example in FIG. 6D, the normal 56 for triangle 32 is different to the normal 58 for triangle 38 at the vertex 60.

If it is determined at step S156 that the normals at the vertex at the second end of the edge are different for the two sharing triangles, then, at step S158, CPU 4 sets an "edge_normals_ambiguous" flag for the edge for both the sharing triangles. Thus, with reference to the example shown in FIG. 6D, the edge_normals_ambiguous flag would be set for edge 30 for both triangle 32 and triangle 38. On the other hand, if it is determined at step S156 that the normals at the vertex defining the second end of the edge are not different for the sharing triangles, then step S158 is omitted so that the edge_normals_ambiguous flag is not set for the edge.

Accordingly, as a result of the processing performed at steps S154, S156 and S158, the edge_normals_ambiguous flag is set for both the triangles sharing an edge if the normals at the vertex at either end of the edge are different for the sharing triangles.

At step S160, CPU 4 determines whether there is another edge in the model which has not yet been considered. Steps S130 to S160 are repeated to process all of the edges in the model in the manner described above.

Referring again to FIG. 4, at step S112, CPU 4 amends the edge flags previously set at step S110. The purpose of the processing performed at step S112 is to identify edges for which the edge_normals_ambiguous flag is set (indicating that the normal for each sharing triangle is different at at least one vertex defining the ends of the edge) and also the keep_edge flag is set for one triangle of the pair which shares the edge (indicating that, for this triangle, the normal at each vertex is parallel to the triangle normal), and to set flags to indicate this for subsequent use during rendering.

Figure 7:
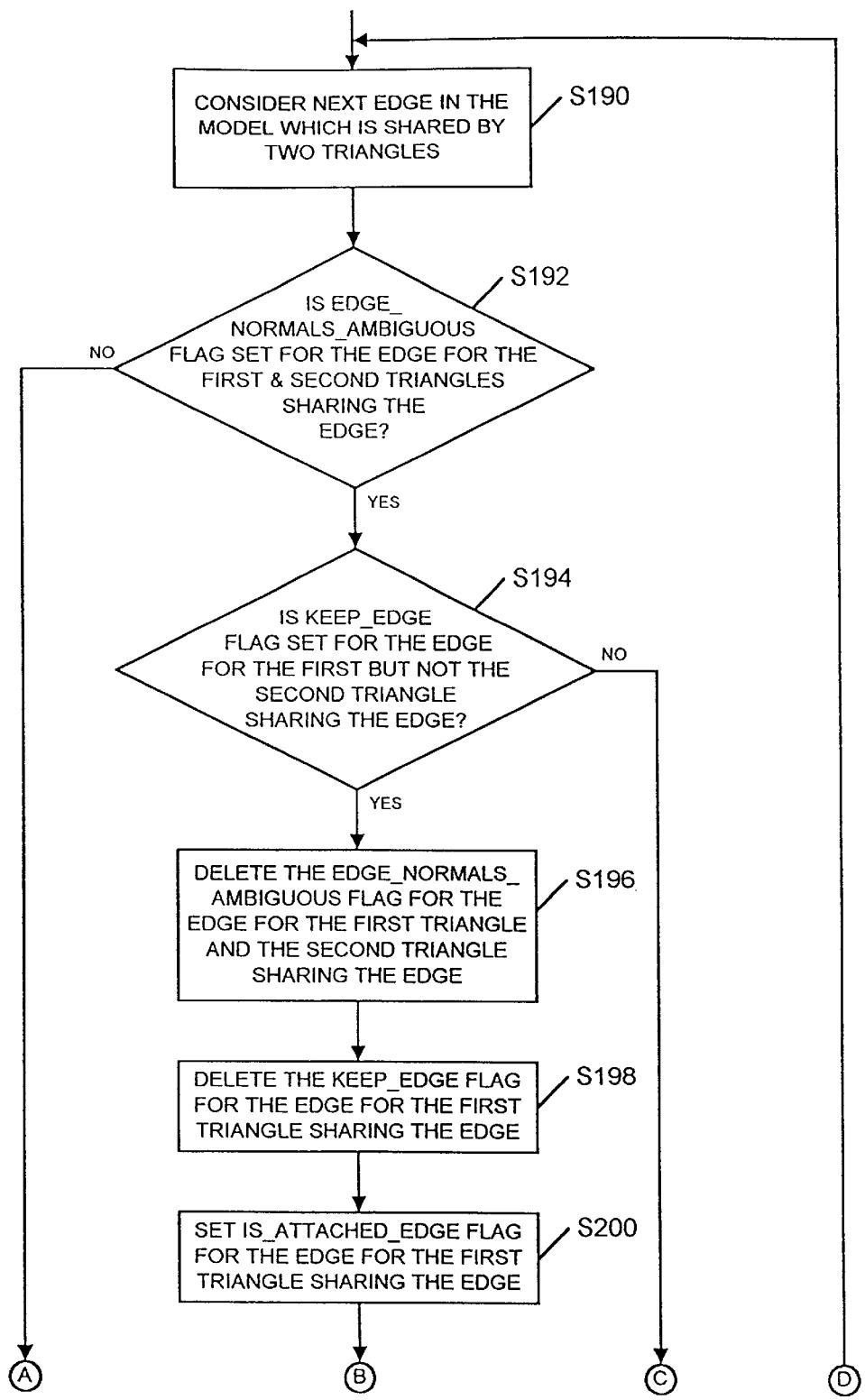
FIG. 7 shows the processing operations performed at step S112 in FIG. 4.
Figure 7:
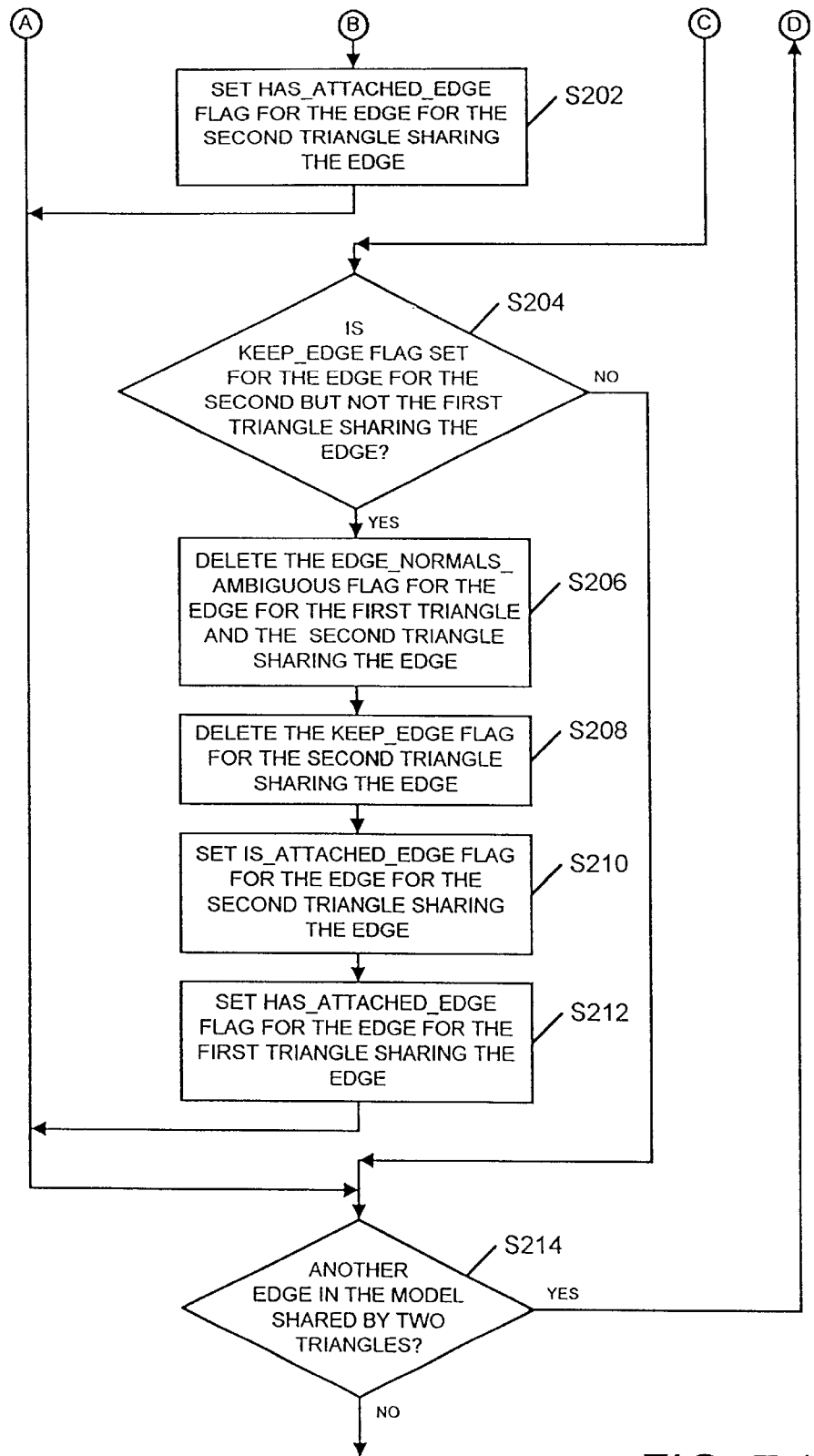

FIG. 7 shows the processing operation performed by CPU 4 at step S112 to amend the edge flags.

Referring to FIG. 7, at step S190, CPU 4 considers the next edge which is shared by two triangles in the model currently being considered.

At step S192, CPU 4 determines whether the edge_normals_ambiguous flag is set for the triangles which share the edge. If it is determined that the edge_normals_ambiguous flag is set, then, at step S194, CPU 4 determines whether the keep edge flag is set for the edge for the first but not the second triangle sharing the edge.

As will be explained in more detail later, if the keep_edge flag is set for the first triangle but is not set for the second triangle, this corresponds to a situation in which the edge will be changed for the second triangle during refinement of the model of the object during rendering, but will not be changed for the first triangle. An example of this situation is shown in FIG. 8A.

Figure 8A:
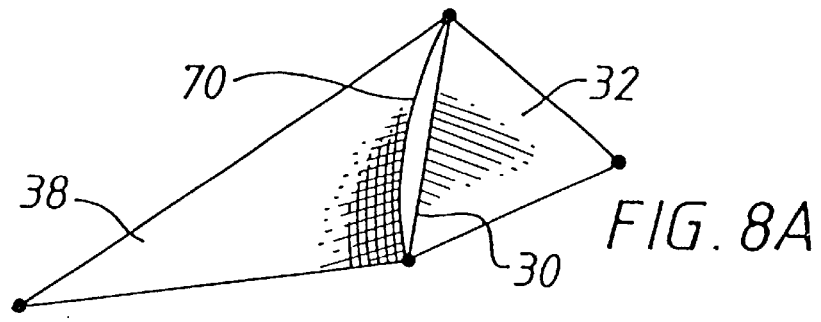
FIGS. 8A, 8E, 8C and 8D show examples of triangles amended in dependence upon the flags set after steps S110 and S112 have been performed.

Referring to FIG. 8A, edge 30 is not refined for triangle 32. However, the edge will be refined for triangle 38 so that it approximates the curve 70.

Referring again to FIG. 7, at step S196, CPU 4 deletes the edge_normals_ambiguous flag for the edge for the first and second triangles sharing the edge. At step S198, CPU 4 deletes the keep_edge flag for the edge for the first triangle sharing the edge. At step S200, CPU 4 sets an "is_attached_edge" flag for the edge for the first triangle sharing the edge, and, at step S202, sets an "has_attache_edge" flag for the edge for the second triangle sharing the edge.

On the other hand, if it is determined at step S194 that the keep_edge_flag is not set for the edge for the first but not the second triangle sharing the edge, then processing proceeds to step S204, at which CPU 4 determines whether the keep_edge flag is set for the edge for the second but not the first triangle sharing the edge. If it is determined at step S204 that the keep_edge flag is set for the second but not the first triangle, then the situation occurs in which the edge will be modified for the first triangle, but will not be modified for the second triangle during subsequent refinement of the model of the object during rendering. An example of this situation is shown in FIG. 8B.

Figure 8B:
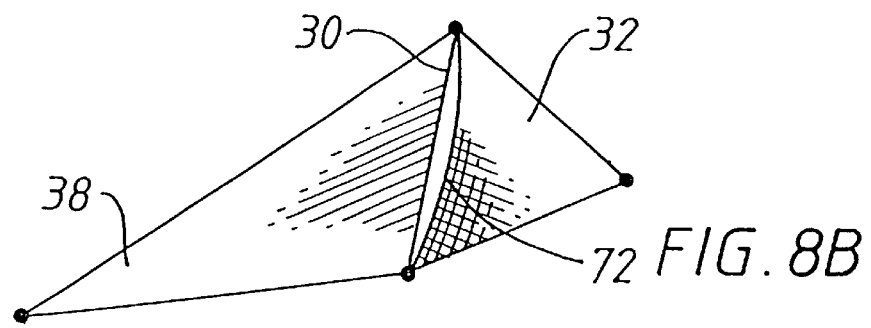

Referring to the example shown in FIG. 8B, edge 30 will be modified to approximate the curve 72 of the triangle 32, but will not be modified for triangle 38.

At step S206, CPU 4 deletes the edge_normals_ambiguous flag for the edge for both the triangles which share the edge, and, at step S208, CPU 4 deletes the keep_edge flag for the second triangle sharing the edge.

At step S210, CPU 4 sets an "is_attached_edge" flag for the edge for the second triangle, and at step S212, CPU 4 sets an "has_attache_edge" flag for the edge for the first triangle.

As a result of the processing operations performed in steps S192 to S212, CPU 4 has set flags to identify cases in which an edge shared by two triangles is to be refined for one triangle, but not the other triangle. The is_attached_edge flag indicates that the edge will not be changed for the triangle for which this flag is set, while the has_attached_edge indicates that the edge will be changed for the triangle for which this flag is set.

If it is determined at step S204 that the keep_edge flag is not set for the edge for the first but not the second triangle, then the flags which are set for the edge for each triangle must be the edge_normals_ambiguous flag together with the keep_edge flag or the edge_normals_ambiguous flag alone.

Figure 8C:
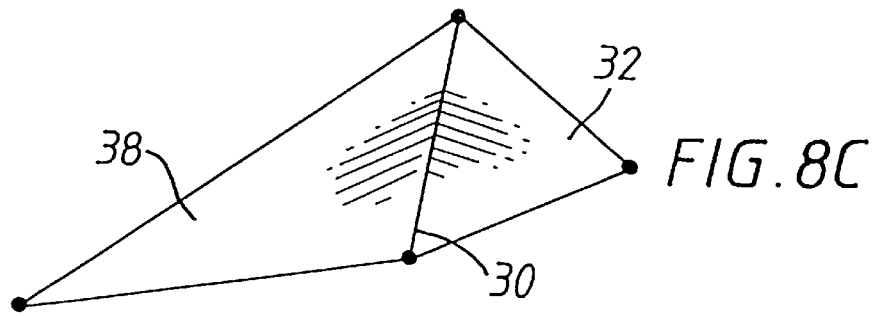

As will be explained in more detail later, if both the edge_normals_ambiguous flag and the keep_edge flag are set for each edge, then the edge will not be changed for either of the two triangles when the model of the object is refined during rendering. An example of this situation is shown in FIG. 8C, in which edge 30 is refined for neither triangle 32 nor triangle 38.

Figure 8D:
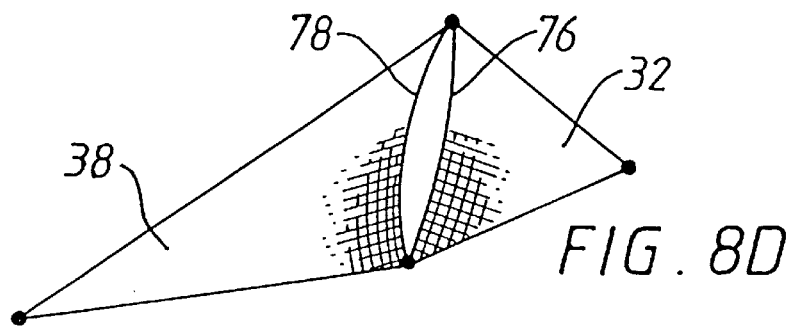

If the edge_normals_ambiguous flag alone is set for the edge for both triangles, then the edge will be changed for both triangles during subsequent refinement of the model. An example of this situation is shown in FIG. 8D, in which the edge previously shared by triangle 32 and triangle 38 is refined to approximate curve 76 for triangle 32 and to approximate the curve 78 for triangle 38.

Referring again to FIG. 7, at step S214, CPU 4 determines whether there is another edge in the model which is shared by two, and only two, triangles. Steps S190 to S214 are repeated until all the edges shared by two triangles in the model have been processed in the manner described above.

Referring again to FIG. 4, at step S114, CPU 4 determines whether there is a model of another object which has not yet been processed. Steps S80 to S114 are repeated until the model of each object has been processed in the manner described above.

Referring again to FIG. 2, at step S8, CPU 4 calculates parameters for the refinement of the model of each object.

In this embodiment, parameters are calculated to refine the model on the basis of cubic Bernstein-Bezier triangular patches.

Figure 9:
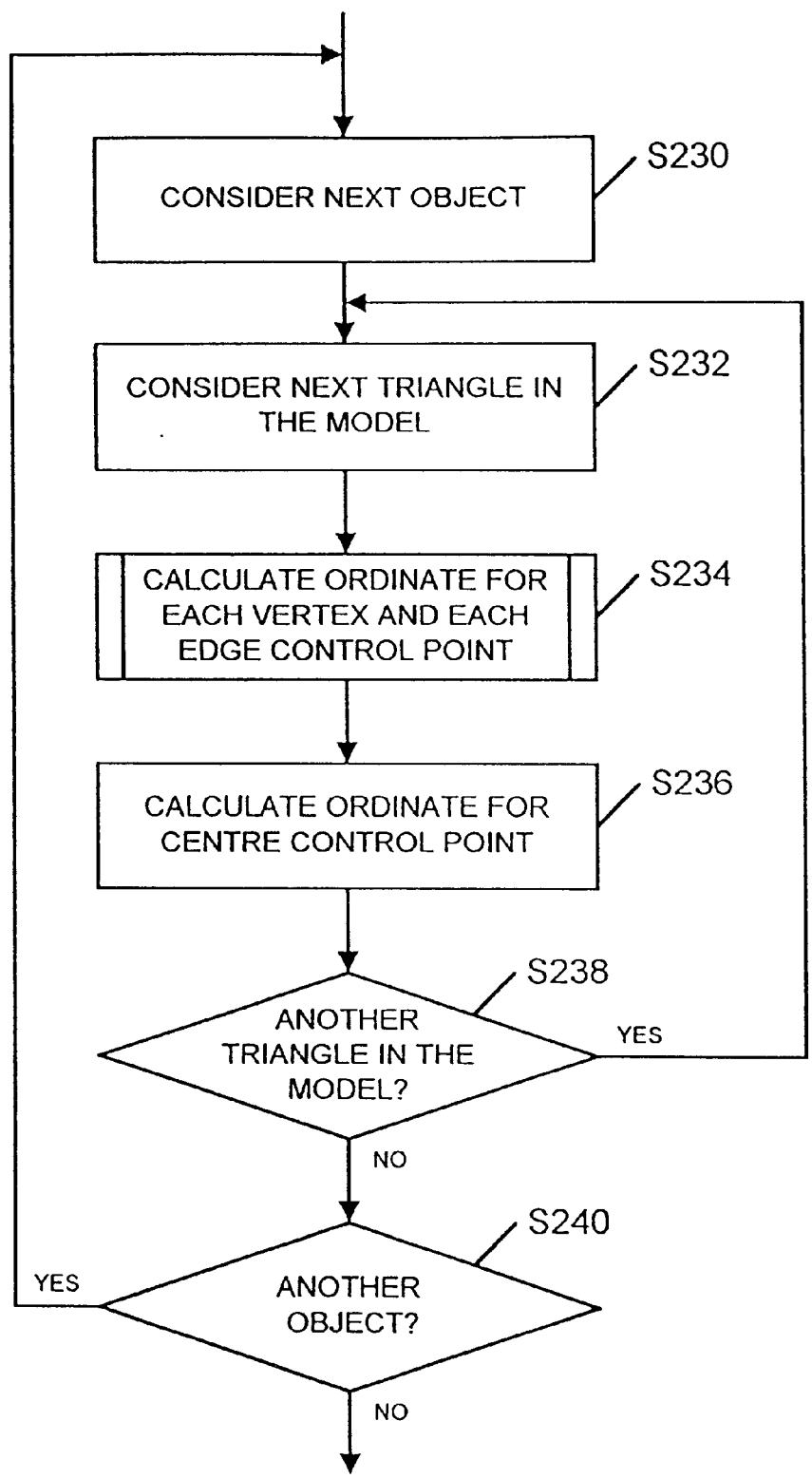
FIG. 9 shows the processing operations performed at step S8 in FIG. 2.

FIG. 9 shows the processing operations performed by CPU 4 at step S8 to calculate the refinement parameters.

Referring to FIG. 9, at step S230, CPU 4 considers the model of the next object, and, at step S232, considers the next triangle in the model. At steps S234 and S236, CPU 4 calculates "ordinates" for each "control point" of the triangle being considered. These ordinates define a cubic Bernstein-Bezier triangular patch for the triangle.

Figure 10:
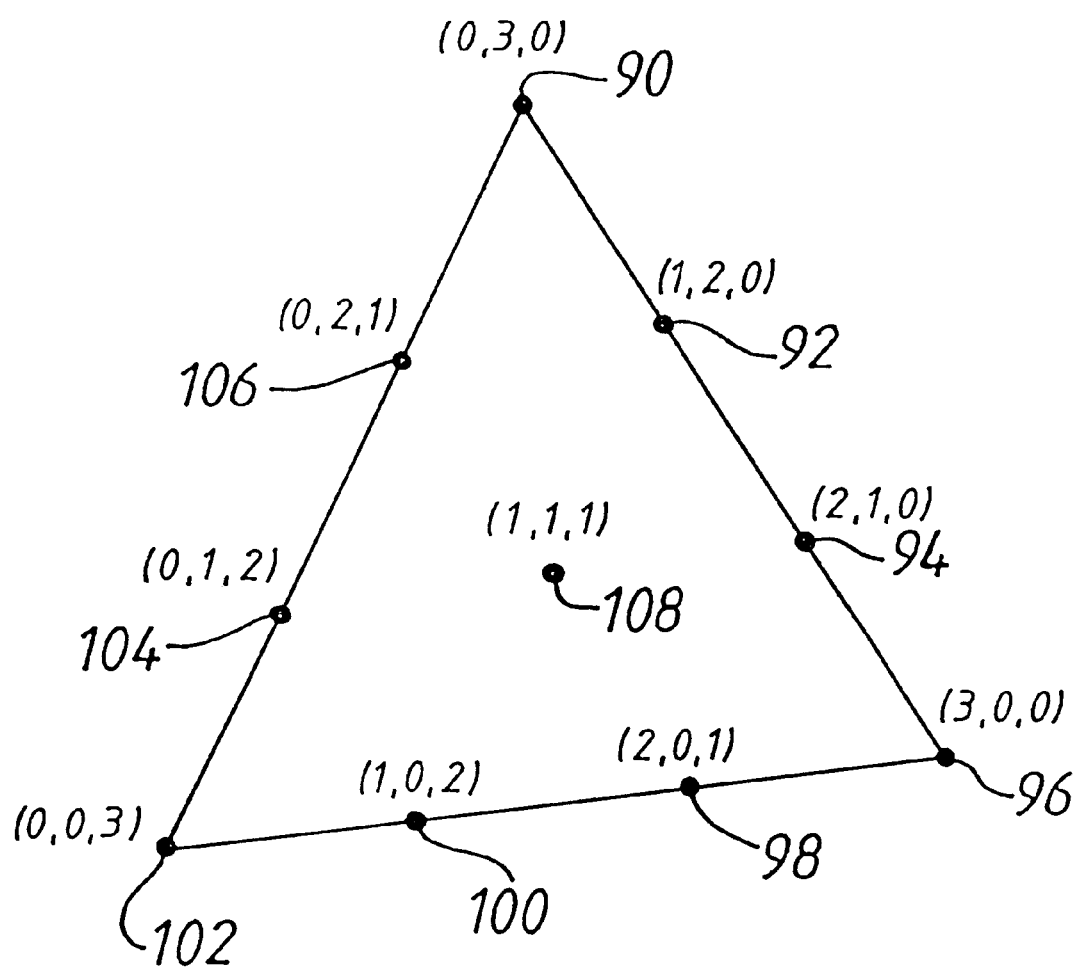
FIG. 10 shows the control points and their barycentric coordinates for a triangle for use in defining a cubic Bernstein-Bezier triangular patch for the triangle.

FIG. 10 shows the control points 90, 92, 94, 96, 98, 100, 102, 104, 106, 108 for an example triangle. The coordinates shown in brackets for each control point in FIG. 10 are the barycentric coordinates of the control point. In a conventional manner, ten control points are used to calculate the ordinates which define a cubic Bernstein-Bezier triangular patch. Control points 90, 96 and 102 are located at the triangle vertices. Two control points are located at equally spaced positions along each triangle edge (these control points being 92, 94, 98, 100, 104 and 106 in FIG. 10). A further control point is located at the barycentric centre of the triangle (this being control point 108 in FIG. 10).

Referring again to FIG. 9, at step S234, CPU 4 calculates an ordinate for each vertex control point (90, 96 and 102 in FIG. 10) and each edge control point (92, 94, 98, 100, 104 and 106 in FIG. 10).

FIG. 11 shows the processing operations performed by CPU 4 to calculate the ordinates at step S234.

Referring to FIG. 11, at step S250, CPU 4 sets the ordinate for each vertex control point to zero. This ensures that the cubic Bernstein-Bezier triangular patch defined by the ordinates passes through each vertex of the triangle. This ensures that the patch for each triangle which shares a given vertex will meet at the vertex, thereby ensuring continuity of the triangular meshing at the vertices.

At steps S252 to S264, CPU 4 calculates the ordinate at each edge control point (92, 94, 98, 100, 104 and 106 in the example of FIG. 10).

More particularly, at step S252, CPU 4 determines whether the border_edge flag is set for any edge in the triangle. If this flag is set, then, at step S254, CPU 4 sets a value of zero for the ordinates for all edge control points along each edge for which the border_edge flag is set. This ensures that the cubic Bernstein-Bezier triangular patch for the triangle will meet each edge in the triangle for which the border_edge flag is set. As will be described later, this prevents such an edge from being changed when the model of the object is refined during subsequent processing. If the border_edge flag is not set for any edge in the triangle, then step S254 is omitted.

At step S256, CPU 4 determines whether the invalid_edge_sharing flag is set for any edge in the triangle. If this flag is set for any edge, then at step S258, CPU 4 sets a value of zero for the ordinate for each edge control point along each edge for which the invalid_edge_sharing flag is set. The processing at step S258 ensures that the Bernstein-Bezier triangular patch of a triangle will meet each triangle edge for which the invalid_edge_sharing flag is set, thereby preventing modification of this edge when the model of the object is refined during subsequent processing (as will be described later). If the invalid_edge_sharing flag is not set for any edge in the triangle, then step S258 is omitted.

At step S260, CPU 4 considers the next remaining edge control point for which a value of the ordinate has not been set in step S254 or step S258.

At step S262, CPU 4 calculates the value of the ordinate for the control point by calculating the distance from the control point of the tangent plane which passes through the nearest vertex, with the distance being measured in a direction parallel to the normal of the nearest vertex.

FIG. 12 illustrates the distance calculated by CPU 4 at step S262. Referring to FIG. 12, the nearest triangle vertex to control point 98 is vertex 96. The tangent plane 120 which passes through vertex 96 is the plane which is perpendicular to the normal 122 at the vertex 96. The distance calculated by CPU 4 at step S262 is the height "h" from the control point 98 to the plane 120 in the direction 124 which is parallel to the vertex normal 122.

FIG. 13 shows the processing operations performed by CPU 4 at step S262 to calculate the value of the ordinate.

Referring to FIG. 13, at step S280, CPU 4 calculates the edge direction vector of the edge on which the control point lies in the direction from the nearest vertex to the control point.

At step S282, CPU 4 reads the value of the unit normal vector at the closest vertex to the control point, and, at step S284, calculates the scalar product of the edge vector calculated at step S280 and the unit normal vector read at step S282.

At step S286, CPU 4 multiplies the scalar product obtained at step S284 by minus one third, with the resultant value defining the value for the ordinate (this being the height "h" shown in the example of FIG. 12).

It will be appreciated that the value of the ordinate calculated by CPU 4 may be either negative or positive depending on the direction of the normal at the nearest vertex to the control point.

Referring again to FIG. 11, at step S264, CPU 4 determines whether there is another edge control point for which the ordinate has not been calculated. Steps S260 to S264 are repeated until an ordinate has been calculated for each edge control point for which the ordinate value has not been previously set to zero at step S254 or step S258.

Referring again to FIG. 9, at step S236, CPU 4 calculates a value for the ordinate of the centre control point (that is, the control point at the barycentric centre of the triangle— point 108 in the example of FIG. 10). In this embodiment, CPU 4 calculates the ordinate for the centre control point as one quarter of the sum of the ordinates of the edge control points (92, 94, 98, 100, 104 and 106 in FIG. 10).

At step S238, CPU 4 determines whether there is another triangle in the model for which ordinates have not been calculated. Steps S232 to S238 are repeated until ordinates have been calculated for each triangle in the model.

At step S240, CPU 4 determines whether there is a model of another object to be considered. Steps S230 to S240 are repeated until ordinates have been calculated for each triangle in each model.

As noted above, the ordinates calculated at step S8 (FIG. 2) define a cubic Bernstein-Bezier triangular patch for each triangle in a model. Mathematically, a Bernstein-Bezier triangular patch of degree "n", $b^n(\tau)$, is given by the following equation:

$$b^n(\tau) = \sum_{|\lambda|=n} b_\lambda B_\lambda^n(\tau) \qquad (1)$$

where:

$\lambda$ is the triplet $(\lambda_1, \lambda_2, \lambda_3)$ of barycentric coordinates which identifies the position of a control point $\lambda$;

$b_\lambda$ is the value of the ordinate for the control point $\lambda$; and $B_\lambda^n(\tau)$ is the Bernstein polynomial for control point $\lambda$ and is given by:

$$B_\lambda^n(\tau) = \frac{n!}{\lambda_1! \lambda_2! \lambda_3!} \tau_1^{\lambda_1} \tau_2^{\lambda_2} \tau_3^{\lambda_3} \qquad (2)$$

where $(\tau_1, \tau_2, \tau_3)$ define the barycentric coordinates of a point on the original triangle.

In equations (1) and (2) $b^n(\tau)$ represents the height of the patch above the point $\tau$ on the triangle. The following restriction applies to $\tau$:

$$\sum_{i=1}^{n} \tau_i = 1 \qquad (3)$$

$\lambda$ is related to $\tau$ by the following equation:

$$\lambda_i = n\tau_i \qquad (4)$$

For a cubic Bernstein-Bezier triangular patch, "n" is 3, and accordingly the equation of the patch is given by:

$$b^3(\tau) = \sum_{|\lambda|=3} b_\lambda B_\lambda^3(\tau) \qquad (5)$$

$|\lambda|=3$ for all of the control points 90, 92, 94, 96, 98, 100, 102, 104, 106 and 108 shown in FIG. 10.

Accordingly, the equation for a cubic Bernstein-Bezier triangular patch can be written as follows:

$$\begin{aligned} b^3(\tau) &= \sum_{|\lambda|=3} b_\lambda \frac{3!}{\lambda_1! \lambda_2! \lambda_3!} \tau_1^{\lambda_1} \tau_2^{\lambda_2} \tau_3^{\lambda_3} \\ &= b_{003}\tau_3^3 + b_{030}\tau_2^3 + b_{300}\tau_1^3 + 3b_{102}\tau_1 \tau_3^2 + 3b_{201}\tau_1^2 \tau_3 + \\ &\quad 3b_{012}\tau_3^2 \tau_2 + 3b_{021}\tau_2^2 \tau_3 + 3b_{120}\tau_1 \tau_2^2 + 3b_{210}\tau_1^2 \tau_2 + \\ &\quad 6b_{111}\tau_1 \tau_2 \tau_3 \end{aligned} \qquad (6)$$

In equation 6, $b_{003}$, $b_{030}$, $b_{300}$, $b_{102}$, $b_{201}$, $b_{012}$, $b_{021}$, $b_{120}$, $b_{210}$, and $b_{111}$ are the values of the ordinates calculated at step S8 for the control points having barycentric coordinates (0,0,3), (0,3,0), (3,0,0), (1,0,2), (2,0,1), (0,1,2), (0,2,1), (1,2,0), (2,1,0) and (1,1,1) respectively.

FIGS. 14A, 14B, 14C and 14D illustrate examples of a Bernstein-Bezier triangular patch for a triangle defined by ordinates calculated at step S8. It should be noted that CPU 4 does not draw any patch, but merely stores the ordinates defining the patch for each triangle for subsequent use, as will be described later.

Figure 14A:
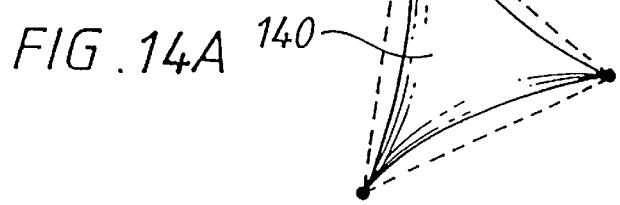

Referring to FIG. 14A, an example Bernstein-Bezier triangular patch 140 is shown for triangle 32. The patch 140 touches the triangle at each vertex, but, in this example, does not touch the triangle at any other point. Instead, for every point other than the triangle vertices, patch 140 is at a height above the surface of the triangle 32.

Figure 14B:
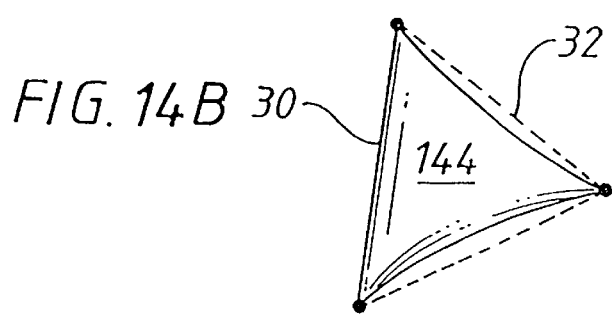

FIG. 14B shows a second example of a Bernstein-Bezier triangular patch for triangle 32. Referring to FIG. 14B, patch 144 meets triangle 32 at each vertex of the triangle. In addition, patch 144 meets triangle 32 at each point along edge 30. The patch meets a triangle along each point of an edge when the value of each ordinate along the edge is zero. This will occur when the border_edge flag, invalid edge sharing flag or keep_edge flag is set for the edge. In a case where the border_edge flag is set, the ordinates along the edge are set to zero by CPU 4 at step S254 (FIG. 11) to force the patch to meet the edge. Similarly, when the invalid edge_sharing flag is set for an edge, CPU 4 sets the ordinates for the edge to zero at step S258, forcing the patch to meet the edge. When the keep_edge flag is set for an edge, then the normal at each vertex defining the ends of the edge are parallel to the triangle normal (this being the condition under which the keep_edge flag is set at steps S144 and S146 or steps S150 and S152 in FIG. 5). In this case, the value of the ordinate for each control point along the edge will be calculated to be zero by CPU 4 at step S262 (FIG. 11) because the tangent plane at the nearest vertex will pass along the edge (that is, the height "h" of the tangent plane shown in FIG. 12 will be zero along the whole of the edge).

Figure 14C:
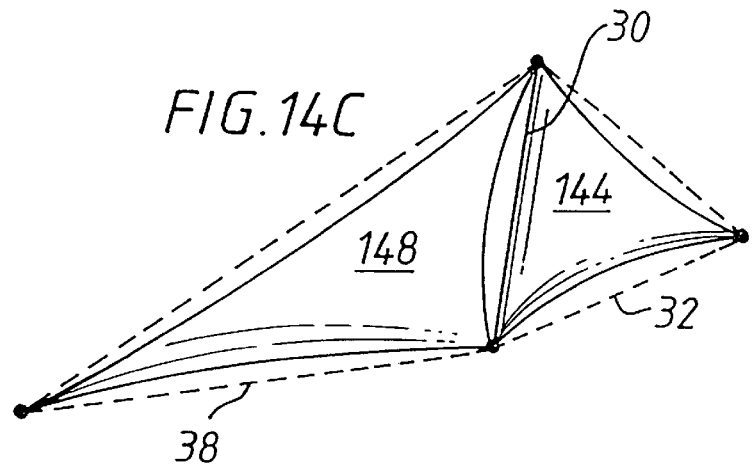

FIG. 14C is an example in which Bernstein-Bezier triangular patches are shown for two adjacent triangles 32 and 38, in which the common edge 30 shared by the triangles has the is_attache_edge flag set for triangle 32 and the has_attache_edge flag is set for triangle 38. The patch 144 for triangle 32 meets the triangle at each point along edge 30. On the other hand, patch 148 for triangle 38 does not touch edge 30 other than at the triangle vertices.

Figure 14D:
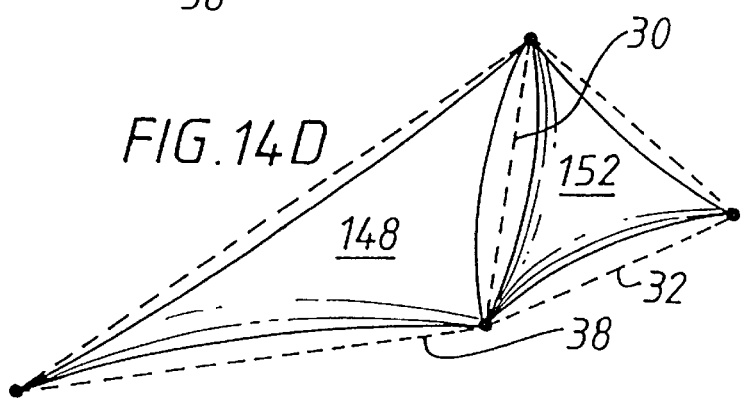

FIG. 14D shows an example of Bernstein-Bezier triangular patches for two adjacent triangles 32 and 38 for which the common edge 30 shared by the triangles has the edge_normals_ambiguous flag set for the edge for each triangle, but not the keep_edge flag set. In this case, neither patch 152 for triangle 32 nor patch 148 for triangle 38 touches the edge 30 other than at the triangle vertices.

Referring again to FIG. 2, at steps S9 to S34, CPU 4 performs processing to generate a frame of image data by rendering the model of each object. Steps S9 to S34 are repeated for each frame of image data so that the processing in these steps occurs within the time period of one frame. Typically, frames are generated at a video rate such as 30 frames per second, in which case the frame period during which the processing operations of steps S9 to S34 are carried out, is 1/30th of a second.

At step S9, CPU 4 determines the positions of the objects. That is, CPU 4 determines whether the position of any object is to be changed in accordance with instructions input during the time the previous frame of image data was being generated.

At step S10, CPU 4 determines the lighting parameters which are to be used to light the models of the objects. These parameters are conventional lighting parameters, comprising, for example the amount of ambient light, and the position, direction and intensity values of one or more individual light sources. The lighting parameters may be defined in the 3D modelling data received at step S2. In addition, or instead, they may be input to CPU 4, or changed, by a user via input device 14. At step S10 CPU 4 reads the values of the lighting parameters including any changes which have been made thereto during the previous frame period.

At step S12, CPU 4 reads data defining a viewing position and viewing direction from which an image of the objects is to be generated. The viewing parameters define a view transformation which transforms polygons from a 3D world space to a 3D viewing (or camera) space. The viewing parameters may be input by a user, for example via input device 14. At step S12, CPU 4 reads the values of the viewing parameters including any changes which have been made thereto during the previous frame period.

At step S14, CPU 4 culls objects which do not lie within the field of view defined by the viewing parameters determined at step S12, so that these objects are not processed further, thereby reducing the amount of processing which has to be carried out.

More particularly, in this embodiment, a bounding box is defined for each object in a conventional manner in the object space of the object. The local transformation, which transforms points from objects space to a shared 3D world space, and the viewing transformation, which transforms points from the 3D world space to the 3D viewing space, are then performed as a common operation on the bounding box by concatenating the matrices which define the local transformation and the viewing transformation. This places the object's bounding box within the viewing space. Thereafter, the position of the transformed bounding box is considered, to determine whether it is totally within the viewable space, totally outside the viewable space or intersecting the viewable space.

If a bounding box is totally outside the viewable space, no further processing is performed on the polygons defining the object within the bounding box. If a bounding box is partially or completely within the viewable space, then the polygons defining the object within the bounding box are processed to generate image data. In addition, however, for bounding boxes which are partially within the viewable space and partially outside the viewable space, data defining the planes of intersection of the bounding box and the viewable space are stored for subsequent use in the clipping of polygons defining the object, as will be described later.

At step S16, the model of each object which remains after culling at step S14 is refined by CPU 4 using the refinement parameters previously calculated at step S8. The purpose of the processing carried out by CPU 4 at step S16 is to refine each triangular polygon in the model of an object into a larger number of smaller triangles which more accurately represent the object surface. As will be explained below, the smaller triangles do not necessarily lie in the same plane as the original triangle, and hence the underlying object surface can be more faithfully modelled. Therefore, by performing the processing at step S16, the curvature of the object surface can be represented and displayed to a viewer more accurately.

FIG. 15 shows the processing operations performed by CPU 4 to carry out refinement at step S16 in this embodiment.

Referring to FIG. 15, at step S298, CPU 4 determines whether the processing being carried out is being performed to generate the first frame of image data. If it is determined that the processing is to generate the first frame, then no refinement of any model is performed, so that each model is processed in unrefined form for the first frame.

On the other hand, if the processing is for a second or a subsequent frame of image data, then, at step S300, CPU 4 considers the model of the next object to be processed (this being the first object the first time step S300 is performed). At step S302, CPU 4 considers the next triangle in the model of the object.

At step S304, CPU 4 determines whether each edge in the triangle has a keep_edge, is_attached_edge, border_edge or invalid_edge_sharing flag set. If one of these flags is not set for every edge in the triangle, then at least one edge of the triangle (or more particularly, any edge for which one of the flags is not set) will be changed since the Bernstein-Bezier triangular patch does not meet this triangle edge.

Accordingly, if it is determined at step S304 that at least one edge in the triangle does not have one of these flags set, then at step S306, CPU 4 determines the depth of tessellation required for this triangle. (step S306 is omitted if one of these flags is set for every edge in the triangle.)

FIG. 16 shows the processing operations performed by CPU 4 at step S306 to determine the depth of tessellation for the triangle.

Referring to FIG. 16, at step S342, CPU 4 reads the screen coordinates of the three triangle vertices from the previous frame of image data displayed to the viewer. At step S344, CPU 4 uses the vertex coordinates read at step S342 to determine the area of the triangle in the previous frame.

In this embodiment, it is assumed that the area of the triangle in the image frame for which the current data is being generated will be approximately the same as the area of the triangle in the previous frame since the object can not have moved much in one frame period. Accordingly, at step S346, CPU 4 uses the triangle area determined at step S344 as input to a first look-up table, and reads the depth value defined in the look-up table for this input value.

FIG. 17A shows the information stored in the first look-up table in this embodiment.

Referring to FIG. 17A, in this embodiment, the look-up table specifies one of ten different depth values. The first depth value, depth 1 indicates that no tessellation of the triangle is to take place. As will be described later, depths 2 to 9 indicate that tessellation is to take place, with the number of smaller triangles into which the triangle is divided increasing as the depth increases. The depth value increases as the area of the triangle in the previous frame increases (which indicates that the user will be able to see more detail in the triangle, and hence a large number of smaller triangles is desirable to display the required detail).

Referring again to FIG. 16, at step S348 CPU 4 reads from the topological database the minimum value of the dot-product of vector normals, which was previously stored at step S99 (FIG. 4). As described above, this value is indicative of the curvature of the part of the object surface which the triangle represents.

At step S350, CPU 4 uses the minimum dot-product value read at step S348 as input to a second look-up table, and reads the depth value defined in the look-up table for this input value.

FIG. 17B shows the information stored in the second look-up table in this embodiment.

Referring to FIG. 17B, it will be seen that the depth value increases as the vertex normal dot-product value decreases (that is, as the curvature of the object surface which the triangle represents increases, such that a large number of small triangles are required to represent the curvature). As with the first look-up table, the output from the second look-up table is one of ten different depth values.

At step S352, CPU 4 combines the depth value read from the first look-up table in dependence upon the triangle area at step S346 and the depth value read from the second look up table in dependence upon the minimum vertex normal dot-product read at step S350. In this embodiment, the two depth values are added and one is subtracted from the total, to give a final depth value for tessellation. For example, if the triangle has an area of 1000 pixels, then the depth value read from the first look-up table at step S346 is 5, and if the minimum vertex normal dot-product of the triangle is 0.80, then the depth value read from the second look-up table at step S350 is 2. Accordingly, at step S352, the depth of tessellation is determined to be 5+2—1=6.

Referring again to FIG. 15, at step S308, CPU 4 determines whether there is another triangle in the model of the object being considered. Steps S302 to S308 are repeated until all of the triangles in the model have been processed in the manner described above.

At step S310, CPU 4 determines a depth of tessellation for the model as a whole by selecting the greatest depth of tessellation which was determined for a triangle within the model at step 5306. This tessellation will then be used for all triangles in the model.

At step S312, CPU 4 determines whether data defining the model tessellated at the depth determined at step S310 is already stored in memory. This determination is carried out because, as will be described later, when a model of an object is tessellated to a new depth, data defining the tessellation is stored for subsequent use.

If it is determined at step S312 that data defining the required tessellation is stored in memory, then, at step S314, the data is read from the memory. On the other hand, if it is determined at step S312 that data defining the required tessellation is not stored, then, at step S316, CPU 4 performs processing to tessellate all of the triangles in the model to the depth determined at step S310.

FIG. 19 shows the processing operation performed at step S316 by CPU 4 to carry out the tessellation.

Referring to FIG. 18, at step S360, CPU 4 considers the next triangle in the model.

At step S362, CPU 4 calculates the barycentric coordinates of the point on the triangle for which the next new vertex is to be created (this being the first new vertex the first time step S362 is performed).

FIGS. 19A, 19B and 19C illustrate the points on a triangle for which new vertices are created for depths 2, 3 and 4 in this embodiment (as explained previously with respect to FIGS. 17A and 17B, depth 1 indicates that no tessellation is to take place).

Referring to FIG. 19A, when a triangle is to be tessellated to depth 2, a new triangle vertex is calculated for the points 170, 172 and 174, each of which lies half-way along a respective side of the triangle. It should be noted that a new vertex is not actually placed at points 170, 172 and 174, but instead the position of a new vertex is calculated for each of the points 170, 172 and 174 in dependence upon the height of the Bernstein-Bezier triangular patch above these points, as will be described below.

Referring to FIG. 19B, when a triangle is to be tessellated to depth 3, a new vertex is calculated for each of the points 176, 178, 180, 182, 184 and 186, which divide the respective edges of the triangle into thirds. A new vertex is also calculated for the point 188, whose position on a triangle is determined by connecting the points 176, 178, 180, 182, 184 and 186 as shown in FIG. 19B.

Referring to FIG. 19c, when a triangle is to be tessellated to depth 4, a new vertex is created for each of the points 190, 192, 194, 196, 198, 200, 202, 204 and 206, which are equally spaced along the edges of the triangle and divide each respective edge into quarters. New vertices are also calculated for the points 280, 210 and 212 inside the triangle, whose positions are determined by connecting the points 190, 192, 194, 196, 198, 200, 202, 204 and 206 as shown in FIG. 19C.

The points for which new vertices are calculated for other depth levels are determined in a similar manner. The number of new vertices generated along each edge of the triangle is equal to the depth number minus one, and the number of new triangles into which the original triangle is divided is equal to the square of the depth number. For example, when a triangle is to be tessellated to depth 10, new vertices are calculated for nine points along each edge of the triangle which divide the edge into tenths, and for points inside the triangle defined by interconnecting the points along the edges. The number of triangles generated is then 100.

It will be appreciated that the barycentric coordinates of the points in the triangle for which new vertices are to be created can be calculated and stored in advance for each depth level. In this way, the step of determining the barycentric coordinates at step S362 can be performed by reading the required coordinates from memory.

Referring again to FIG. 18, at step S364, CPU 4 uses the ordinates previously calculated for the triangle at step S8 to calculate the height of the Bernstein-Bezier triangular patch above the point on the triangle whose barycentric coordinates were determined at step S362. This is done by evaluating the Bernstein-Bezier patch equation using the barycentric coordinates determined at step S362. More particularly, CPU 4 evaluates equation 6 above using the barycentric coordinates $(\tau_1, \tau_2, \tau_3)$ of the new point and the values of the ordinates $b_{003}, b_{030}, b_{300}, b_{102}, b_{201}, b_{012}, b_{021}, b_{120}, b_{210}, b_{111}$ calculated at step S8 to give a value for $b^3(\tau)$ which is the height of the Bernstein-Bezier patch above the point.

At step S366, CPU 4 calculates the normal at the point on the triangle whose barycentric coordinates were read at step S362. In this embodiment, CPU 4 calculates the normal, $N_{new}$, using the following equation:

$$\underline{N}_{new} = \tau_1 \underline{N}1 + \tau_2 \underline{N}2 + \tau_3 \underline{N}3 \qquad (7)$$

where $\underline{N}1$, $\underline{N}2$ and $\underline{N}3$ are the unit normal vectors at the vertices of the triangle. More particularly, the vertex whose first barycentric coordinate is non-zero is defined to have the normal $\underline{N}1$, the vertex whose second barycentric coordinate is non-zero is defined to have the normal $\underline{N}2$ and the vertex whose third barycentric coordinate is non-zero is defined to have the normal $\underline{N}3$.

At step S368, CPU 4 uses the height calculated at step S364 and the normal calculated at step S366 to calculate the position of the new vertex to be used in tessellation. More particularly, CPU 4 calculates the position of the new vertex as the point which lies a distance measured from the point on the original triangle whose barycentrics coordinates were read at step S362 which is equal to the height calculated at step S364 measured in the direction of the normal calculated at step S366.

FIG. 20 illustrates, by way of example, the calculations at steps S364, S366 and S368.

Referring to FIG. 20, the Bernstein-Bezier patch 144 is shown for triangle 32, which was previously described with respect to FIG. 14B. The height of the Bernstein-Bezier triangular patch calculated at step S364 above point 170 (which, as described previously with respect to FIG. 19A, is the mid-point of a side of the triangle) is "H". The vector normal at point 170 is $N_{new}$. The position of the new vertex to be used in tessellation is point 220, which lies along the normal $N_{new}$ by a distance "H" from point 170. It will be seen from the example shown in FIG. 20, that the new point does not necessarily lie on the surface of the Bernstein-Bezier triangular patch defined by the ordinates previously calculated by CPU 4 at step S8 (FIG. 2).

Referring again to FIG. 18, at step S370, CPU 4 defines a vector normal for the new vertex calculated at step S368. In this embodiment, CPU 4 defines the vector normal to be the same as the vector normal calculated at step S366.

At step S372, CPU 4 determines whether there is another vertex on the original triangle for which a new vertex to be used in tessellation is to be calculated. Steps S362 to S372 are repeated until a new vertex has been calculated for each required point on the triangle (that is, the points on the triangle defined by the depth level; for example points 170, 172 and 174 shown in FIG. 19A where the depth level is depth 2 and points 176, 178, 180, 182, 184, 186 and 188 shown in FIG. 19B where the depth level is depth 3).

At step S374, CPU 4 defines connections between the new vertices calculated at step S368. This defines a number of tessellated triangles for the original triangle. The tessellated triangles do not necessarily lie in the plane of the original triangle, and hence more accurately represent the curvature of the object surface which the original triangle represented as being flat. (The tessellated triangles will all lie in the same plane as the original triangle if each edge of the original triangle has the keep_edge, is_attached_edge, border_edge, or invalid edge sharing flag set.)

FIGS. 21A, 21B, 21C and 21D illustrate examples of tessellated triangles when the triangles shown in FIGS. 14A, 14B, 14C and 14D are tessellated to depth two.

Figure 21A:
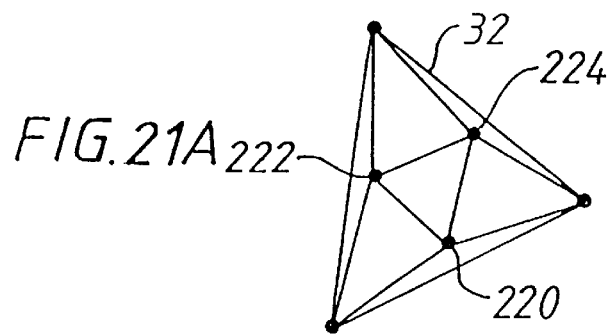

Referring to FIG. 21A, new vertices 220, 222 and 224 are generated and connected. None of the new vertices lies along an edge of the original triangle in the plane of the original triangle since none of the edges of triangle 32 has the keep_edge, is_attached_edge, border_edge or invalid_edge_sharing flag set.

Figure 21B:
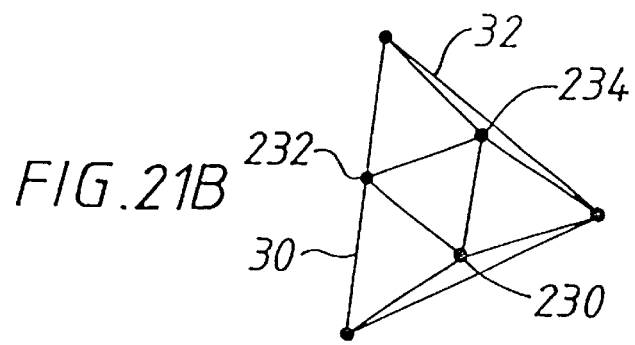

Referring to FIG. 21B, new vertices 230, 232 and 234 are created and connected. New vertex 232 lies mid-way along edge 30 because edge 30 has the keep_edge, is_attached_edge, border_edge or invalid_edge_sharing flag set.

Figure 21C:
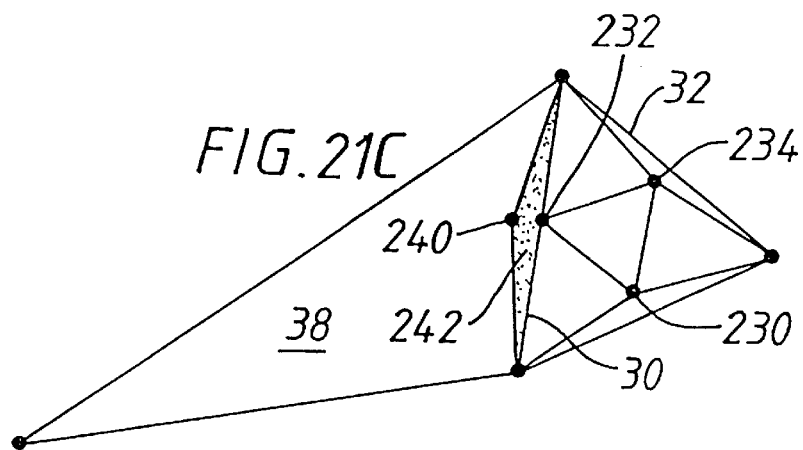

Referring to FIG. 21C, the new vertices 230, 232 and 234 for triangle 32 are the same as those illustrated in FIG. 21B. However, FIG. 21C illustrates an example in which edge 30 which is common to triangle 32 and triangle 38 has been modified for triangle 38 since edge 30 does not have the keep_edge, is_attached_edge, border edge or invalid edge sharing flag set for triangle 38. More particularly, the example illustrated in FIG. 21C corresponds to a case where edge 30 has the is_attached_edge flag set for triangle 32 and has the has_attache_edge flag set for triangle 38. Accordingly, for triangle 38, new vertex 240 is calculated. New vertices for the other edges of triangle 38 are not illustrated in FIG. 21C. It will be seen from FIG. 21C that a gap 242 (illustrated by the dotted area) between the triangle 32 and the triangle 38 has been created along edge 30. The way in which this edge will be dealt with will be described later.

Figure 21D:
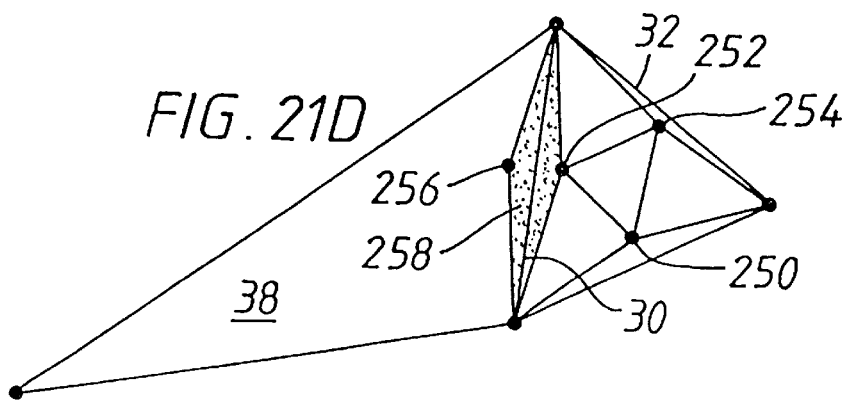

Referring to FIG. 21D, new vertices 250, 252 and 254 are created for triangle 32, and a new vertex 256 is created for side 30 of triangle 38 (the new vertices created for the other sides of triangle 38 are not illustrated in FIG. 21D). The example shown in FIG. 21D corresponds to the case where the edge_normals_ambiguous flag is set for edge 30 of triangle 32 and triangle 38, but the keep_edge flag is not set for edge 30 for either triangle. As will be seen from FIG. 21D, a gap 258 (illustrated by the dotted area) has been created between the triangle 32 and the triangle 38.

Referring again to FIG. 18, at step S376, CPU 4 determines whether there is another triangle to be processed in the model. Steps S360 to S376 are repeated until each triangle has been processed to generate tessellated triangles in the manner described above.

Referring again to FIG. 15, at step S318, CPU 4 performs processing to correct the topology of the tessellated models generated at step S316. More particularly, CPU 4 carries out processing to fill any gaps in the model created between adjacent triangles, such as the gap 242 shown in the example of FIG. 21C and the gap 258 shown in the example of FIG. 21D.

FIG. 22 shows the processing operations performed by CPU 4 at step S318 to correct the topology.

Referring to FIG. 22, at steps S390 to S400, CPU 4 performs processing to fill gaps created between triangles along an edge for which the is_attache_edge flag is set for the edge for one triangle and the has_attached_edge flag is set for the other triangle.

More particularly, at step S390, CPU 4 considers the next triangle in the model, and at step S392, CPU 4 reads the edge flags for the triangle from the topological database.

At step S394, CPU 4 determines whether the is_attached_edge flag is set for any edge of the triangle. If this flag is not set, then processing proceeds to step S400. On the other hand, if it is determined that an is_attached_edge flag is set, then, at step S396, for each edge for which the is_attached_edge flag is set, CPU 4 moves the new vertices for the edge generated by tessellation at step S368 (FIG. 18) to meet the corresponding new vertices for the corresponding edge for which the has_attached_edge flag is set.

Referring to FIG. 21C again, by way of example, the is_attached_edge flag is set for edge 30 for triangle 32 and the has_attache_edge flag is set for edge 30 for triangle 38. Accordingly, at step S396, CPU 4 moves the position of the new vertex 232 for the edge 30 generated by tessellation to the position of the corresponding new vertex 240 generated for edge 30 for triangle 38.

FIG. 23A illustrates, by way of further example, a case in which triangle 32 and triangle 38 are tessellated to depth four. Again, the is_attached_edge flag is set for edge 30 for triangle 32 and accordingly the three new vertices 270, 272, 274 generated by tessellation at step S368 (FIG. 18) lie on the edge 30. The edge 30 has the has_attached_edge flag set for triangle 38. Accordingly, the new vertices 276, 278, 280 generated by tessellation for edge 30 and triangle 38 do not lie along the edge 30. At step S396, CPU 4 moves the position of vertex 270 to the position of vertex 276, moves the position of vertex 272 to the position of vertex 27 8, and moves the position of vertex 274 to the position of vertex 280.

FIG. 23B shows the resulting tessellation of triangle 32 from the example of FIG. 23A after step S396 has been performed.

Referring to FIG. 23B, the result of moving vertices 270, 272 and 274 is that each of the tessellated triangles which includes one of these vertices has its shape (and, most probably, the plane in which it lies) changed. In the example of FIG. 23A, vertices 270, 272 and 274 were moved away from the original triangle to meet the corresponding refined vertices of triangle 38. Therefore, as shown in FIG. 23B, triangles 300, 302, 304, 306, 308, 310 and 312 are larger than the remaining tessellated triangles.

However, it is desirable that the tessellated triangles are of approximately even size and evenly distributed over the original triangle. In this way, in cases where the plane of a triangle is changed by moving the vertex for an edge having the is_attache_edge flag set, the curvature of the underlying object surface is more evenly modelled.

Accordingly, referring again to FIG. 22, at step S398, CPU 4 redistributes the vertices of the tessellated triangles which lie inside the original triangle. In the example of FIG. 23B, these vertices are vertices 320, 322 and 324. It will be appreciated that the number of internal vertices to be redistributed in this step is dependent upon the depth of tessellation, with the number of internal vertices increasing as the depth increases. It will also be seen from FIG. 19A that there are no internal vertices to be redistributed when the depth of tessellation is depth 2.

FIG. 24 shows the processing operations performed by CPU 4 to redistribute the internal vertices at step S398.

Referring to FIG. 24, at step S420, CPU 4 considers the next internal vertex. At step S422, CPU 4 determines the barycentric coordinates of each of the six edge vertices which are connected to the internal vertex currently being considered.

FIG. 25 shows triangle 32 from the example shown in FIGS. 23A and 23B divided to depth four.

Referring to FIG. 25, triangle 32 is divided to depth 4, and accordingly there are three internal vertices 320, 322 and 324 to be redistributed. The barycentric coordinates of each vertex are shown in FIG. 25.

The six edge vertices to which an internal vertex is connected are the ones reached by travelling from the internal vertex in the six directions parallel to the triangle edges until an edge vertex is reached. Accordingly, vertex 320, which has barycentric coordinates (2,1,1), is connected to the six edge vertices having barycentric coordinates (3,1,0), (2,2,0), (3,0,1), (2,0,2), (0,3,1) and (0,1,3).

Similarly, internal vertex 322 has barycentric coordinates (1,2,1) and is connected to the six edge vertices having barycentric coordinates (1,3,0), (2,2,0), (3,0,1), (1,0,3), (0,3, 1) and (0,2,2). Internal vertex 324 has barycentric coordinates (1,1,2) and is connected to the six edge vertices having barycentric coordinates (1,3,0), (3,1,0), (2,0,2), (1,0,3), (0,1, 3) and (0,2,2).

When travelling from an internal vertex to an edge, one of the barycentric coordinates of the vertices will decrease. For example, when travelling from internal vertex 324 to edge vertex 270, the third barycentric coordinate decreases from 2 at vertex 324 to 1 at vertex 322 to 0 at vertex 270. In addition, when travelling from an internal vertex to an edge, another of the barycentric coordinates will remain constant. For example, when travelling from internal vertex 324 to edge vertex 270, the first barycentric coordinate has a constant value of 1.

At step S422 CPU 4 uses the fact that each edge vertex which is connected to the internal vertex will have one barycentric coordinate which is 0 and a further barycentric coordinate which is the same as that of the internal vertex to compute the full barycentric coordinates of the six connected edge vertices.

At step S424, CPU 4 calculates a weight for each of the six edge vertices which are connected to the internal vertex. In this embodiment, CPU 4 determines the weight for each connected edge vertex on the basis of the barycentric coordinates of the internal vertex currently being considered and the barycentric coordinate of the edge vertex which is 0. More particularly, if the first barycentric coordinate of the edge vertex is 0, then CPU 4 allocates a weight to this vertex of the reciprocal of the first barycentric coordinate of the internal vertex. Similarly, if the second barycentric coordinate of the edge vertex is 0, CPU 4 allocates a weight of the reciprocal of the second barycentric coordinate of the internal vertex, while if the third barycentric coordinate of the edge vertex is 0, CPU 4 allocates a weight of the reciprocal of the third barycentric coordinate of the internal vertex.

Referring again to the example of FIG. 25, for internal vertex 322, the weight assigned to edge vertex 270 and edge vertex 272 (whose third barycentric coordinate is 0) is 1/1, the weight assigned to edge vertices 330 and 332 (whose first barycentric coordinate is 0) is 1/1, and the weight assigned to edge vertices 334 and 336 (whose second barycentric coordinate is 0) is 1/2.

At step S426, CPU 4 reads the three-dimensional position of each of the six connected edge vertices (that is, the positions after vertices have been moved at step S396) and combines the positions in accordance with the weights calculated at step S424, to give a new position for the internal vertex currently being considered. In this embodiment, the combination at step S426 is performed using the following equation to combined the positions in a vector sense:

$$V^{new} = \frac{W_1 V_1 + W_2 V_2 + W_3 V_3 + W_4 V_4 + W_5 V_5 + W_6 V_6}{W_1 + W_2 + W_3 + W_4 + W_5 + W_6} \quad (8)$$

where:
  $V_{new}$ is the new three-dimensional position of the internal vertex;
  $W_i$ (i=1 . . . 6) is the weight of the ith edge vertex calculated at step S424;
  $V_i$ (i=1 . . . 6) is the three-dimensional position of the ith edge vertex.

It will be understood that, in step S426, as well as moving the position of the internal vertex parallel to the plane of the original triangle, the internal vertex may also be moved to a different height above the original triangle.

By performing steps S420 to S426 as described above, CPU 4 repositions the internal vertex in dependence upon the six connected edge vertices. Edge vertices which are closer to the internal vertex have a larger weight than edge vertices which are further from the internal vertex, and accordingly the position of closer edge vertices influence the position of the internal vertex more than the positions of edge vertices further away.

At step S428, CPU 4 determines whether there is another internal vertex to be repositioned. Steps S420 to S428 are repeated until all internal vertices have been repositioned in the manner described above.

Referring again to FIG. 22, at step S400, CPU 4 determines whether there is another triangle in the model which has not yet been considered. Steps S390 to S400 are repeated until all triangles in the model have been processed in the manner described above.

At steps S402 to S408, CPU 4 performs processing to fill gaps created between triangles along an edge for which the edge_normals_ambiguous flag is set for the edges but the keep_edge flag is not set for either edge (this corresponding to a situation in which the edge has been modified for both triangles which share the edge, for example as shown in the example of FIG. 21D).

More particularly, at step S402, CPU 4 reads the edge flags from the topological database. At step S404, CPU 4 considers the next pair of edges for which the edge_normals_ambiguous flags are set, but for which the keep_edge flags are not set.

At step S406, CPU 4 fills the gap between the two modified edges. In this embodiment, CPU 4 performs this by connecting the new vertices generated by tessellation to form "stitching triangles".

FIGS. 26A, 26B and 26C show examples of how stitching triangles are generated by CPU 4 at step S406.

FIG. 26A shows an example in which the triangles sharing an edge are tessellated to depth 2. In this case, the new vertices 350, 352 generated by tessellation are connected to form stitching triangles 354 and 356.

FIG. 26B shows an example in which the triangles 32 and 38 are tessellated to depth 3. In this case, vertex 360 in triangle 32 is connected to the corresponding vertex in triangle 38 (that is, the vertex resulting from the same original point on edge 30), this being vertex 362. Similarly, vertex 364 in triangle 32 is connected to corresponding vertex 366 in triangle 38. In addition, the quadrilateral formed by vertices 360, 362, 366 and 364 is divided into triangles by connecting vertex 360 from triangle 32 with the vertex 366 of triangle 38 at the opposite corner of the quadrilateral.

FIG. 26C shows an example in which triangles 32 and 38 are tessellated to depth 4. In this situation, vertex 370 of triangle 32 is connected to the corresponding vertex 372 in triangle 38, vertex 374 in triangle 32 is connected to the corresponding vertex 376 in triangle 38, and vertex 378 in triangle 32 is connected to the corresponding vertex 380 in triangle 38. To divide the quadrilateral formed by connected vertices 370, 372, 376 and 374, CPU 4 connects vertex 370 of triangle 32 to vertex 376 in triangle 38 at the opposite corner of the quadrilateral. Similarly, to divide the quadrilateral formed by connected vertices 374, 376, 380 and 378 into triangles, CPU 4 connects vertex 374 of triangle 32 to vertex 380 of triangle 38 at the opposite corner of the quadrilateral.

Referring again to FIG. 22, at step S408, CPU 4 determines whether there is another pair of edges for which the edge_normals_ambiguous flags are set but for which the keep_edge flags are not set. Steps S404 to S408 are repeated until each pair of edges for which the edge_normals_ambiguous flags but not the keep_edge flags are set is processed in the manner described above.

Referring again to FIG. 15, at step S320, CPU 4 stores the data generated at steps S316 and S318 in memory for subsequent re-use in generating image data for another frame when the same depth of tessellation is required.

At step S322, CPU 4 determines whether there is a model of another object to be processed. Steps S300 to S322 are repeated until each model has been processed in the manner described above.

Referring again to FIG. 2, at step S918, CPU 4 lights the triangular polygons generated at step S16.

In this embodiment, the lighting is carried out in the object space of each object. This is effected by calculating the inverse to the local transform (which transforms the object from its object space to the common 3D world space) and performing the inverse transform upon the position of each light source, thereby transforming the light sources into object space.

FIG. 27 shows the processing operations performed by CPU 4 to light the polygons at step S18.

Referring to FIG. 27, at step S450, CPU 4 considers the model of the next object.

At step S452, CPU 4 determines whether the frame of image data to be displayed is the first frame. If it is determined that the frame is the first frame of image data, then, at step S454, CPU 4 calculates a value for each colour component at each triangle vertex in the model in a conventional manner. In this embodiment, for each colour component at each triangle vertex, CPU 4 calculates an ambient light intensity value, a diffuse light intensity value and a specular light intensity value taking into account all of the light sources present. This is performed in a conventional manner, for example as described in "Computer Graphics Principles & Practice" by Foley, van Dam, Feiner & Hughes, Addison-Wesley Publishing company, 2nd Edition, ISBN 0-201-12110-7, sections 16.1 and 16.2.

On the other hand, if it is determined at step S452 that the frame of image data to be displayed is not the first frame, then, at step S456, CPU 4 determines whether the viewing parameters (defining the position and direction from which the image is to be viewed) determined at step S12 have changed since the previous frame. If it is determined that the viewing parameters have changed, then processing proceeds to step S462.

On the other hand, if it is determined at step S456 that the viewing parameters have not changed since the previous frame, then, at step S458, CPU 4 determines whether the lighting parameters (determined at step S10) have changed since the previous frame. If it is determined that the lighting parameters have changed, then processing proceeds to step S462.

On the other hand, if it is determined at step S458 that the lighting parameters have not changed since the previous frame, then, at step S460, CPU 4 determines whether the object has moved since the previous frame. If it is determined that the object has not moved, then the viewing parameters, lighting parameters and object position have not changed since the previous frame. Accordingly, CPU 4 uses the lighting values calculated for the previous frame for the current frame, and processing proceeds to step S482.

On the other hand, if it is determined at step S456 that the viewing parameters have changed, or if it is determined at step S458 that the lighting parameters have changed, or if it is determined at step S460 that the object has moved, then it is necessary to calculate new lighting values, and processing proceeds to step S462.

At step S462, CPU 4 determines whether the model is tessellated to a depth greater than a predetermined depth. In this embodiment, the predetermined depth is depth 3 (as illustrated in FIG. 19B). The result of this test determines how the lighting values will be calculated for the model. More particularly, the refinement of a model at step S16 generates a number of new vertices, and a value for each colour component must be calculated at each vertex. Accordingly, the number of calculations to be performed increases as the number of vertices increases. In this embodiment, rather than calculate the value for each colour component at each vertex in the conventional manner described above, a different technique referred to as a "lighting patch" technique may be used which is computationally more efficient. The lighting patch technique is more efficient than the conventional technique when the number of vertices for which lighting values are to be calculated exceeds a predetermined value. On the basis of the lighting patch technique used in this embodiment, the predetermined value of the number of vertices is reached when a triangle is tessellated to a depth greater than depth 3. For this reason, the test performed at step S462 determines whether the model is tessellated to a depth greater than depth 3.

If it is determined at step S462 that the model is not tessellated to a depth greater than depth 3, then, at steps S464, S466 and S468, CPU 4 calculates the lighting values in a conventional manner for each vertex in the model. More particularly, at step S464, CPU 4 considers the next triangle in the original model of the object, and, at step S466, CPU 4 calculates a value for each colour component at each original vertex and each new vertex. of tessellated triangles in the conventional manner described above with respect to step S454. At step S468, CPU 4 determines whether there is another triangle to be processed in the model of the object. Steps S464 to S468 are repeated until all triangles in the model have been processed in the manner described above.

On the other hand, if it is determined at step S462 that the model is tessellated to a depth greater than depth 3, at steps S470 to S480, CPU 4 calculates the lighting values for the model using "lighting patches", as will now be described.

At step S470, CPU 4 considers the next triangle in the model of the object, and at step S472 considers the next colour component. In this embodiment, the colour components red, green and blue are used, although other colour component schemes may, of course, be used.

At step S474, CPU 4 calculates parameters defining a lighting patch for the triangle being considered and the colour component being considered.

FIG. 28 shows the processing operations performed by CPU 4 at step S474 to calculate the parameters defining the lighting patch.

Referring to FIG. 28, at step S500, CPU 4 calculates a value for the colour component at each control point of the triangle. The control points of the triangle are the ten points shown in, and previously described with respect to, FIG. 10, namely the triangle vertices, two points along each edge which divide the edge into thirds and a point at the barycentre of the triangle. The value for the colour component at each of these points is calculated in a conventional manner. For example, in this embodiment, an ambient value for the colour component, a diffuse value for the colour component and a specular value for the colour component are calculated in dependence upon all of the light sources present, and these values are added to give an overall value for the colour component at the given control point.

At step S502, CPU 4 defines a point above each control point at a height corresponding to the calculated value of the colour component at that control point.

At step S504, CPU 4 considers the next edge in the triangle.

At step S506, CPU 4 calculates ordinate values for the edge which cause a parametric patch to interpolate the points defined at step S502 above the control points along the edge. In this embodiment, coordinates are calculated for a cubic Bernstein-Bezier triangular patch. FIGS. 29A and 29B illustrate an example of the effect of the processing operations performed at step S506.

Referring to FIG. 29A, points 400, 402, 404 and 406 lie on the triangle edge and are the control points for this edge of the triangle (points 400 and 406 being vertices of the triangle, point 402 being spaced one third of the edge length from point 400, and point 404 being spaced one third of the edge length from point 406). Points 410, 412, 414 and 416 are the points defined at step S502 at heights above the control points corresponding to the value of the colour component at the control points calculated at step S500. Thus, in this example, point 410 is at a height h0 above point 400 since the value of the colour component calculated at point 400 at step S500 was h0, point 412 is at a height h1 above point 402 since the value of the colour component calculated at point 402 was hi, point 414 is at a height h2 above point 404 since the value of the colour component calculated at point 404 was h2, and point 416 is at a height h3 above point 406 since the value of the colour component calculated at point 406 was h3.

If the points 410, 412, 414 and 416 are used as ordinates to define a cubic Bernstein-Bezier triangular patch, then the edge of the patch will not pass through the points 412 and 414, and instead will have a position shown by the dotted line 418 in FIG. 29A. Accordingly, at step S506, CPU 4 calculates ordinate values which cause the edge of a Bernstein-Bezier triangular patch to pass through all of the points 410, 412, 414 and 416. The ordinate values calculated at step S506 are illustrated in FIG. 29B and comprise points 410, 420, 422 and 416. The ordinates for the triangle vertices have the same values as the calculated colour component value since the edge of the Bernstein-Bezier triangular patch will interpolate these end points. Thus, in the example shown, the ordinate of point 400 has a value h0 and the ordinate of point 406 has a value h3.

To calculate the value for the ordinates at points 402 and 404 along the edge, which are not vertices of the triangle, CPU 4 calculates the value of the height h1' of point 420 above point 402 and the value of the height h1' of the point 422 above the point 404, such that the values h1' and h1' cause the Bernstein-Bezier triangular patch to interpolate the points 410, 412, 414 and 416.

Each edge of the lighting patch is defined by a cubic Bezier polynomial. The equation for a cubic Bezier polynomial of the parameter t and with the control ordinates h0, h1', h1' and h3 is:

$$h(t) = (1-t)^3 h0 + 3t(1-t)^2 h1' + 3t^2(1-t) h2' + t^3 h3$$

Evaluating this polynomial at t=1/3 and t=2/3 (corresponding to the positions of the control points along the triangle edge) gives:

$$h\left(\frac{1}{3}\right) = \frac{8}{27}h0 + \frac{4}{9}h1' + \frac{2}{9}h2' + \frac{1}{27}h \quad (10)$$

$$h\left(\frac{2}{3}\right) = \frac{1}{27}h0 + \frac{2}{9}h1' + \frac{4}{9}h2' + \frac{8}{27}h$$

But, using the values calculated at step S500:

$$h\left(\frac{1}{3}\right) = h1 \quad (11)$$

$$h\left(\frac{2}{3}\right) = h2$$

Therefore, setting $$c1 = \frac{8}{27}h0 + \frac{1}{27}h3 \quad (12)$$

$$c2 = \frac{1}{27}h0 + \frac{8}{27}h3$$

Equation 10 becomes:

$$\frac{4}{9}h1' + \frac{2}{9}h2' + c1 = h1 \quad (13)$$

$$\frac{2}{9}h1' + \frac{4}{9}h2' + c2 = h2$$

which is equivalent to $$\frac{4}{9}h1' + \frac{2}{9}h2' = h1 - c1 \quad (14)$$

$$\frac{2}{9}h1' + \frac{4}{9}h2' = h2 - c2$$

Since Equation 14 is a linear equation it can be solved for h1' and h1' using Cramers rule, giving:

$$Det0 = \begin{vmatrix} \frac{4}{9} & \frac{2}{9} \\ \frac{2}{9} & \frac{4}{9} \end{vmatrix} = \frac{12}{81} \quad (15)$$

and consequently giving the following equations, which CPU 4 uses at step S506 to calculate the ordinate values for each internal edge control point (points 402 and 404 in the example of FIGS. 29A and 29B):

$$h1' = \frac{\begin{vmatrix} h1 - c1 & \frac{2}{9} \\ h2 - c2 & \frac{4}{9} \end{vmatrix}}{\frac{12}{81}} = \frac{(h1-c1)\frac{4}{9} - (h2-c2)\frac{2}{9}}{\frac{12}{81}}$$

$$h2' = \frac{\begin{vmatrix} \frac{4}{9} & h1 - c1 \\ \frac{2}{9} & h2 - c2 \end{vmatrix}}{\frac{12}{81}} = \frac{(h2-c2)\frac{4}{9} - (h1-c1)\frac{2}{9}}{\frac{12}{81}} \quad (16)$$

In this embodiment, any ordinate value which is calculated at step S506 to be less than zero is set to zero, since this has been found to provide subjectively better illuminations results.

Referring again to FIG. 28, at step S508, CPU 4 determinates wether there is another edge of the triangle to be procesed. Steps S504 and S508 are repeated until ordinates for each edge control point have been calculated in the manner described above.

A step S510, CPU 4 calculates an ordinate value for the control point at barycentre of the triangle (that is, point 108 in the exemple shown in FIG. 10).

FIG. 30 shows the processing operations performed by CPU 4 to calculate the ordinate for the central control point at step S510.

In this embodiment, CPU 4 uses the six ordinates previously calculated at step S506 for the control points lying on the edges of the triangle between vertices, and the six original colour component values for these control points, to compute a factor for each control point, which, when multiplied by the colour component value, gives the ordinate value. The six factors are then used to calculate an ordinate value for the control point at the barycentre of the triangle. This process will now be described in more detail.

Referring to FIG. 30, at step S520, CPU 4 sets the value of a variable entitled "sum" to zero.

At step S522, CPU 4 considers the next control point lying on an edge between vertices of the triangle being considered (referring to the example shown in FIG. 10, the control points lying on an edge between vertices comprise points 92, 94, 98, 100, 104 and 106).

At step S524, CPU 4 reads the value of the colour component calculated for the control point at step S500, and determines whether the value is equal to zero. If the value is equal to zero, then, at step S526, CPU 4 adds one to the value of the variable "sum". On the other hand, if the value of the colour component at the control point is not equal to zero, at step S528, CPU 4 divides the value of the ordinate at the control point calculated at step S506 by the value of the colour component of the control point and adds the resultant value to the value of the variable "sum".

At step S530, CPU 4 determines whether there is another control point lying between vertices of the triangle. Steps S522 to S530 are repeated until each control point lying between vertices of the triangle has been processed in the manner described above.

At step S532, CPU 4 calculates the value of the ordinate for the control point at the barycentre of the triangle as the product of (i) the value of the colour component at the control point at the barycentre (previously calculated at step S500), (ii) the value of the variable "sum" and (iii) ⅙ (this corresponding to the reciprocal of the number of control points lying along edges of the triangle between vertices which were used to derive the value of the variable "sum").

As a result of the processing described above, data has been generated which defines a lighting patch which interpolates the values of the colour component calculated at the control points over the triangle.

Referring again to FIG. 27, at step S476, CPU 4 calculates a value for the colour component at each vertex of each tessellated triangle within the original triangle currently being considered using the lighting patch defined by the parameters previously calculated at step S474.

FIG. 31 shows the processing operations performed by CPU 4 at step S476 to calculate the value for the colour component at each vertex.

Referring to FIG. 31, at step S550, CPU 4 considers the next vertex for which a value of the colour component is to be calculated.

At step S552, CPU 4 determines the barycentric coordinates of the point on the original triangle to which the vertex corresponds. By way of example, referring again to FIG. 23B and FIG. 25, the point on original triangle 32 which corresponds to vertex 270 is the point having barycentric coordinates (1,3,0). Similarly the point on the original triangle corresponding to vertex 274 is the point having barycentric coordinates (3,1,0), and the point on the original triangle corresponding to vertex 324 is the point having barycentric coordinates (1,1,2).

At step S554, CPU 4 calculates the height of the cubic Bernstein-Bezier triangular lighting patch (defined by the parameters calculated at step S474) above the point on the original triangle. This is carried out by evaluating the lighting patch equation using the barycentric coordinates determined at step S552. The equation of the lighting patch is given by equation 6, described previously, with the values of the ordinates $b_{003}$ $b_{030}$, $b_{300}$, $b_{102}$, $b_{201}$, $b_{012}$, $b_{021}$, $b_{120}$ and $b_{210}$ being those previously calculated at step S506 and the value of the ordinate $b_{111}$ being that previously calculated at step S510.

At step S556, CPU 4 determines whether there is another vertex at which a value for the colour component is to be calculated. Steps S550 to S556 are repeated until a value for the colour component has been calculated at each vertex as described above.

Referring again to FIG. 27, at step S478, CPU 4 determines whether there is another colour component for which a lighting value at each vertex in the triangle is to be calculated. Steps S472 to S478 are repeated until a value for each colour component at each vertex in the original triangle has been calculated in the manner described above.

At step S480, CPU 4 determines whether there is another triangle in the model. Steps S470 to S480 are repeated until each triangle in the model has been processed in the manner described above.

At step S482, CPU 4 determines whether there is a model of another object to be processed. Steps S450 to S482 are repeated until each model has been processed in the manner described above.

Referring again to FIG. 2, at step S20, CPU 4 transforms the triangles making up each object from the modelling space of the object into the three-dimensional viewing space. More particularly, the concatenated matrix used to transform the bounding box during the operation of object culling at step S14 is used again to transform the actual object polygons from object space into viewing space. As noted previously, the concatenated matrix comprises a matrix defining both a local transformation which transforms the object from its object space into the shared 3D world space and a view transformation which transforms the object from the 3D world space to the 3D viewing space.

At step S22, CPU 4 carries out a clipping process to remove polygons or parts thereof which fall outside the field of view defined by the viewing parameters previously determined at step S12. In performing the clipping process at step S22, CPU 4 uses information generated previously when objects were culled at step S14 which identifies the planes of the viewing space which each object intersects, thereby reducing the computational requirements to perform step S22.

At step S24, the triangles of each object are projected into two dimensions in a conventional manner by rejecting the z (depth) dimension and scaling the x and y dimensions to take account of the rejected z dimension, thereby giving a perspective view.

At step S26, CPU 4 identifies which of the polygon faces are front-facing (that is, face the viewer) and which of the polygon faces are back-facing. Back faces are then removed since they cannot actually be seen because they are obscured by a front face. In this embodiment, in order to reduce computational overheads, polygon normals are only used within object space and are not transformed into viewing space. Accordingly, at step S26, CPU 4 processes vectors defining the polygon edges to determine whether a polygon is front facing or back facing. This is carried out in the manner described in published European application EP-A-0590995.

At step S28, CPU 4 scan converts the triangle data to produce pixel data. This step is carried out in a conventional manner, and during this step, a colour value is calculated for each pixel taking into account the values previously calculated at each vertex of each triangle using a conventional Gouraud shading technique.

At step S32, CPU 4 writes the pixel data to the frame buffer 16 on a polygon-by-polygon basis, thereby building up image data for a complete two-dimensional image in a conventional manner.

At step S32, CPU 4 displays the image data written in frame buffer 16 on display device 18 and/or records the image data on a recording device such as video tape recorder 20.

At step S34, CPU 4 determines whether image data is to be generated for another frame. Steps S9 to S34 are repeated to generate each frame of image data. It should be noted that step S6, in which the topology database for the model is constructed, and step S8, in which the parameters for the refinement of the model of each object are calculated, need not be repeated for each frame of image data, provided that the object is not animated (in which case the triangular patches making up the object would change), although the object position may change (since this does not affect the triangles making up the object). However, the techniques described above can be used in animation to define triangle vertices for each "key-frame", with interpolation being used to calculate the triangle vertices for "in-between frames" in a conventional manner.

A number of modifications are possible to the embodiment described above.

The processing performed in the embodiment above at step S18 (and described with reference to FIG. 27) to perform lighting calculations can be performed independently of the processing at steps S6, S8 and S16 to refine the model. For example, a lighting patch could be used to calculate light intensity values at polygon vertices generated by a different refinement method to the one described in the embodiment above. Further, a lighting patch could be used to calculate light intensity values for polygons in the original model which have not undergone any refinement. In this case, the lighting patch could be used to generate light intensity values at a plurality of points within an original polygon and interpolation could then be carried out between each of these values to improve accuracy compared with conventional interpolation between the intensity values at the vertices alone.

In the embodiment above, a cubic Bernstein-Bezier triangular patch is used to refine each triangle of a model, and a cubic Bernstein-Bezier triangular patch is used to determine the lighting patch for each triangle of a model. However, higher order Bernstein-Bezier triangular patches may be used to refine a triangle and/or to define the lighting patch for a triangle.

Higher order patches have limited usefulness, however, when used to refine a triangle, since the information available to calculate the ordinates for each of the extra control points required by the higher order equation (step S234 in FIG. 9) is limited (because only the normal at each vertex of the original triangle is known).

Patches of types other than Bernstein-Bezier triangular patches may be used to refine a triangle and/or to define the lighting patch for a triangle. One example of such an alternative type of patch is the Herron patch, although other types of patches can be used. The equation for a Herron patch, h(T), is as follows:

$$h(\tau) = \sum_{|\lambda|=1} b_\lambda H_\lambda(\tau) \quad (17)$$

$$H_\lambda(\tau) = \begin{cases} 0 \text{ for } \lambda = (1, 1, 1) \\ 3\tau_1^{\lambda_1}\tau_2^{\lambda_2}\tau_3^{\lambda_3} \text{ for } \lambda \neq (1, 1, 1) \end{cases}$$

where:
$\lambda$ is the triplet $(\lambda_1, \lambda_2, \lambda_3)$ of barycentric coordinates which identifies the position of a control point; and
$b_\lambda$, is the value of the ordinate at the control point $\lambda$.

In the embodiment above, the ordinates at the vertices of a triangle are assigned the value 0 so that the patch interpolates these vertices. Further, the Herron polynomial is zero for the central ordinate, and hence a value for $b_{111}$ is never needed.

In the embodiment above, the model of each object comprises triangles. The natural barycentric coordinate system for triangles assists in the computation described for the embodiment above. However, each object may be modelled using other forms of polygons and patches other than triangular patches may be used to refine each polygon and/or to determine the lighting patch for each polygon. In particular, each object may be modelled using rectangles. If polygons having five or more sides are used, the amount of computation required increases significantly, however, and real time operation may not be possible.

The refinement of the model of each object (step S16 in FIG. 2 in the embodiment above) can be carried out at other places in the rendering pipeline shown in FIG. 2. For example, the refinement can take place after the polygons have been lit at step S18.

In the embodiment above, all of the triangles in each model are refined at step S18 before subsequent processing takes place. However, processing may be carried out so that steps S16 to S30 are carried out on a polygon-by-polygon basis.

In the embodiment above, at step S6, the topological database for the model of each object is constructed. However, this information may be received with the 3D modelling data.

The information stored in the topological database in the embodiment above enables triangles which share a given edge to be identified. By looking at the current viewing parameters (determined at step S12) and considering the triangle normals of both triangles sharing an edge, it is possible to determine if the edge is part of the silhouette of the object. More particularly, if one triangle normal points towards the viewer making the triangle visible and the other points away from the viewer, then the edge is part of the silhouette. This information can be used during step S16 to apply a high sub-division depth for triangles that are part of the silhouette.

In the embodiment above, at step S18, the triangles making up the model of each object are lit in object space. However, the triangles may be transformed into the three-dimensional world space for the lighting calculations to be performed.

In the embodiment above, to calculate an ordinate for each edge control point (step S234 in FIG. 9), the distance of the tangent plane passing through the nearest vertex from the control point is calculated in a direction parallel to the normal at the nearest vertex (step S262 in FIG. 11). However, this distance may be calculated in other directions. For example, a direction may be calculated for each control point based on a weighting of the normal at each vertex of the triangle (the weighting of each vertex being determined by its distance from the control point). Alternatively, a direction may be calculated based on the average of the normals at the vertices at the ends of the edge, which would cause the values of the ordinates to be slightly bigger than if they were calculated using a direction parallel to the normal at the nearest vertex as in the embodiment above (and hence would cause the surface to be more curved). Further, a direction parallel to the triangle normal may be used (although this may cause gaps between adjacent triangles, which would then be filled by generating "stitching triangles" for example as at step S406 in the embodiment above).

In the embodiment above, at step S234 (FIG. 9), CPU 4 calculates a value for the ordinate at each vertex and each edge control point. However, as explained above, when the keep_edge flag is set for an edge, the ordinates 25 are calculated to be zero. Accordingly, the apparatus may be arranged to test whether the keep_edge flag is set for an edge and to set the ordinate values to zero rather than perform the calculations.

In the embodiment above, at step S306 (FIG. 15), the depth of tessellation for a triangle is determined in dependence upon both the area occupied by the triangle in the previous frame of image data and the curvature of the triangle (determined from the difference in angles of the normals at the vertices of the triangle). However, the depth may be determined from the area of the triangle in the previous frame alone or in dependence upon the curvature of the triangle alone. Also, the depth may be determined from the area of the triangle in any preceding frame, and not necessarily the immediately preceding frame (although the more remote the preceding frame which is used, the more time the object will have had to move, and hence the more chance there is that the area used is not indicative of the area for the current frame). In addition, other techniques may be used. For example, the depth of the triangle from the viewer in the previous (or any preceding) frame may be used. By way of further example, a bounding sphere may be defined around the object in object space, the bounding sphere may be then projected into two-dimensional screen space, the area of the projected sphere calculated, and one half of the calculated area divided by the number of polygons in the model of the object to give an average polygon area, which may be then used to determine the depth of sub-division. In this way, a polygon area for the current frame (rather than a preceding frame) is used to determine the sub-division depth. Of course, each individual polygon can be projected into two-dimensional screen space, and its area and sub-division depth determined for the current frame. Further, size parameters other than area may be used to determine the sub-division depth. For example, the length of the longest edge of the polygon in screen space may be used, as this too is indicative of the size of polygon that will be displayed to the user and hence the number of polygons into which the original polygon should be divided to display the required detail.

As noted above, at step S306, the depth of sub-division of a polygon is determined in dependence upon the area of the polygon (either in a previous frame or the current frame of image data) and/or the curvature of the polygon. The same principles can be applied to models of objects made up of parametric surface patches, for example Bezier patches and B-spline patches.

As is well known, when a model made up of parametric surface patches is to be rendered, each surface patch is divided into flat polygons (see for example Section 11.3.5 of "Computer Graphics Principles and Practice", second edition, by Foley, van Dam, Feiner and Hughes, Addison-Wesley Publishing Company, ISBN 0-201-12110-7). To determine the depth of sub-division for a given patch, and hence the number of polygons that will be produced for rendering, the area of the patch can be used. Taking a Bezier patch as an example, and referring to FIG. 32, the patch is typically defined by sixteen control points P11, P12, P13, P14, P21, P22, P23, P24, P31, P32, P33, P34, P41, P42, P43 and P44. These sixteen control points define eight Bezier curves P11-P12-P13-P14, P21-P22-P23-P24, P31-P32-P33-P34, P41-P42-P43-P44, P11-P21-P31-P41, P12-P22-P32-P42, P13-P23-P33-P43 and P14-P24-P34-P44. Each control point is thus a control point for two of the Bezier curves. More particularly, each of the points P11, P14, P44 and P41 is an end control point for two curves, each of the points P22, P23, P33 and P32 is a curvature control point for two curves, and each of the points P12, P13, P24, P34, P43, P42, P31 and P21 is an end control point for one curve and a curvature control point for one curve. To determine the area of the patch (in order to calculate the number of polygons into which the patch should be divided for rendering), the four points which are end control points for two of the Bezier curves in the patch (that is, points P11, P14, P44 and P41 in the example of FIG. 32) can be connected and the area of the resulting polygon calculated. Alternatively, other combinations of the control points can be connected to form polygons and the resulting areas calculated and added to give an area for the overall patch. For example, all sixteen control points could be connected as shown in FIG. 32 and the areas of the resulting nine polygons calculated and summed together. In a further example, the four points which are end control points for two curves (P11, P14, P44, P41) and the four points which are curvature control points for two curves (P22, P23, P33, P32) could be connected and the areas of the resulting five polygons calculated and summed together. Further, size parameters other than area may be used to determine the sub-division depth of a parametric surface patch. For example, referring to the Bezier patch shown in FIG. 32, the number of polygons for rendering may be determined in dependence upon the distance between the points P11 and P44 and/or the distance between the points P14 and P41.

As in the embodiment described above, the number of polygons into which a parametric surface patch is divided for rendering can be determined in dependence upon the curvature of the patch as well as the area, or in dependence upon the curvature alone. EP-A-0596667 describes a method which can be used to determine the number of polygons into which a parametric surface patch is divided in dependence upon the curvature of the patch.

As in the embodiment described above, each surface patch making up a model may be sub-divided to the same depth, and the resulting polygons stored for use in rendering future frames of image data for which the depth is the same.

In the embodiment above, each triangle is divided for tessellation in a manner previously described with respect to FIGS. 19A, 19B and 19C. However, each triangle may be divided in other ways.

In the embodiment described above, at step S366 (FIG. 18), when a triangle is divided, a normal is calculated for each new vertex using linear interpolation of the normals from the vertices of the original triangle. This normal is subsequently used at step S368 to determine the position of a point lying off the surface of the original triangle which is then used as a vertex in the refined representation of the triangle. However, the normal may be calculated at step S366 using techniques other than linear interpolation. For example, angular interpolation may be performed of the normal of each vertex. Such interpolation may be based, for example, on the technique described in "Stratified Sampling of Spherical Triangles" by J. Avro, Computer Graphics Proceedings, SIGGRAPH (1995), pages 437–438.

The height of the Bernstein-Bezier patch calculated at step S364 (FIG. 18) in the embodiment above may be scaled by a constant to increase or decrease the height. The effect of this constant is to control how closely the refined surface fits the shape of the original object. Thus, for example, an artist drawing an object can associate a constant with the object indicating what form the object surface should take. By way of example, an object comprising a sphere may appear as a cube if it is coarsely approximated by triangles. To address this, in the embodiment above, a constant of 1.267927822449 may be associated with the object and used to refine the height calculated at step S364 so that the model is refined to better approximate the originally intended sphere.

In the embodiment above, at steps S402 to S408 (FIG. 22), "stitching" triangles are generated to fill the gap between each pair of edges for which the edge_normals_ambiguous flags are set but the keep_edge flags are not set. These stitching triangles may, however, be generated after scan conversion has taken place. In addition, a different technique may be used to prevent the requirement for stitching triangles at all. More particularly, the gap between two triangles for which the edge_normals_ambiguous flags but not the keep_edge flags are set (as shown in FIG. 21D) arises because:

(i) the value of the ordinate at at least one internal control point along the edge is calculated at step S262 (FIG. 11) to be different for each triangle sharing the edge because the normals at the nearest vertex are different for the two triangles for at least one vertex; and (ii) at step S368 (FIG. 18), the position of the new vertex for at least one internal control point on the edge is calculated to be different for the two triangles sharing the edge because the direction of the normal along which the distance is measured at step S368 is calculated to be different for the two triangles at step S366 since each triangle has different normals at at least one vertex.

To prevent the gap between two triangles sharing the edge occurring, therefore, at step S262, the distance from the control point of the tangent plane which passes through the nearest vertex may be measured in a direction parallel to the average of the normal of the first triangle and the normal of the second triangle at the nearest vertex. In this way, the ordinates calculated for the edge are the same for each triangle. Accordingly, at step S364 (FIG. 18), the height of the Bernstein-Bezier patch will be the same for each triangle. In addition, a normal may be calculated at step S366 by interpolating the average of the normals of the two triangles at the vertex at one end of the edge and the average of the normals for the two triangles at the vertex at the other end of the edge, so that the position of the new vertex is calculated at step S368 to be the same for each of the triangles sharing the edge. In this way, no gap appears along the edge. This approach has the advantage that unnecessary "stitching" triangles are not generated, which can occur in the embodiment described above if the refinement of the triangles sharing an edge results in surfaces which intersect each other (so that no gap actually occurs).

In the embodiment above, whether or not a lighting patch is used to calculate the lighting values for each triangle is determined in dependence upon the depth of tessellation of the model (step S462 in FIG. 27).

Instead, or in addition, the use of a lighting patch may be determined in dependence upon the curvature of the surface of each individual triangle within the model. In the embodiment described above, at step S466, when a lighting patch is not used to calculate lighting values (because the model is tessellated to depth 3 or less) a value for each colour component at each original vertex and each tessellated vertex is calculated. However, instead of calculating a value at each tessellated vertex, it is possible to interpolate the values calculated at one or more of the original vertices to generate a value at a tessellated vertex. This works particularly well for tessellated vertices corresponding to control points on a flat edge if the calculated value at the vertex at each end of the edge is interpolated.

If an application can tolerate lower quality illumination, then a lighting patch need not be used to calculate the lighting values, and instead the colour at each vertex generated by tessellation can be calculated by linear interpolation from the colours calculated at the original vertices. Further, this allows computational performance to be increased. More particularly, ordinates could be calculated from object space triangle data as in the embodiment above, but, rather than refining each triangle to generate new vertices in object space as in the embodiment above, the new vertices can be generated in viewing space (camera space). In this way, the new vertices do not need to be transformed from object space to viewing space, yielding an increase in performance.

Although not mentioned in the description of the embodiment above, texture mapping may be performed. For example, texture coordinates defined at vertices of a triangle may be interpolated using barycentric coordinates at the same time as new vertices are generated during tessellation to define texture coordinates at the tessellated vertices.

In the embodiment above, when calculating the position of a new vertex, at step S364, the height of the Bernstein-Bezier patch is calculated by evaluating the cubic Bernstein-Bezier triangular patch equation for each vertex on the original triangle for which a height is to be calculated. Similarly, when calculating a lighting value using a lighting patch, at step S554, the height of the Bernstein-Bezier lighting patch above the original triangle is calculated by evaluating the cubic Bernstein-Bezier triangular lighting patch equation for each vertex on the original triangle for which a height is to be calculated. However, in both step S364 and step S554, the height of the Bernstein-Bezier triangular patch may be calculated for successive points on the original triangle using a conventional forward differencing technique, for example as described in "Computer Graphics Principles & Practice" by Foley, van Dam, Feiner & Hughes, 2nd Edition, Addison-Wesley Publishing Company, 1990, ISBN 0-201-12110-7, pages 511–513. The parameters for use in such a forward differencing technique will now be described.

The parameters for use at step S364 will be described first.

As described previously with respect to FIG. 25, when travelling parallel to an edge of a triangle, one of the barycentric coordinates of the triangle vertices remains constant. For example, in FIG. 25, when moving between the points along the edge defined by vertices having barycentric coordinates (4,0,0) and (0,0,4) and when moving between points in a direction parallel to this edge, the second barycentric coordinate is constant. That is, $\tau_2$ is constant. Because $\tau_1+\tau_2+\tau_3=1$, setting $\tau_2=c$ gives $\tau_1=1-c-\tau_3$. Therefore, equation (6) becomes:

$$f(\tau_3)=b_{300}(1-c-\tau_3)^3+b_{030}c^3+b_{003}\tau_3^3+3b_{201}(1-c-\tau_3)^2\tau_3^3+3b_{102}(1-c-\tau_3)\tau_3^2+3b_{210}(1-c-\tau_3)^2c+3b_{120}(1-c-\tau_3)c^2+3b_{021}c^2\tau_3+3b_{012}c\tau_3^2+6b_{111}(1-c-\tau_3)c\tau_3 \quad (18)$$

Reordering equation (18) gives:

$$f(\tau_3)=-\tau_3^3(b_{300}-3b_{201}+3b_{102}-b_{003})+-3\tau_3^2(c(b_{300}-b_{210}-2b_{201}+2b_{111}+b_{102}-b_{012})-b_{300}+2b_{201}-b_{102})+-3\tau_3(c2(b_{300}-2b_{210}+b_{021}-b_{201}+2b_{111}-b_{021})-2c(b_{300}-b_{210}-b_{201}+b_{111})+b_{300}-b_{201})+-c^3(b_{300}-3b_{210}+3b_{120}-b_{030})+3c^2(b_{300}-2b_{210}+b_{120})-3c(b_{300}-b_{210})+b_{300} \quad (19)$$

Now, $b_{300}=b_{030}=b_{003}=0$. Therefore, equation (19) simplifies to:

$$f(\tau_3)=3\tau_3^3(b_{201}-b_{102})+3\tau_3^2[c(b_{210}+2b_{111}-b_{102}+b_{012})-2b_{201}+b_{102}]+3\tau_3[c^2(2b_{210}-b_{120}+b_{201}-2b_{111}+b_{021})-2c(b_{210}+b_{201}-b_{111})+b_{201}]+3c(c-1)[c(b_{210}-b_{120})-b_{210}] \quad (20)$$

Equation (20) is a cubic polynomial of the form $f(\tau_3)=A\tau_3^3+B\tau_3^2+C\tau_3+D$. Re-substituting c with $\tau_2$ again, the coefficients of $f(\tau_3)$ are:

$$A=3b_{201}-3b_{102}$$

$$B=3\tau_2(b_{210}+2b_{201}-2b_{111}-b_{102}+b_{012})-3(2b_{201}+b_{102})$$

$$C=3\tau_2^2(2b_{210}-b_{120}+b_{201}-2b_{111}+b_{021})-6\tau_2(b_{210}+b_{201}-b_{111})+3b_{201}$$

$$D=3\tau_2^3(b_{210}-b_{120})+\tau_2^2(3b_{120}-6b_{210})+3\tau_2 b_{210} \quad (21)$$

Since equation (20) is a cubic polynomial of $\tau_3$ we can forward difference it for a constant $\tau_2$ and a constant $\tau_3$ step $\delta_3$ using the following start values:

$$f_0=D$$

$$\Delta f_0=A\delta_3^3+B\delta_3^2+C\delta_3$$

$$\Delta^2 f_0=6A\delta_3^3+2B\delta_3^2$$

$$\Delta^3 f_0=6A\delta_3^3 \quad (22)$$

Further, B, C and D can also be forward differenced for a constant $\tau_2$ step $\delta_2$ using the following start values:

$$B_0=-3(2b_{201}-b_{102})$$

$$\Delta B_0=3(b_{210}+2b_{201}-2b_{111}-b_{102}+b_{012})\delta_2$$

$$C_0=3b_{201}$$

$$\Delta C_0=3(2b_{210}-b_{120}+b_{201}-2b_{111}+b_{021})\delta_2^2-6(b_{210}+b_{201}-b_{111})\delta_2$$

$$\Delta^2 C_0=6(2b_{210}-b_{120}+b_{201}-2b_{111}+b_{021})\delta_2^2$$

$$D_0=0$$

$$\Delta D_0=3(b_{210}-b_{120})\delta_2^3+(3b_{120}-6b_{210})\delta_2^2+3b_{210}\delta_2$$

$$\Delta^2 D_0=18(b_{210}-b_{120})\delta_2^3+2(3b_{120}-6b_{210})\delta_2^2$$

$$\Delta^3 D_0=18(b_{210}-b_{120})\delta_2 3 \quad (23)$$

This concludes the parameters for performing forward differencing at step S364.

The parameters for use in performing forward differencing at step S554 will now be described.

For the illumination patch algorithm, $b_{300}$, $b_{030}$ and $b_{003}$ are generally not 0. Therefore, in order to apply forward differencing for the illumination patch, equation (19) is used. Equation (19) is a cubic polynomial of the form $f(\tau_3)=A\tau_3^3+B\tau_3^2+C\tau_3+D$. Re-substituting c with $\tau_2$ again, the coefficients of $f(\tau_3)$ are:

$$A=b_{003}+3b_{201}-3b_{102}b_{300}$$

$$B=3\tau_2(b_{210}+2b_{201}-2b_{111}-b_{102}+b_{012}-b_{300})-3(2b_{201}+b_{102}-b_{300})$$

$$C=3\tau_2^2(2b_{210}-b_{120}+b_{201}-2b_{111}+b_{021}-b_{300})-6\tau_2(b_{210}+b_{201}-b_{111})+3(b_{201}-b_{111})$$

$$D=\tau_2^3(3b_{210}-3b_{120}-b_{300}+b_{030})+3\tau_2^2(b_{120}-2b_{210}-b_{300})+3\tau_2(b_{210}-b_{300})+b_{300} \quad (24)$$

Since equation (24) is a cubic polynomial of $\tau_3$ it can be forward differenced for a constant $\tau_2$ and a constant $\tau_3$ step $\delta_3$ using equation (22).

Similarly, B, C and D can be forward differenced for a constant $\tau_2$ step $\delta_2$ using the following start values:

$$B_0=3(b_{300}-2b_{201}+b_{102})$$

$$\Delta B_0=-3(b_{300}-b_{210}-2b_{201}+2b_{111}+b_{102}-b_{012})\delta_2$$

$$C_0=-3(b_{300}-b_{201})$$

$$\Delta C_0=-3(b_{300}-2b_{210}+b_{120}-b_{201}+2b_{111}-b_{021})\delta_2^2+6(b_{300}-b_{210}-b_{201}+b_{111})\delta_2$$

$$\Delta^2 C_0=-6(b_{300}-2b_{210}+b_{120}-b_{201}+2b_{111}-b_{021})\delta_2^2$$

$$D_0=b_{300}$$

$$\Delta D_0=(b_{030}+3b_{210}-3b_{120}-b_{300})\delta_2^3+3(b_{003}+b_{120}-2b_{210})\delta_2^2+3(b_{210}-b_{300})\delta_2$$

$$\Delta^2 D_0=6(b_{030}+3b_{210}-3b_{120}-b_{300})\delta_2^3+6(b_{003}+b_{120}-2b_{210})\delta_2^2$$

$$\Delta^3 D_0=6(b_{030}+3b_{210}-3b_{120}-b_{300})\delta_2^3 \quad (25)$$

In the embodiment above, processing is performed by a computer using processing routines defined by programming instructions. However, some, or all, of the processing could be performed using hardware.

What is claimed is:

1. A method of processing data defining first polygons which approximate at least part of a curved three-dimensional surface to produce second polygons for use in rendering an image of the surface, the method including for each first polygon the processing operations of:

defining a respective surface patch to approximate the part of the object surface represented by the first polygon;

dividing the first polygon into a plurality of notional polygons;

calculating a respective normal vector for each vertex of each notional polygon; and for each notional polygon, defining a said second polygon for rendering using the surface patch of the first polygon and the calculated normal vectors for the vertices of the notional polygon to determine the positions of the vertices of the second polygon in three dimensions.

2. A method according to claim 1, wherein the first polygons approximating the curved three-dimensional surface are triangular, and a Bernstein-Bezier triangular patch is defined as the surface patch for each first polygon.

3. A method according to claim 2, wherein a cubic Bernstein-Bezier triangular patch is defined for each first polygon.

4. A method according to claim 1, wherein the operation of defining a surface patch for a first polygon comprises calculating control values at control points for the first polygon to define the surface patch.

5. A method according to claim 4, wherein the control values for each vertex of the first polygon are set to zero.

6. A method according to claim 4, wherein the control values for control points along an edge other than vertices are calculated by determining the distance from the control point of the tangent plane at the nearest vertex in a predetermined direction.

7. A method according to claim 6, wherein the predetermined direction is based on the direction of the normal at the nearest vertex alone.

8. A method according to claim 6, wherein the predetermined direction is based on the normal at each vertex defining the ends of the edge on which the control point lies.

9. A method according to claim 1, wherein each surface patch is a Herron patch.

10. A method according to claim 1, wherein, in the operation of dividing a first polygon into notional polygons, the division is performed in dependence upon an average area of at least some of the first polygons in a current frame of image data or a previous frame of image data.

11. A method according to claim 1, wherein, each first polygon is divided into the same number of notional polygons.

12. A method according to claim 11, wherein the number of notional polygons is determined by testing each first polygon to determine a division number therefor defining a number of notional polygons, and selecting the highest division number.

13. A method according to claim 11, wherein:
processing is performed for each frame of image data to be generated to determine a level of subdivision defining the number of notional polygons into which each first polygon is to be divided;
data defining the second polygons produced for rendering is stored for future use when it is generated for a level of subdivision for which data is not already stored; and
the stored data is used when a frame of image data is to be generated for a level of subdivision for which data is already stored.

14. A method according to claim 1, wherein each said second polygon is a triangle.

15. A method according to claim 1, wherein, in the operation of defining a second polygon for a notional polygon, vertices for the second polygon are calculated in dependence upon the distance of the surface patch above each vertex of the notional polygon and in dependence upon the calculated normal vectors for the vertices of the notional polygon.

16. A method according to claim 15, wherein, in the operation of defining a second polygon for a notional polygon, vertices for the second polygon are calculated by:
for each vertex of the notional polygon, setting the position of a vertex for the second polygon at the point which lies a distance from the vertex of the notional polygon equal to the distance of the surface patch above the vertex of the notional polygon in the direction of the normal vector calculated for the vertex of the notional polygon.

17. A method according to claim 15, wherein a forward differencing technique is used to calculate the distance of the surface patch above each vertex of each notional polygon.

18. A method according to claim 1, further comprising the processing operation of filling gaps between the second polygons generated for rendering.

19. A method according to claim 18, wherein gaps are filled by moving vertices of second polygons generated for rendering.

20. A method according to claim 18, wherein gaps are filled by connecting vertices of second polygons to form further polygons for rendering.

21. A method according to claim 18, wherein gaps to be filled are identified using a database defining, for each edge of each first polygon, the relationship between the normals at each vertex of the first polygons which share the edge.

22. A method according to claim 1, wherein the operation of defining a surface patch is performed by processing data in object space, and the operation of defining second polygons is performed in viewing space.

23. A method according to claim 1, further comprising the processing operation of calculating lighting values for each second polygon by evaluating a polygon lighting equation for at least one of ambient, diffuse and specular light.

24. A method according to claim 23, wherein polygon lighting equations are evaluated to define a respective second surface patch for at least some of the first polygons, and lighting values are calculated for the second polygons thereof using the second surface patches.

25. A method according to claim 23, wherein, in the operation of calculating lighting values, the number of notional polygons into which each surface patch is divided is determined, and:
(i) if the number of notional polygons is less than a predetermined number, a lighting value is calculated for each vertex of the second polygons by evaluating the lighting equation for each vertex; and
(ii) if the number of notional polygons is greater than a predetermined number, a respective second surface patch is calculated for each first polygon, and a lighting value is calculated for each vertex of the second polygons using the second surface patches.

26. A method according to claim 24, wherein the operation of calculating a second surface patch for a first polygon includes:
(i) evaluating the lighting equation to calculate a lighting value at a plurality of control points for the first polygon; and
(ii) calculating values defining the second surface patch such that the surface patch interpolates the lighting values calculated at the control points.

27. A method according to claim 24, wherein, in the operation of using a second surface patch to calculate a lighting value for a vertex of a second polygon, the lighting value is calculated using the height of the second surface patch above the first polygon at the vertex of a notional polygon which corresponds to the vertex for which the lighting value is to be calculated.

28. A method according to claim 27, wherein a forward differencing technique is used to calculate the height of the second surface patch above each vertex of each notional polygon.

29. A method according to claim 1, further comprising the operation of generating a signal conveying the second polygons.

30. A method according to claim 1, further comprising the operation of producing rendered image data.

31. A method according to claim 30, further comprising the operation of generating a signal conveying the rendered image data.

32. A method according to claim 31, further comprising the operation of recording the signal.

33. A method according to claim 30, further comprising the operation of displaying an image using the rendered image data.

34. A method according to claim 30, further comprising the operation of making a recording of the image data either directly or indirectly.

35. A method of generating polygons approximating at least a part of the surface of a three-dimensional object for use in rendering an image of the object, in which:
an initial polygonal model of the surface comprising a mesh of triangular polygons is processed to generate a mesh of cubic Bernstein-Bezier triangular surface patches approximating the surface; and
a further polygonal model of the surface is generated using the surface patches by dividing each triangular polygon in the initial polygon model into a plurality of notional triangular polygons and, for each notional triangular polygon, defining a triangular polygon for the further polygonal model using the cubic Bernstein-Bezier triangular patch of the corresponding triangular polygon in the initial polygonal model to calculate the positions in three-dimensional space of the vertices of the triangular polygon for the further polygonal model.

36. Apparatus for processing data defining first polygons which approximate at least part of a curved three-dimensional surface to produce second polygons for use in rendering an image of the surface, comprising:
a patch definer for defining a respective surface patch for each first polygon to approximate the part of the object surface represented by the first polygon;
a polygon divider for dividing each first polygon into a plurality of notional polygons;

a normal vector calculator for calculating a respective normal vector for each vertex of each notional polygon; and a polygon definer for defining, for each notional polygon, a said second polygon for rendering using the surface patch of the corresponding first polygon and the calculated normal vectors for the vertices of the notional polygon to determine the positions of the vertices of the second polygon in three dimensions.

37. Apparatus according to claim 36, wherein the first polygons approximating the curved three-dimensional surface are triangular, and the patch definer is operable to define a Bernstein-Bezier triangular patch as the surface patch for each first polygon.

38. Apparatus according to claim 37, wherein the patch definer is operable to define a cubic Bernstein-Bezier triangular patch for each first polygon.

39. Apparatus according to claim 36, wherein the patch definer comprises a control value calculator for calculating control values at control points for the first polygon to define the surface patch.

40. Apparatus according to claim 39, wherein the patch definer is arranged to set the control values for each vertex of the first polygon to zero.

41. Apparatus according to claim 39, wherein the patch definer is arranged to calculate the control values for control points along an edge other than vertices by determining the distance from the control point of the tangent plane at the nearest vertex in a predetermined direction.

42. Apparatus according to claim 41, wherein the predetermined direction is based on the direction of the normal at the nearest vertex alone.

43. Apparatus according to claim 41, wherein the predetermined direction is based on the normal at each vertex defining the ends of the edge on which the control point lies.

44. Apparatus according to claim 36, wherein the patch definer is operable to define a Herron patch for each first polygon.

45. Apparatus according to claim 36, wherein the polygon divider is arranged to perform the division in dependence upon an average area of at least some of the first polygons in a current frame of image data or a previous frame of image data.

46. Apparatus according to claim 36, wherein the polygon divider is arranged to divide each first polygon into the same number of notional polygons.

47. Apparatus according to claim 46, wherein the polygon divider is arranged to determine the number of notional polygons by testing each first polygon to determine a division number therefor defining a number of notional polygons, and selecting the highest division number.

48. Apparatus according to claim 46, operable such that:
processing is performed for each frame of image data to be generated to determine a level of subdivision defining the number of notional polygons into which each first polygon is to be divided;
data defining the second polygons produced for rendering is stored for future use when it is generated for a level of subdivision for which data is not already stored; and
the stored data is used when a frame of image data is to be generated for a level of subdivision for which data is already stored.

49. Apparatus according to claim 36, wherein each said second polygon is a triangle.

50. Apparatus according to claim 36, wherein the polygon definer is arranged to calculate vertices for each second polygon in dependence upon the distance of the surface patch above each vertex of the notional polygon and in dependence upon the calculated normal vectors for the vertices of the notional polygon.

51. Apparatus according to claim 50, wherein the polygon definer is operable to calculate the vertices for each second polygon by:
for each vertex of the corresponding notional polygon, setting the position of a vertex for the second polygon at the point which lies a distance from the vertex of the notional polygon equal to the distance of the surface patch above the vertex of the notional polygon in the direction of the normal vector calculated for the vertex of the notional polygon.

52. Apparatus according to claim 50, wherein the distance calculator is arranged to calculate the distance using a forward differencing technique.

53. Apparatus according to claim 36, further comprising a gap filler for filling gaps between the second polygons generated for rendering.

54. Apparatus according to claim 53, wherein the gap filler is arranged to fill gaps by moving vertices of second polygons generated for rendering.

55. Apparatus according to claim 53, wherein the gap filler is arranged to fill gaps by connecting vertices of second polygons to form further polygons for rendering.

56. Apparatus according to claim 53, wherein the gap filler includes a gap identifier for identifying gaps to be filled using a database defining, for each edge of each first polygon, the relationship between the normals at each vertex of the first polygons which share the edge.

57. Apparatus according to claim 36, wherein the patch definer is arranged to define the surface patches by processing data in object space, and the polygon definer is arranged to define the second polygons by performing processing in viewing space.

58. Apparatus according to claim 36, further comprising a lighting value calculator for calculating lighting values for each second polygon by evaluating a polygon lighting equation for at least one of ambient, diffuse and specular light.

59. Apparatus according to claim 58, wherein the lighting value calculator is arranged to evaluate polygon lighting equations to define a respective second surface patch for at least some of the first polygons, and to calculate lighting values for the second polygons thereof using the second surface patches.

60. Apparatus according to claim 58, wherein the lighting value calculator is arranged to determine the number of notional polygons into which each surface patch is divided, and:
(i) if the number of notional polygons is less than a predetermined number, to calculate a lighting value for each vertex of the second polygons by evaluating the lighting equation for each vertex; and
(ii) if the number of notional polygons is greater than a predetermined number, to calculate a respective second surface patch for each first polygon, and to calculate a lighting value for each vertex of the second polygons using the second surface patches.

61. Apparatus according to claim 59, wherein the lighting value calculator is arranged to calculate the second surface patch for a first polygon by:
(i) evaluating the lighting equation to calculate a lighting value at a plurality of control points for the first polygon; and
(ii) calculating values defining the second surface patch such that the surface patch interpolates the lighting values calculated at the control points.

62. Apparatus according to claim 59, wherein the lighting value calculator is arranged to perform processing to use a second surface patch to calculate a lighting value for a vertex of a second polygon by calculating the lighting value using the height of the second surface patch above the first polygon at the vertex of a notional polygon which corresponds to the vertex for which the lighting value is to be calculated.

63. Apparatus according to claim 62, wherein the lighting value calculator is arranged to use a forward differencing technique to calculate the height of the second surface patch above each vertex of each notional polygon.

64. Apparatus according to claim 36, further comprising an image renderer for producing rendered image data.

65. Apparatus according to claim 64, further comprising a display for displaying an image using the rendered image data.

66. Apparatus for generating polygons approximating at least a part of the surface of a three-dimensional object for use in rendering an image of the object, comprising:
- a mesh generator for processing an initial polygonal model of the surface comprising a mesh of triangular polygons to generate a mesh of cubic Bernstein-Bezier triangular surface patches approximating the surface; and
- a polygon model generator for generating a further polygonal model of the surface using the surface patches by dividing each triangular polygon in the initial polygon model into a plurality of notional triangular polygons and, for each notional triangular polygon, defining a triangular polygon for the further polygonal model using the cubic Bernstein-Bezier triangular patch of the corresponding triangular polygon in the initial polygonal model to calculate the positions in three-dimensional space of the vertices of the triangular polygon for the further polygonal model.

67. A storage device storing computer-useable instructions for causing a programmable processing apparatus to become configured to perform a method as set out in at least one of claims 1 and 35.

68. A signal conveying computer-useable instructions for causing a programmable processing apparatus to become configured to perform a method as set out in at least one of claims 1 and 35.

69. A computer graphics processing method, comprising:
- receiving data defining a three-dimensional computer model of at least a part of a curved three-dimensional object surface, the three-dimensional computer model comprising a plurality of representations, each of a respective portion of the object surface;
- calculating an average area of at least some of the representations;
- determining the number of polygons to be generated to replace each respective representation in dependence upon the calculated average area; and
- for each representation, generating the determined number of polygons for rendering to replace the representation, wherein the number of polygons generated for each representation is the same.

70. A method according to claim 69, wherein the average area is calculated using the at least some of the representations in a previous frame of image data.

71. A method according to claim 70, wherein the average area is calculated using the at least some of the representations in the frame of image data immediately preceding the frame for which the polygons are being generated for rendering.

72. A method according to claim 70, wherein the average area is determined using the coordinates of vertices of polygons rendered in the previous frame of image data.

73. A method according to claim 69, wherein the average area is calculated using the at least some of the representations in the frame of image data for which the polygons are being generated for rendering.

74. A method according to claim 73, wherein the average area is determined by transforming points defining the representations into the two-dimensional image coordinate system.

75. A method according to claim 73, wherein the average area is determined by transforming a volume bounding a plurality of representations into the two-dimensional image coordinate system.

76. A method according to claim 69, wherein the average area is used as the input to a look-up table to generate a value indicating the number of polygons to be generated to replace each respective representation for rendering.

77. A method according to claim 69, wherein the number of polygons to be generated to replace each representation is determined in dependence upon the average area and also the curvature of at least one representation.

78. A method according to claim 69, wherein each representation is a polygon.

79. A method according to claim 69, wherein each representation is a parametric surface patch.

80. A method according to claim 79, wherein each representation is a Bezier patch, and the average area is determined using the control points defining the corners thereof.

81. A method according to claim 69, further comprising the operation of rendering the polygons to produce rendered image data.

82. A method according to claim 81 further comprising the operation of generating a signal conveying the rendered image data.

83. A method according to claim 82, further comprising the operation of recording the signal.

84. A method according to claim 81, further comprising the operation of displaying an image using the rendered image data.

85. A method according to claim 81, further comprising the operation of making a recording of the image data either directly or indirectly.

86. Computer graphics processing apparatus, comprising:
- a receiver for receiving data defining a three-dimensional computer model of at least a part of a curved three-dimensional object surface, the three-dimensional computer model comprising a plurality of representations, each of a respective portion of the object surface;
- an average area calculator for calculating an average area of at least some of the representations;
- a polygon number calculator for determining a number defining the number of polygons to be generated for rendering to replace each respective representation in dependence upon the calculated average area; and
- a polygon generator for generating the determined number of polygons to replace each representation for rendering, so that each representation is replaced with the same number of polygons.

87. Apparatus according to claim 86, wherein the average area calculator is arranged to calculate the average area using at least some of the representations in a previous frame of image data.

88. Apparatus according to claim 87, wherein the average area calculator is arranged to calculate the average area using at least some of the representations in the frame of image data immediately preceding the frame for which the polygons are to be generated for rendering.

89. Apparatus according to claim 87, wherein the average area calculator is arranged to calculate the average area using the coordinates of vertices of polygons rendered in the previous frame of image data.

90. Apparatus according to claim 86, wherein the average area calculator is arranged to calculate the average area using at least some of the representations in the frame of image data for which the polygons are to be generated for rendering.

91. Apparatus according to claim 90, wherein the average area calculator is arranged to calculate the average area by transforming points defining the representations into the two-dimensional image coordinate system.

92. Apparatus according to claim 90, wherein the average area calculator is arranged to calculate the average area by transforming a volume bounding a plurality of representations into the two-dimensional image coordinate system.

93. Apparatus according to claim 86, wherein the polygon number calculator is arranged to use the average area as the input to a look-up table to generate a value indicating the number of polygons to be generated to replace each respective representation for rendering.

94. Apparatus according to claim 86, wherein the polygon number calculator is arranged to determine the number of polygons to be generated to replace each representation in dependence upon the average area and also the curvature of at least one representation.

95. Apparatus according to claim 86, wherein each representation is a polygon.

96. Apparatus according to claim 86, wherein each representation is a parametric surface patch.

97. Apparatus according to claim 96, wherein each representation is a Bezier patch, and the average area calculator is arranged to determine the average area using the control points defining the corners thereof.

98. Apparatus according to claim 86, further comprising an image renderer for rendering the polygons to produce rendered image data.

99. Apparatus according to claim 98, further comprising a display for displaying an image using the rendered image data.

100. A storage device storing computer-useable instructions for causing a programmable processing apparatus to become configured to perform a method as set out in at least one of claims 69 and 86.

101. A signal conveying computer-useable instructions for causing a programmable processing apparatus to become configured to perform a method as set out in at least one of claims 69 and 86.

102. Apparatus for rendering a three-dimensional computer graphics model, comprising:
 a receiver for receiving data defining a computer model of a three-dimensional object made up of a plurality of representations each of which models a respective part of the object;
 a polygon generator for replacing each respective representation with the same number of polygons for rendering, and for storing data defining the polygons for subsequent use; and
 a renderer for rendering the polygons;
 wherein, in use, the apparatus is controlled such that:
  when the three-dimensional computer model is to be rendered for a second or subsequent time, stored polygon data is rendered if the stored data defines the required number of polygons for each representation, otherwise the polygon generator is controlled to replace each representation with the required number of polygons for rendering and to store data defining the polygons for subsequent use.

103. Apparatus for processing data defining first polygons which approximate at least part of a curved three-dimensional surface to produce second polygons for use in rendering an image of the surface, comprising:
 patch defining means for defining a respective surface patch for each first polygon to approximate the part of the object surface represented by the first polygon;
 dividing means for dividing each first polygon into a plurality of notional polygons;
 normal vector calculating means for calculating a respective normal vector for each vertex of each notional polygon; and
 polygon defining means for defining, for each notional polygon, a said second polygon for rendering using the surface patch of the corresponding first polygon and the calculated normal vectors for the vertices of the notional polygon to determine the positions of the vertices of the second polygon in three dimensions.

104. Apparatus for generating polygons approximating at least a part of the surface of a three-dimensional object for use in rendering an image of the object, comprising:
 means for processing an initial polygonal model of the surface comprising a mesh of triangular polygons to generate a mesh of cubic Bernstein-Bezier triangular surface patches approximating the surface; and
 means for generating a further polygonal model of the surface using the surface patches by dividing each triangular polygon in the initial polygon model into a plurality of notional triangular polygons and, for each notional triangular polygon, defining a triangular polygon for the further polygonal model using the cubic Bernstein-Bezier triangular patch of the corresponding triangular polygon in the initial polygonal model to calculate the positions in three-dimensional space of the vertices of the triangular polygon for the further polygonal model.

105. Computer graphics processing apparatus, comprising:
 means for receiving data defining a three-dimensional computer model of at least a part of a curved three-dimensional object surface, the three-dimensional computer model comprising a plurality of representations, each of a respective portion of the object surface;
 means for calculating an average area of at least some of the representations;
 means for determining a number defining the number of polygons to be generated for rendering to replace each representation in dependence upon the calculated average area; and
 means for generating the determined number of polygons to replace each representation for rendering, so that each respective representation is replaced with the same number of polygons.

* * * * *